(12) United States Patent
Hayashi et al.

(10) Patent No.: US 10,321,348 B2
(45) Date of Patent: Jun. 11, 2019

(54) TERMINAL DEVICE, INTEGRATED CIRCUIT MOUNTED ON TERMINAL DEVICE, AND COMMUNICATION METHOD

(71) Applicant: SHARP KABUSHIKI KAISHA, Sakai, Osaka (JP)

(72) Inventors: Takashi Hayashi, Sakai (JP); Naoki Kusashima, Sakai (JP); Wataru Ouchi, Sakai (JP); Kazuyuki Shimezawa, Sakai (JP); Alvaro Ruiz Delgado, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/741,734

(22) PCT Filed: Jul. 6, 2016

(86) PCT No.: PCT/JP2016/070054
§ 371 (c)(1),
(2) Date: Jan. 3, 2018

(87) PCT Pub. No.: WO2017/010379
PCT Pub. Date: Jan. 19, 2017

(65) Prior Publication Data
US 2018/0206138 A1   Jul. 19, 2018

(30) Foreign Application Priority Data
Jul. 10, 2015   (JP) .................................. 2015-138207

(51) Int. Cl.
*H04W 24/10* (2009.01)
*H04W 16/14* (2009.01)
(Continued)

(52) U.S. Cl.
CPC ............ *H04W 24/10* (2013.01); *H04B 17/24* (2015.01); *H04W 16/14* (2013.01); *H04W 72/04* (2013.01); *H04B 17/309* (2015.01); *H04B 17/318* (2015.01)

(58) Field of Classification Search
None
See application file for complete search history.

(56) References Cited

U.S. PATENT DOCUMENTS

| 2015/0045085 A1 | 2/2015 | Kishiyama et al. |
| 2017/0150385 A1* | 5/2017 | Henttonen ............ H04L 5/0048 |

FOREIGN PATENT DOCUMENTS

WO     2013/151127 A1     10/2013

OTHER PUBLICATIONS

Anas et al., Performance Analysis of Handover Measurements and Layer 3 Filtering for UTRAN LTE, IEEE International Symposium on Personal, Indoor and Mobile Radio Communication, (Year: 2007).*

(Continued)

*Primary Examiner* — Mohammed Rachedine
(74) *Attorney, Agent, or Firm* — ScienBiziP, P.C.

(57) ABSTRACT

The present invention enables accurate measurement of RSRP, RSRQ, and the like in an LAA cell. Provided is a terminal device including: a higher layer processing unit for which a physical quantity configuration (quantityConfig) and Measurement objects are configured; and a measurement unit configured to perform measurement of a first frequency and a second frequency based on the physical quantity configuration and the Measurement objects. The physical quantity configuration at least includes a first filtering coefficient used for the measurement for the first frequency and a second filtering coefficient used for the measurement for the second frequency.

10 Claims, 11 Drawing Sheets

(51) Int. Cl.
*H04W 72/04* (2009.01)
*H04B 17/24* (2015.01)
*H04B 17/318* (2015.01)
*H04B 17/309* (2015.01)

(56) References Cited

OTHER PUBLICATIONS

"Study on Licensed-Assisted Access using LTE"; 3GPP TSG RAN Meeting # 65, Edinburgh, Scotland, Sep. 9-12, 2014; RP-141664; Ericsson, Qualcomm, Huawei, Alcatel-Lucent.
"3rd Generation Partnership Project; Technical Specification Group Radio Access Network; Evolved Universal Terrestrial Radio Access (E-UTRA); Physical layer procedures (Release 12)"; 3GPP TS 36.213 V12.4.0 (Dec. 2014).
"L3 filtering for LAA measurements"; 3GPP TSG-RAN WG2 Meeting # 92, Anaheim, US, Nov. 16-20, 2015; R2-156077; Samsung.
"Required functionalities and possible solution related to SCE operation in unlicensed carrier"; 3GPP TSG RAN WG1 Meeting # 79, San Francisco, USA, Nov. 17-21, 2014; R1-144921; ETRI.
"Measurement and Synchronization for LAA-LTE"; 3GPP TSG RAN WG1 Meeting # 79, San Francisco, USA, Nov. 17-21, 2014; R1-144928; HTC.
"Discussion on RRM for LAA"; 3GPP TSG RAN WG1 Meeting # 81, Fukuoka, Japan, May 25-29, 2015; R1-152867 Samsung.

\* cited by examiner

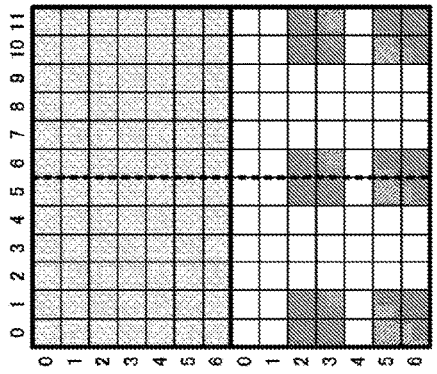
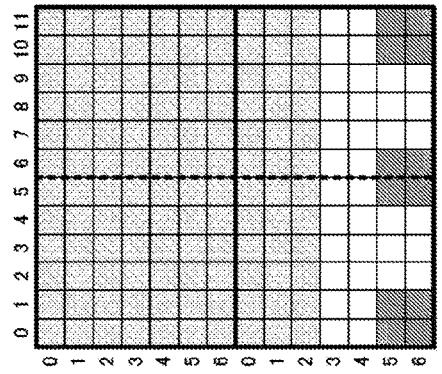
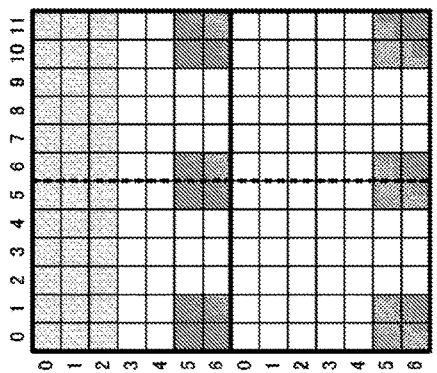
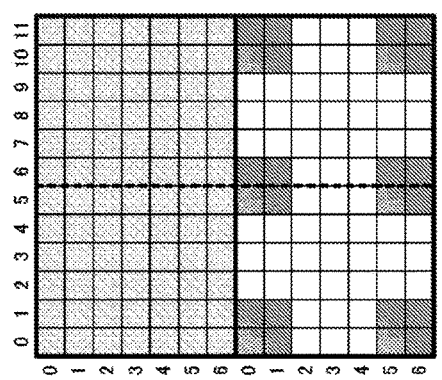
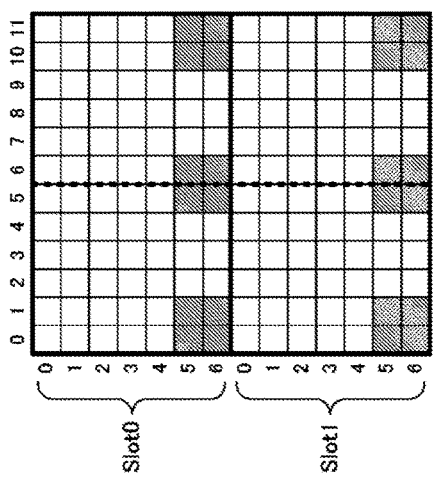

TERMINAL DEVICE, INTEGRATED CIRCUIT MOUNTED ON TERMINAL DEVICE, AND COMMUNICATION METHOD

TECHNICAL FIELD

Embodiments of the present invention relate to a technique of a terminal device, an integrated circuit, and a communication method that enable efficient communication.

BACKGROUND ART

The 3rd Generation Partnership Project (3GPP), which is a standardization project, standardized the Evolved Universal Terrestrial Radio Access (hereinafter referred to as E-UTRA), in which high-speed communication is realized by adopting an Orthogonal Frequency-Division Multiplexing (OFDM) communication scheme and flexible scheduling using a unit of prescribed frequency and time called Resource Block.

Moreover, the 3GPP discusses Advanced E-UTRA, which realizes higher-speed data transmission and has upper compatibility with E-UTRA. E-UTRA relates to a communication system based on a network in which base station devices have substantially the same cell configuration (cell size); however, regarding Advanced E-UTRA, discussion is made on a communication system based on a network (different-type radio network, Heterogeneous Network) in which base station devices (cells) having different configurations coexist in the same area. Note that E-UTRA is also referred to as Long Term Evolution (LTE) and Advanced E-UTRA is also referred to as LTE-Advanced. Furthermore, LTE can also be used as collective term including LTE-Advanced.

Specification is made on a carrier aggregation (CA) technique and a dual connectivity technique, in which, in a communication system where cells (macro cells) having large cell radii and cells (small cells) having smaller cell radii than those of the macro cells coexist as in a Heterogeneous Network, a terminal device performs communication by connecting to a macro cell and a small cell at the same time (NPL 1).

Meanwhile, in NPL 2, Licensed-Assisted Access (LAA) is discussed. In LAA, for example, an Unlicensed spectrum used by wireless Local Area Network (LAN) is used as LTE. Specifically, the Unlicensed spectrum is configured as a Secondary cell (secondary component carrier). A Secondary cell used as LAA is assisted regarding connection, communication, and/or configuration by a Primary cell (primary component carrier) configured in a Licensed spectrum. As a frequency band available in LTE is expanded by LAA, broadband transmission becomes possible. Note that LAA is also used in a shared spectrum shared among prescribed operators.

Furthermore, in a system aiming at safe and secure communication, latency in radio communication is one of important issues. In LTE including LTE using LAA as well as LTE using a Licensed spectrum of the related art, it is also important to further reduce such latency.

Moreover, a terminal device performs measurement of RSRP, RSRQ, and the like, based on a Reference Signal (a CRS, CSI-RS, DS, and the like) transmitted from a base station. Then, a Reference Signal may be transmitted based on downlink LBT in an LAA cell. That is, in an LAA cell, even in a time/frequency in which a Reference Signal is assumed to be transmitted in a terminal device, in a case that a channel is busy based on downlink LBT, the Reference Signal may not be actually transmitted.

CITATION LIST

Non Patent Literature

NPL 1: 3rd Generation Partnership Project; Technical Specification Group Radio Access Network; Evolved Universal Terrestrial Radio Access (E-UTRA); Physical layer procedures (Release 12), 3GPP TS 36.213 V12.4.0 (2014-12).

NPL 2: RP-141664, Ericsson, Qualcomm, Huawei, Alcatel-Lucent, "Study on Licensed-Assisted Access using LTE", 3GPP TSG RAN Meeting #65, September 2014.

SUMMARY OF INVENTION

Technical Problem

That is, in an LAA cell, even in a time/frequency in which a Reference Signal is assumed to be transmitted in a terminal device, in a case that a channel is busy based on downlink LBT, the Reference Signal may not be actually transmitted. That is, the terminal device cannot perform accurate measurement of RSRP, RSRQ, and the like, based on a Reference Signal (a CRS, CSI-RS, DS, and the like) transmitted in the LAA cell. Therefore, a base station device cannot also obtain an accurate reception measurement result in the terminal device (no feedback is given), and thus, it is not possible to perform efficient communication.

In light of the foregoing, an object of the present invention is to provide a terminal device, a base station device, and a communication method that enable accurate measurement of RSRP, RSRQ, and the like in an LAA cell.

Solution to Problem (1) In order to accomplish the object described above, the present invention is contrived to provide the following means. That is, a terminal device according to one aspect of the present invention is a terminal device including a transmission unit. It is preferable that: the terminal device includes: a higher layer processing unit configured with measurement configuration information including a physical quantity configuration (quantityConfig) and Measurement objects; and a measurement unit configured to perform a first measurement and a second measurement based on the measurement configuration information; the physical quantity configuration includes at least a filtering coefficient of filtering applied to a measurement result of the first measurement; the Measurement object include at least measurement timing configuration used for the second measurement; and the transmission unit transmits the measurement result of the first measurement applied with the filtering and a measurement result of the second measurement based on the measurement timing configuration.

(2) In order to accomplish the object described above, the present invention is contrived to provide the following means. That is, a communication method according to one aspect of the present invention is a communication method by a terminal device. It is preferable that the communication method includes the steps of: configuring, by a process of a higher layer, measurement configuration information including a physical quantity configuration (quantityConfig) and Measurement objects; and performing a first measurement and a second measurement based on the measurement configuration information; the physical quantity configuration includes at least a filtering coefficient of a filtering applied to a measurement result of the first measurement; the Measurement objects include at least a measurement timing configuration used for the second measurement; the communication method further includes the step of transmitting the measurement result of the first measurement to which the filtering is applied and a measurement result of the second measurement based on the measurement timing configuration.

(3) In order to accomplish the object described above, the present invention is contrived to provide the following means. That is, an integrated circuit according to one aspect of the present invention is mounted on a terminal device and is configured to cause the terminal device to execute a plurality of functions. It is preferable that the integrated circuit causes the terminal device to execute the steps of: configuring, by a process of a higher layer of the terminal device, measurement configuration information including a physical quantity configuration (quantityConfig) and Measurement objects; and performing a first measurement and a second measurement based on the measurement configuration information; the physical quantity configuration includes at least a filtering coefficient of filtering applied to a measurement result of the first measurement; the Measurement objects include at least a measurement timing configuration used for the second measurement; and the integrated circuit further causes the terminal device to execute the step of transmitting the measurement result of the first measurement applied with the filtering and a measurement result of the second measurement based on the measurement timing configuration.

The present invention enables transmission efficiency to be improved in a radio communication system in which a base station device and a terminal device communicate.

BRIEF DESCRIPTION OF DRAWINGS

FIGS. 9A to 9E are diagrams illustrating an example of a DMRS configuration associated with a second EPDCCH used in a first partial subframe.

DESCRIPTION OF EMBODIMENTS

First Embodiment

A first embodiment of the present invention will be described below. Description will be given by using a communication system (cellular system) in which a base station device (base station, NodeB, or eNodeB (eNB)) and a terminal device (terminal, mobile station, user device, or User equipment (UE)) communicate in a cell.

Note that, in the description of the present embodiment, description about a downlink includes a downlink in a normal cell and a downlink in an LAA cell. For example, description about a downlink subframe includes a downlink subframe in a normal cell, a full subframe in an LAA cell, and a partial subframe in an LAA cell.

A main physical channel and a physical signal used in EUTRA and Advanced EUTRA will be described. The "channel" refers to a medium used to transmit a signal, and the "physical channel" refers to a physical medium used to transmit a signal. In the present embodiment, the "physical channel" may be used as a synonym of "signal". In the future EUTRA and Advanced EUTRA, the physical channel may be added or its constitution and format type may be changed or added; however, the description of the present embodiment will not be affected even in a case that the channel is changed or added.

In EUTRA and Advanced EUTRA, scheduling of a physical channel or a physical signal is managed by using a radio frame. One radio frame is 10 ms in length, and one radio frame is constituted of 10 subframes. In addition, one subframe is constituted of two slots (i.e., one subframe is 1 ms in length, and one slot is 0.5 ms in length). Moreover, scheduling is managed by using a Resource Block as a minimum unit of scheduling for allocating a physical channel. The "Resource Block" is defined by a certain frequency domain constituted of a set of multiple subcarriers (e.g., 12 subcarriers) on a frequency axis and a domain constituted of a certain transmission time slot (one slot).

Figure 1:
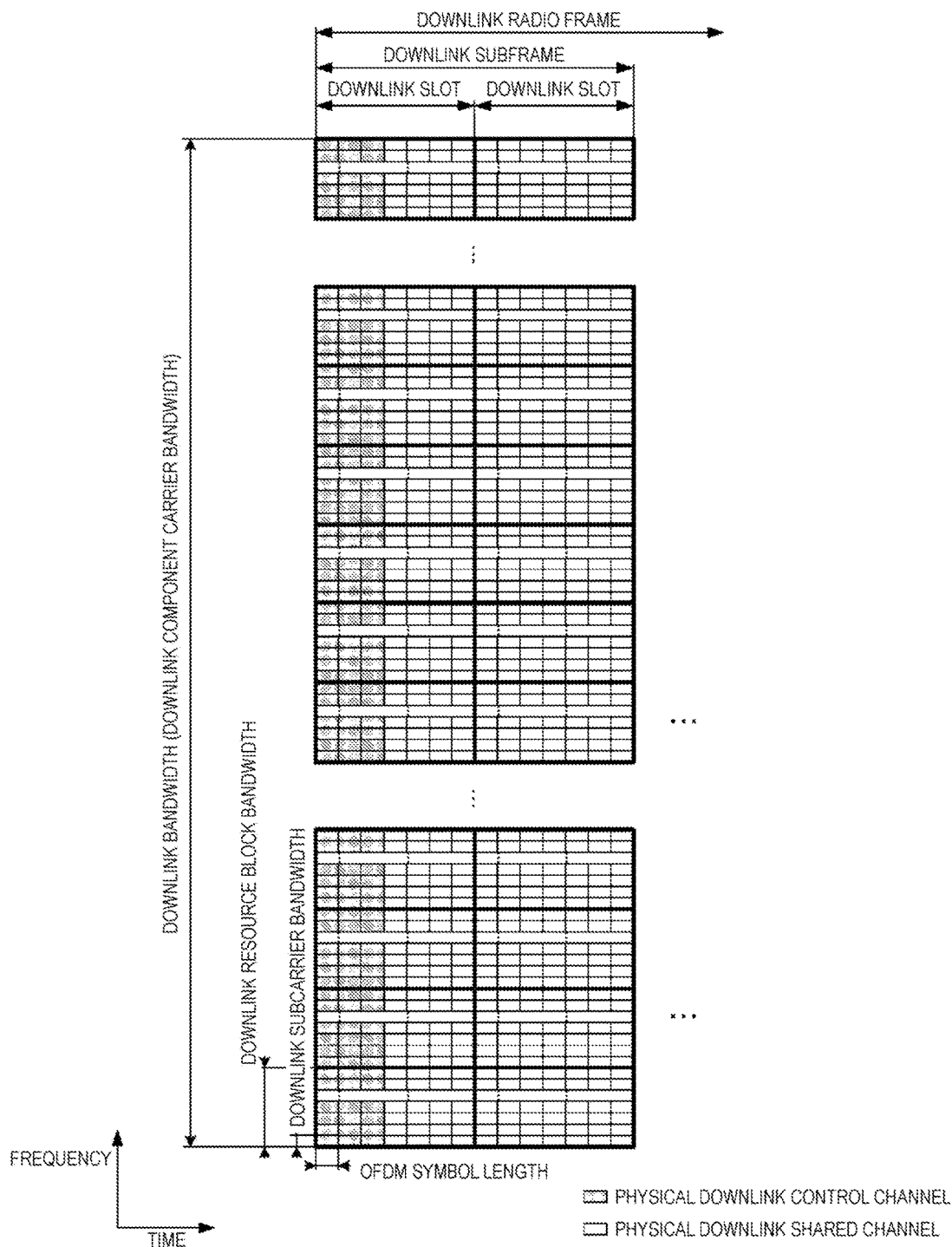
FIG. 1 is a diagram illustrating an example of a downlink radio frame configuration according to the present embodiment.

FIG. 1 is a diagram illustrating an example of a downlink radio frame configuration according to the present embodiment. The downlink uses an OFDM access scheme. In the downlink, a PDCCH, an EPDCCH, a Physical Downlink Shared CHannel (PDSCH), and the like are allocated. A downlink radio frame is constituted of a downlink Resource Block (RB) pair. This downlink RB pair is a unit for allocation of a downlink radio resource and the like and is based on the frequency band of a predefined width (RB bandwidth) and a time duration (two slots=one subframe). Each of the downlink RB pairs is constituted of two downlink RBs (RB bandwidth×slot) that are contiguous in the time domain. Each of the downlink RBs is constituted of 12 subcarriers in the frequency domain. In the time domain, the downlink RB is constituted of seven OFDM symbols when a normal cyclic prefix is added, while the downlink RB is constituted of six OFDM symbols when a cyclic prefix that is longer than the normal cyclic prefix is added. A region defined by a single subcarrier in the frequency domain and a single OFDM symbol in the time domain is referred to as "Resource Element (RE)". A Physical Downlink Control Channel is a physical channel on which downlink control information such as a terminal device identifier, Physical Downlink Shared Channel scheduling information, Physical Uplink Shared Channel scheduling information, a modulation scheme, a coding rate, and a retransmission parameter is transmitted. Note that, although a downlink subframe in a single Component Carrier (CC) is described here, a downlink subframe is defined for each CC and downlink subframes are approximately synchronized between CCs.

Note that Synchronization Signals, a Physical Broadcast Channel, or downlink Reference Signals (RSs) may be allocated in a downlink subframe (not illustrated). Examples of a downlink Reference Signal are a Cell-specific Reference Signal (CRS: Cell-specific RS), which is transmitted through the same transmission port as that for a PDCCH, a Channel State Information Reference Signal (CSI-RS), which is used to measure Channel State Information (CSI), a terminal-specific Reference Signal (URS: UE-specific RS)), which is transmitted through the same transmission port as that of one or some PDSCHs, and a Demodulation Reference Signal (DMRS: Demodulation RS), which is transmitted through the same transmission port as that for an EPDCCH. Moreover, carriers on which no CRS is mapped may be used. In this case, a similar signal (referred to as "enhanced Synchronization Signal") to a signal corresponding to one or some transmission ports (e.g., only transmission port 0) or all the transmission ports for the CRSs can be inserted into one or some subframes (e.g., the first and sixth subframes in the radio frame) as time and/or frequency tracking signals. Furthermore, a terminal-specific Reference Signal transmitted through the same transmission port as that for one or some PDSCHs may be referred to as "terminal-specific Reference Signal associated with the PDSCH" or "DMRS". Furthermore, a demodulation Reference Signal transmitted through the same transmission port as that for the EPDCCH may be referred to as "DMRS associated with the EPDCCH".

Note that a Discovery Signal (DS) may be allocated in the downlink subframes (not illustrated). A terminal may be set up (configured) with a discovery signals measurement timing configuration (DMTC) based on a parameter configured through RRC signalling. A DMTC Occasion corresponds to six milliseconds and is constituted of six consecutive subframes. Moreover, it is assumed that a DS is not transmitted in the terminal in a subframe other than the subframes of the DMTC Occasion.

Note that a Discovery Signal (DS) may be referred to as Discovery Reference Signal (DRS), may be referred to as initial signal, or may be referred to as Reservation Signal.

Note that a Discovery Signal (DS) may be included in an initial signal, and may be included in a Reservation Signal. Note that it is preferable that an initial signal and/or a Reservation Signal is transmitted in an LAA cell.

In a certain cell, a DS (DS Occasion) is constituted of a time duration (DS duration) of a prescribed number of consecutive subframes. The prescribed number is from one to five in FDD (Frame structure type 1), and from two to five in TDD (Frame structure type 2). The prescribed number is configured by RRC signalling. Furthermore, a DS duration or a configuration of a DS duration may be referred to as "Discovery signals measurement timing configuration (DMTC)". A terminal assumes that the DS is transmitted (mapped, generated) in each subframe configured by a parameter dmtc-Periodicity configured by RRC signalling. Furthermore, in a downlink subframe, the terminal assumes the presence of a DS constituted by including the following signals.

(1) A CRS of an antenna port 0 in a DwPTS of all downlink subframes and all special subframes in the DS duration.

(2) In FDD, a PSS in the first subframe of the DS duration. In TDD, a PSS in the second subframe of the DS duration.

(3) An SSS in the first subframe of the DS duration.

(4) A non-zero power CSI-RS in zero or more subframes in the DS duration. The non-zero power CSI-RS is configured by RRS signalling.

The terminal performs measurement based on a configured DS. The measurement is performed by using a CRS in the DS or by using a non-zero power CSI-RS in the DS. Furthermore, in a configuration relating to the DS, a plurality of non-zero power CSI-RSs can be configured.

The DS is transmitted from the base station device for the purpose of various applications such as time domain synchronization (time synchronization) in the downlink, frequency synchronization in the downlink, cell/transmission point identification, RSRP measurement, RSRQ measurement, RSSI measurement, measurement of geographic position of a terminal device 1 (UE Positioning), CSI measurement, and the like. The DS may be used for supporting an ON state and an OFF state of a base station device (an activation state and a deactivation state of a cell). The DS may be used by the terminal device to detect a base station device in an ON state and/or an OFF state (a cell in an activation state and/or a deactivation state). Note that a measurement associated with the RSRP measurement, RSRQ measurement, and/or RSSI measurement may be referred to as Radio Resource Management (RRM) measurement.

A DS is constituted of a PSS, an SSS, and a CRS, for an example. The PSS and the SSS included in the DS may be used for time synchronization, frequency synchronization, cell determination, and transmission point determination. The CRS included in the DS may be used for RSRP measurement, RSRQ measurement, and CSI measurement. To give another example, the DS is constituted of a PSS, an SSS, and a CSI-RS. The PSS and the SSS included in the DS may be used for time synchronization, frequency synchronization, cell identification, and transmission point identification. The CSI-RS included in the DS may be used for transmission point identification, RSRP measurement, RSRQ measurement, and CSI measurement. Note that a DS constituted of a plurality of signals may be referred to as Discovery burst. Note that a Reference Signal for performing RSRP measurement and/or RSRQ measurement may be referred to as DS.

The terminal performs measurement based on the configured DS. A signal (radio resource) having a different constitution may be used as the DS in accordance with the purpose. For example, a signal having a different constitution may be used between time domain and frequency domain synchronization, cell identification, and RRM measurement (RSRP, RSRQ, and/or RSSI measurement). That is, the terminal device 1 may use a first signal (first DS) to perform time domain and frequency domain synchronization, a second signal (second DS) to perform cell identification, and a third signal (third DS) to perform RSRP and/or RSRQ measurement. Furthermore, the first signal and the second signal may be used to perform time domain and frequency domain synchronization, as well as cell identification, and the third signal may be used to perform RRM measurement (RSRP, RSRQ, and/or RSSI measurement).

Note that in a cell requiring LBT (e.g., an LAA cell) and the like, it is preferable that the DS is transmitted based on the LBT. That is, before transmitting a DS by using a certain frequency (component carrier, cell), a certain base station or terminal identifies (detects, anticipates, determines) whether the frequency is in an idle state (available state, congested state, Presence, Occupied) or in a busy state (unavailable state, not congested state, Absence, Clear) by measuring (detecting) an interference power (interference signal, received power, reception signal, noise power, noise signal) and the like of the frequency. In a case of identifying, based on the LBT, that the frequency is in the idle state, the LAA cell can transmit the DS at a prescribed timing in the frequency. In a case of identifying, based on the LBT, that the frequency is in the busy state, the LAA cell does not transmit the DS at a prescribed timing in the frequency.

Note that in a case of the DS being transmitted based on LBT and the terminal device considering DS transmission in a subframe within a DMTC Occasion, it is preferable that the DS transmission is performed in a subframe within the DMTC Occasion. That is, it is preferable that the base station device performs LBT so that DS transmission becomes possible in the subframe within the DMTC Occasion.

Note that DS transmission not based on LBT may be referred to as Type 1 DS transmission, and DS transmission based on LBT may be referred to as Type 2 DS transmission. Note that DS transmission not based on LBT may be referred to as first DS transmission, and DS transmission based on LBT may be referred to as second DS transmission.

A DS and a DMTC in an LAA cell can be the same as a DS and a DMTC in FDD. For example, a DS duration in an LAA cell is, similarly to that in FDD, any one of one to five, and the first subframe of the DS duration includes a PSS. Note that a DS in an LAA cell may be constituted differently to a DS in a normal cell. For example, a DS in an LAA cell does not include a CRS. Furthermore, a DS in an LAA cell includes a PSS and an SSS capable of shifting in a frequency direction.

Moreover, in an LAA cell, a control signal and/or a control channel including control information can be transmitted in a subframe within a DS Occasion or a subframe within a DMTC Occasion. The control information can include information about the LAA cell. For example, the control information is information about a frequency, load, congestion, interference, transmit power, channel occupation time, and/or buffer state relating to transmission data in the LAA cell.

Furthermore, the control signal and/or the control channel can be demodulated or detected by a DMRS within the DS Occasion. That is, the control signal and/or the control channel is transmitted by an antenna port used for DMRS transmission within the DS Occasion. Specifically, the DMRS within the DS Occasion is a DMRS (Demodulation Reference Signal) associated with the control signal and/or the control channel, and can be constituted similarly to a DMRS associated with the PDSCH or the EPDCCH.

Moreover, a scramble sequence used for the DMRS associated with the control signal and/or the control channel may be generated differently to a scramble sequence used for the DMRS associated with the PDSCH or the EPDCCH. Here, a scramble sequence used for the DMRS is generated as an initial value calculated based on a slot number (subframe number), a first parameter, and a second parameter. For example, in the scramble sequence used for the DMRS associated with the PDSCH, the first parameter is a value configured by a cell identifier (cell ID) or a higher layer, and the second parameter is either 0 or 1, given by DCI. Furthermore, in a case of not being given by the DCI, the second parameter is fixed to 0. In the scramble sequence used for the DMRS associated with the EPDCCH, the first parameter is a value configured by a higher layer for each EPDCCH set, and the second parameter is fixed to 2.

In the scramble sequence used for the DMRS associated with the control signal and/or the control channel, the first parameter is a value configured by a higher layer, and is a cell identifier of the LAA cell or a cell identifier corresponding to a non-zero power CSI-RS within the DS Occasion. In the scramble sequence used for the DMRS associated with the control signal and/or the control channel, the second parameter is a value fixed to a prescribed value or a value configured by a higher layer. In the case of being fixed to a prescribed value, the second parameter is any value of 0, 1, and 2, similarly to the second parameter used in the scramble sequence used for the DMRS associated with the PDSCH or the EPDCCH, or is a value (e.g., 3) different from the second parameter used in the scramble sequence used for the DMRS associated with the PDSCH or the EPDCCH. In the case that the second parameter is configured by a higher layer, the second parameter can be configured with any value, for example, a value specific to an operator.

Furthermore, the control signal and/or the control channel can be demodulated or detected by a CRS within the DS Occasion. That is, the control signal and/or the control channel is transmitted by an antenna port used for CRS transmission within the DS Occasion. Note that a scramble sequence used for the CRS within the DS Occasion can be generated based on the first parameter and/or the second parameter described in the scramble sequence used for the DMRS associated with the control signal and/or the control channel.

Next, a measurement of a physical layer will be described in detail. The terminal device performs a measurement of a physical layer for reporting to the higher layer. The measurement of a physical layer includes measurement of: Reference Signal Received Power (RSRP), Received Signal Strength Indicator (RSSI), Reference Signal Received Quality (RSRQ), and the like. Note that a measurement associated with the RSRP measurement, RSRQ measurement, and/or RSSI measurement may be referred to as Radio Resource Management (RRM) measurement.

Next, details of RSRP will be described. RSRP is defined as received power of a Reference Signal. RSRQ is defined as received quality of a Reference Signal.

An example of RSRP will be described.

The RSRP is defined as a value obtained by linear-averaging power of Resource Elements in which a CRS is transmitted, the Resource Elements being included in a considered measurement frequency bandwidth. In determination of RSRP, a Resource Element to which the CRS of the antenna port 0 is mapped is used. In a case that a terminal device can detect a CRS of an antenna port 1, it is possible to use, in addition to a Resource Element to which the CRS of the antenna port 0 for RSRP determination is mapped (radio resource mapped to a Resource Element allocated to the antenna port 0), a Resource Element to which the CRS of the antenna port 1 is mapped (radio resource mapped to a Resource Element allocated to the antenna port 1). Hereinafter, RSRP calculated by using the Resource Element to which the CRS of the antenna port 0 is mapped, is referred to as CRS-based RSRP or first RSRP.

In a case of higher layers indicating a measurement based on the DS, the terminal device should measure RSRP in a subframe within a configured DS Occasion. In a case that the terminal device can detect the presence of a CRS in another subframe, the terminal device may further use the other subframe for determining RSRP. That is, the terminal device measures RSRP based on a CRS in a subframe within a configured DS Occasion. Furthermore, in a case that the terminal device can detect a CRS in a subframe out of a configured DS Occasion, the terminal device may measure RSRP, based on a CRS in a subframe within the DS Occasion and the CRS in a subframe out of the DS Occasion.

A reference point for RSRP should be an antenna connector for the terminal device. In a case of a receive diversity being used by the terminal device, a reported value should not be smaller than RSRP corresponding to any individual diversity branch. That is, in the case of a receive diversity being used by the terminal device, a reported value should be higher than RSRP corresponding to any individual diversity branch.

The terminal device measures RSRP of an intra-frequency cell and/or an inter-frequency cell in an RRC idle (RRC_IDLE) state. Here, the intra-frequency cell in the RRC idle state is a cell in the same frequency band as a cell in which the terminal device receives system information by broadcast. Here, the inter-frequency cell in the RRC idle state is a cell in a frequency band different from that of a cell in which the terminal device receives system information by broadcast.

The terminal device measures RSRP of the intra-frequency cell and/or the inter-frequency cell in an RRC connected (RRC_CONNECTED) state. Here, the intra-frequency cell in the RRC connected state is a cell in the same frequency band as a cell in which the terminal device receives system information by RRC signalling or broadcast. Here, the inter-frequency cell in the RRC connected state is a cell in a frequency band different from that of a cell in which the terminal device receives system information by RRC signalling or broadcast.

Note that the number of Resource Elements in the considered measurement frequency bandwidth and during a measurement period used by the terminal device for determining RSRP, depends on an implementation of a terminal device with limitation. Note that the limitation needs to satisfy a corresponding measurement accuracy requirement.

Note that power (electric power) of each Resource Element is determined from electric power received within an available portion of a symbol not including a CP.

Details of RSRQ will be described, below. RSRQ is defined by a ratio of the RSRP and RSSI and is used for the purpose similar to the signal-to-interference-plus-noise ratio (SINR) of a cell to be measured, the SINR being an indicator for communication quality. A combination of RSRP and RSSI in RSRQ is not limited to the following combination, however, in the present embodiment, a preferable combination of RSRP and RSSI in RSRQ will be described.

An example of RSRQ will be described.

RSRQ is defined as a ratio calculated by the expression N×RSRP/RSSI. In this expression, N is a Resource Block number corresponding to an RSSI measurement bandwidth; a numerator and a denominator of the RSRQ are constituted of a same set of Resource Blocks. In this expression, RSRP is the first RSRP. Hereinafter, RSRQ calculated by using RSRQ calculated using the first RSRP will be referred to as CRS-based RSRQ or first RSRQ.

RSSI (E-UTRA carrier RSSI) is constituted of a value obtained by linear-averaging total received power observed only from a certain (some) OFDM symbol(s) of a measurement subframe. In other words, the RSSI is constituted of a value obtained by linear-averaging total received power observed only from an OFDM symbol including a Reference Signal for the antenna port 0. In other words, the RSSI is constituted of a value obtained by linear-averaging total received power observed only from an OFDM symbol including a CRS of the antenna port 0 (a radio resource mapped to the antenna port 0). The RSSI is observed in a bandwidth of Resource Block number N. The total received power of the RSSI includes: power from a Serving cell and a non-Serving cell of the same channel, interference power from an adjacent channel, thermal noise power, and the like.

Unless the higher layers indicate otherwise, the RSSI is measured only from an OFDM symbol including a Reference Signal for the antenna port 0 of the measurement subframe. In a case of all OFDM symbols for performing the RSRQ measurement being indicated from the higher layer, the RSSI is measured from all OFDM symbols of a downlink portion of the measurement subframe. In a case of a certain (some) subframe(s) for performing the RSRQ measurement being indicated from the higher layer, the RSSI is measured from all OFDM symbols of a downlink portion of an indicated subframe.

In a case of the higher layer indicating a measurement based on a DS, the RSSI is measured from all OFDM symbols of a downlink portion in a subframe within a configured DS Occasion.

A reference point for the RSRQ should be an antenna connector for the terminal device. In a case of a receive diversity being used by the terminal device, a reported value should not be smaller than RSRQ corresponding to any individual diversity branch. That is, in the case of a receive diversity being used by the terminal device, a reported value should be higher than RSRQ corresponding to any individual diversity branch.

The terminal device measures RSRQ of the intra-frequency cell and/or the inter-frequency cell in the RRC idle state. The terminal device measures RSRQ of the intra-frequency cell and/or the inter-frequency cell in the RRC connected state.

An example of RSRP will be described.

The RSRP is defined as a value obtained by linear-averaging power of a Resource Element in which a CSI-RS configured for a DS measurement is transmitted, the Resource Element being included in a measurement frequency bandwidth considered in a subframe within a configured DS Occasion. In determination of RSRP, a Resource Element to which a CSI-RS of an antenna port 15 is mapped (radio resource mapped to a Resource Element allocated to the antenna port 15), is used. Hereinafter, RSRP calculated by using a Resource Element to which the CSI-RS of the antenna port 15 is mapped, is referred to as CSI Reference Signal Received Power (CSI-RSRP), CSI-RS based RSRP, or second RSRP.

Note that "RSRP" may be replaced by "CSI-RSRP", and "CSI-RSRP" may be replaced by "RSRP".

A reference point for the CSI-RSRP should be an antenna connector for the terminal device. In a case of a receive diversity being used by the terminal device, a reported value should not be smaller than CSI-RSRP corresponding to any individual diversity branch. That is, in the case of a receive diversity being used by the terminal device, the reported value should be higher than the CSI-RSRP corresponding to any individual diversity branch.

Based on a received Master Information Block (MIB) or system information block (SIB), the terminal device may measure CSI-RSRP of the intra-frequency cell and/or the inter-frequency cell in the RRC idle state. The terminal device measures CSI-RSRP of the intra-frequency cell and/or the inter-frequency cell in the RRC connected state.

Note that the number of Resource Elements in the considered measurement frequency bandwidth and during a measurement period used by the terminal device for determining CSI-RSRP, depends on the implementation of a terminal device with limitation. Note that the limitation needs to satisfy a corresponding measurement accuracy requirement.

Note that power (electric power) of each Resource Element is determined from electric power received within an available portion of symbols not including a CP.

A DS measurement bandwidth may be configured by using higher layer signalling.

In a cell in which the DS is transmitted based on LBT, it is preferable that, in the terminal device, RSRP and/or RSRQ and/or RSSI and/or CSI-RSRP and/or CSI-RSRQ and/or a CSI-RSSI is measured based on a CSI-RS and/or a CRS and/or a PSS and/or a SSS and/or a second SSS (synchronization signal transmitted by using a frequency and/or time different from a SSS of the related art) configured for the DS measurement included in the measurement frequency bandwidth considered in a subframe within a configured DS Occasion. Furthermore, report criteria evaluation is performed for the measured RSRP and/or RSRQ and/or RSSI and/or CSI-RSRP and/or CSI-RSRQ and/or CSI-RSSI, and the like. Subsequently, after deciding in the report criteria evaluation that reporting of a measurement value is required, the terminal device transmits measurement report information (a measurement report message) over a radio interface. Note that a report criteria configuration is provided by RRC signalling.

Note that in a cell requiring LBT (e.g., an LAA cell) and the like, it is preferable that the DS is transmitted based on LBT. In a case of the terminal device performing measurement in a physical layer based on the DS (RSRP measurement based on the DS, RSRQ measurement based on the DS, and/or RSSI measurement based on the DS, and the like), the DS may not be transmitted based on LBT in a subframe in which the DS is considered to be transmitted in the terminal device. That is, the DS may actually not be transmitted in a subframe in which the DS is considered to be transmitted in the terminal device. Note that it is preferable that a subframe in which the DS is considered to be transmitted in the terminal device is a subframe within a DMTC Occasion.

In a cell in which the DS is transmitted based on LBT, in a case that the terminal device performs measurement in the physical layer based on the DS (RSRP measurement based on the DS, and/or RSRQ measurement based on the DS, and/or RSSI measurement based on the DS, and the like), the terminal device cannot perform correct measurement by averaging a measurement result based on the DS actually transmitted in a subframe in which the DS is considered to be transmitted in the terminal device and a measurement result based on the DS actually not transmitted in a subframe in which the DS is considered to be transmitted in the terminal device. That is, the terminal device cannot perform measurement based on the actually transmitted DS. That is, the terminal device cannot perform RSRP measurement based only on the actually transmitted DS, and/or RSRQ measurement based only on the actually transmitted DS, and/or RSSI measurement based only on the actually transmitted DS.

Note that in a cell in which the DS is transmitted based on LBT, whether the DS is actually transmitted based on LBT may be notified to the terminal device. For example, actual transmission of the DS based on LBT may be explicitly notified to the terminal device. For example, the terminal device may be explicitly notified that the DS is actually not transmitted based on LBT. Note that notification indicating that the DS is actually transmitted and/or is actually not transmitted based on LBT is preferably performed by using a licensed cell (a cell that is not an LAA cell). Note that notification indicating that the DS is actually transmitted and/or is actually not transmitted based on LBT is preferably performed by using a cell different from the LAA cell associated with the DS transmission. Note that notification indicating that the DS is actually transmitted and/or is actually not transmitted based on LBT is preferably performed by using the LAA cell associated with the DS transmission. Note that notification indicating that the DS is actually transmitted and/or is actually not transmitted based on LBT is preferably performed by using a signal in the physical layer. Note that notification indicating that the DS is actually transmitted and/or is actually not transmitted based on LBT is preferably performed by using a subframe out of the DMTC occasion.

Furthermore, in a case of being notified that the DS is actually transmitted based on LBT, it is preferable to report a measurement result based on the DS to the higher layer (of the terminal device). Moreover, in a case of being notified that the DS is actually not transmitted based on LBT, it is preferable not to report the measurement result based on the DS to the higher layer (of the terminal device) and to discard the measurement result.

Furthermore, both the measurement result based on the DS in the case of being notified that the DS is actually transmitted based on LBT, and the measurement result based on the DS in the case of being notified that the DS is actually not transmitted based on LBT may be held and either one of the measurement results may be transmitted in accordance with a trigger of the measurement report.

Note that in a cell in which the DS is transmitted based on LBT, the terminal device may be notified of whether the DS is actually transmitted based on LBT.

Note that in a cell in which the DS is transmitted based on LBT, the terminal device may determine whether the DS is actually transmitted based on LBT. For example, the terminal device performs measurement based on the DS in the physical layer (measurement of a power level of a Resource Element with which the DS is considered to be transmitted, and/or RSRP measurement based on the DS described later, RSRQ measurement based on the DS, RSSI measurement based on the DS, and the like), compares a measurement result with a threshold value, and in a case of the measurement result exceeding the threshold value, it is preferable that the terminal device determines that the DS is actually transmitted based on LBT.

Furthermore, in a case of determining that the DS is actually transmitted based on LBT, it is preferable to report the measurement result based on the DS to the higher layer (of the terminal device). Moreover, in a case of determining that the DS is actually not transmitted based on LBT, it is preferable not to report the measurement result based on the DS to the higher layer (of the terminal device) and to discard the measurement result. Note that it is preferable that a threshold value is notified to (configured for) the terminal device by higher layer signalling or physical layer signalling.

Furthermore, both the measurement result based on the DS in the case of determining that the DS is actually transmitted based on LBT, and the measurement result based on the DS in the case of determining that the DS is actually not transmitted based on LBT may be held and, in accordance with the trigger of the measurement report, either one of the measurement results or a value calculated based on either one of the measurement results may be transmitted.

Next, a scheme for reporting, to the higher layer, a measurement value measured by the terminal device will be described.

Figure 11:
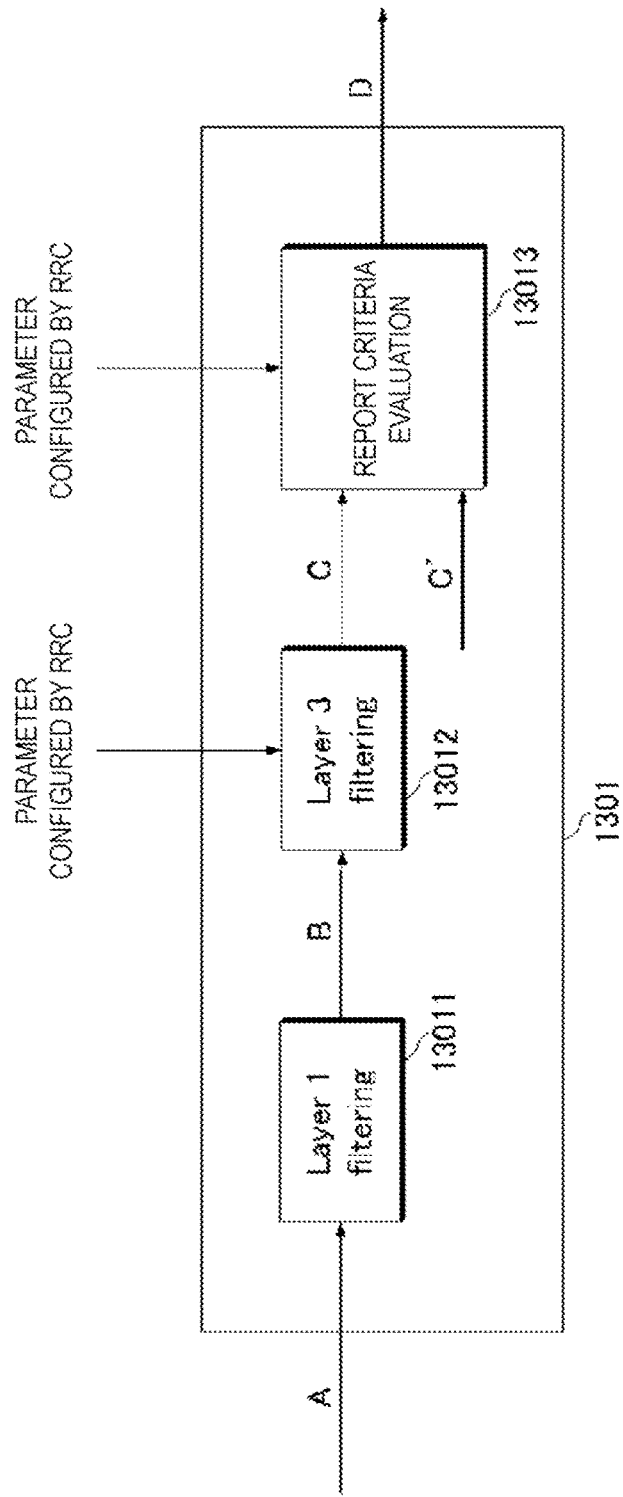
FIG. 11 is a diagram illustrating an example of a measurement model according to the present embodiment.

A measurement model will be described. FIG. 11 is a diagram illustrating an example of the measurement model.

A measurement unit 1301 may be constituted by including a first layer filtering unit 13011, a third layer filtering unit 13012, and a report criteria evaluation unit 13013. Note that the measurement unit 1301 may be constituted by including some functions of a reception unit 105 and a higher layer processing unit 101. Specifically, a constitution may be such that the first layer filtering unit 13011 is included in the reception unit 105, and the third layer filtering unit 13012 and the report criteria evaluation unit 13013 are included in the higher layer processing unit 101.

A measurement value (sample) input from the physical layer is filtered by the first layer filtering (Layer 1 filtering) unit 13011. The first layer filtering unit 13011 may apply, for example, an average of a plurality of input values, a weighted average, an average following a channel characteristic, and the like, to apply another filtering method. A measurement value reported from the first layer is input into a third layer after the first layer filtering unit 13011. The measurement value input into the third layer filtering (Layer 3 filtering) unit 13012 is filtered. A configuration of the third layer filtering is provided by RRC signalling. An interval with which the measurement value is filtered and reported in the third layer filtering unit 13012 is the same as an input measurement interval. In the report criteria evaluation unit 13013, it is examined whether reporting of the measurement value is actually required. The evaluation is based on one or more measurement flow(s). For example, the evaluation may be based on a comparison between different measurement values. The terminal device evaluates the report criteria at least each time a new measurement result is reported. The report criteria configuration is provided by RRC signalling. After deciding in the report criteria evaluation that reporting of the measurement value is required, the terminal device transmits the measurement report information (measurement report message) over a radio interface.

A measurement result output from the first layer filtering unit 13011 (i.e., the physical layer) undergoes filtering using Math. 1 when passing the third layer filtering unit 13012 (i.e., before being used in the report criteria evaluation or the measurement report).

$$F_n = (1-\alpha) \times F_{n-1} + \alpha \times M_n \quad \text{Math. 1}$$

In this equation, $M_n$ is the latest received measurement result from the physical layer (i.e., a measurement result at a point B in FIG. 11). Furthermore, $F_n$ is an updated and filtered measurement result to be used in the report criteria evaluation or the measurement report (i.e., a measurement result at a point C or C' in FIG. 11). Moreover, $F_{n-1}$ is a previously filtered measurement result (i.e., a measurement result at the point C or C' in FIG. 11, measured previously (specifically, at an n–1-th measurement time among last n measurements including the current measurement)). Note that $F_0$ is set with an $M_1$ obtained when the first measurement result is received from the physical layer. Furthermore, $\alpha$ is a parameter indicating a ratio of a past measurement result and the latest measurement result in calculating $F_n$ and is expressed by $\alpha = 1/2^{(k/4)}$. Note that k is a filtering coefficient (such as filterCoefficientRSRP, filterCoefficientRSRQ, and filterCoefficientCSI-RSRP) for a corresponding measurement amount, (configured as a higher layer parameter and) received by a physical quantity configuration. For example, at the point C or C' in FIG. 11, a filtering coefficient relating to RSRP (filterCoefficientRSRP) is applied in order to obtain an RSRP measurement result. Furthermore, at point C or C' in FIG. 11, a filtering coefficient relating to RSRQ (filterCoefficientRSRQ) is applied in order to obtain an RSRQ measurement result. That is, an applied filtering coefficient may vary according to the type of measurement. However, in a case that no corresponding filtering coefficient is configured via higher layer signalling, the terminal device may obtain the measurement result at the point C or C' in FIG. 11 by using a default value. Note that a filtering coefficient applied in the third layer filtering unit 13012 may be referred to as third layer filtering coefficient.

By applying a filter, the terminal device maintains a temporal characteristic even for different input intervals. For the filter coefficient k, a sample interval equal to 200 ms is assumed.

In a case of k being set to 0, third layer filtering is not applied. That is, in the case of k being set to 0, the terminal device may not obtain a measurement result for which the third layer filtering is applied.

The filtering is performed in the same domain as a domain used for report criteria evaluation or measurement reporting. For example, for a measurement having a logarithmic characteristic, a filtering having a logarithmic characteristic may be applied.

An interval for input into the filter can be freely configured (i.e., may depend on implementation).

In a case of $M_n$ and $F_{n-1}$ being measurement results by different measurement methods, $F_{n-1}$ may be reset when obtaining $F_n$. For example, in a case of $F_{n-1}$ being an RSRP measurement result for a CRS, and $M_n$ being an RSRP measurement result for a CSI-RS, and the like, $F_{n-1}$ may be reset in a case that an object to be measured is changed. That is, only $M_n$ may be applied to $F_n$ (i.e., $F_n = M_n$).

The third layer filtering coefficient is specified by using a physical quantity configuration (quantityConfig). The third layer filtering coefficient is used for prescribing a ratio (rate) of the latest measurement result and a past filtering measurement result (i.e., is used for calculating a). Note that the third layer filtering may simply be referred to as filtering.

Next, an example of a method of configuring a third layer filtering coefficient (L3 filtering coefficient) according to the present embodiment will be described.

It is preferable that various third layer filtering coefficients corresponding to each of the measurements are included in a physical quantity configuration (quantityConfig).

It is preferable that a first physical quantity configuration for EUTRA (quantityConfigEUTRA) is included in the physical quantity configuration. It is preferable that a filtering coefficient used for RSRP measurement based on the CRS (filterCoefficientRSRP) and a filtering coefficient used for RSRQ measurement based on the CRS (filterCoefficientRSRQ) are included in the first physical quantity configuration for EUTRA. Note that it is preferable that a default value (e.g., fc 4) is set for the filtering coefficient included in the first physical quantity configuration for EUTRA.

A second physical quantity configuration for EUTRA (quantityConfigEUTRA-v12) may be included in the physical quantity configuration. It is preferable that a filtering coefficient used for RSRP measurement based on the CSI-RS (filterCoefficientCSI-RSRP) is included in the second physical quantity configuration for EUTRA.

In a case that a third physical quantity configuration for EUTRA (quantityConfigEUTRA-v13 or quantityConfigEUTRA-U) is further included in the physical quantity configuration, the physical quantity configuration may include at least one of a filtering coefficient used for RSRP measurement based on the CRS, separately from the first physical quantity configuration and second physical quantity configuration for EUTRA, a filtering coefficient used for RSRQ measurement based on the CRS, a filtering coefficient used for RSRP measurement based on the CSI-RS, a filtering coefficient used for RSRQ measurement based on the CSI-RS, and a filtering coefficient used for RSSI measurement. Note that it is preferable that a default value of the filtering coefficient included in the third physical quantity configuration for EUTRA is set to "0 (or fc 0)".

Note that the second physical quantity configuration and third physical quantity configuration for EUTRA are optionally addable configurations. For example, the configurations are parameters configured for the terminal device in a case of the base station device being notified that the terminal device has a specific function (capability).

Note that the third physical quantity configuration for EUTRA may include an identifier (quantityConfigId) corresponding to the third physical quantity configuration. In a case that a plurality of third physical quantity configurations are configured, a plurality of identifiers may be configured. The identifier corresponding to the third physical quantity configuration may be linked to an identifier corresponding to a measurement configuration (measId), an identifier corresponding to a measurement object configuration (measObjectId), and an identifier corresponding to a reporting configuration (reportConfigId). That is, a filtering coefficient corresponding to the third physical quantity configuration identifier may be applied to a measurement result corresponding to the corresponding measurement object configuration identifier and the reporting configuration identifier. Note that each of the measurement configuration, the measurement object configuration, and the report configuration is configured for EUTRA.

Furthermore, the third physical quantity configuration for EUTRA may be included in the measurement object configuration. That is, the filtering coefficient included in the third physical quantity configuration may only be applied to a measurement result in a carrier frequency included in the measurement object configuration.

Note that, in a case of the third physical quantity configuration for EUTRA being included in the measurement object configuration, filtering coefficients may be configured for a detected cell, and/or a cell listed in a neighbour cell list, and/or a cell listed in a black list. For example, for cells listed in a list, a common filtering coefficient may be configured for the list, or a filtering coefficient may be configured for each cell listed in the list.

Furthermore, in the case of the third physical quantity configuration for EUTRA being included in the measurement object configuration, information about the filtering coefficient may be listed in a list. Each of the listed pieces of information about the filtering coefficient may be linked to a physical layer cell identifier and a cell index included in the cell list.

In the case of the third physical quantity configuration for EUTRA being included in the physical quantity configuration, the filtering coefficient including the third physical quantity configuration may only be applied to a measurement result for a measurement object configuration configured with a prescribed frequency. For example, in a case of the prescribed frequency belonging to an unlicensed band or an LAA band, the filtering coefficient may only be applied to a measurement result for a measurement object including the prescribed frequency. It is preferable that the filtering coefficient included in the third physical quantity configuration is not applied to a measurement result corresponding to a measurement object in a frequency other than the prescribed frequency. In this case, it is preferable that a filtering coefficient included in the first physical quantity configuration and/or second physical quantity configuration for EUTRA is applied to the measurement result corresponding to the measurement object in a carrier frequency other than the prescribed frequency. Note that, in a case that the filtering coefficient is not configured in each physical quantity configuration, the terminal device may apply filtering, in each frequency, to the measurement result, based on an individually configured default value.

Note that the prescribed frequency is preferably a frequency used in an LAA cell. Note that the prescribed frequency is preferably a frequency of a cell in which a DS is transmitted based on LBT. Note that the prescribed frequency is preferably a frequency of a cell operated in an unlicensed band. Note that the prescribed frequency is preferably a frequency of an operating band corresponding to a prescribed index of the operating band. Note that the prescribed frequency is preferably a frequency of an operating band corresponding to an index of an LAA operating band. Note that the above-mentioned prescribed frequency is preferably an operating band corresponding to a prescribed index of the operating band (E-UTRA operating band). For example, it is preferable that the operating band is managed by a table. A corresponding index is given to each operating band managed by a table. A corresponding uplink operating band, downlink operating band, and duplex mode are linked to the index. Note that the uplink operating band is used for reception by a base station device and transmission by a terminal device. The downlink operating band is used for transmission by a base station device and reception by a terminal device. Note that it is preferable that each of the uplink operating band and the downlink operating band is given by a lower limit frequency and an upper limit frequency (a corresponding frequency band). Note that it is preferable that the duplex mode is given as TDD or FDD. Note that a duplex mode in an LAA cell may be other than TDD and FDD. For example, the duplex mode in an LAA cell may be a later-described transmission burst (including at least a downlink burst and optionally an uplink burst).

For example, in a case of operating bands being managed by a table, operating bands corresponding to index "1" to index "44" are preferably licensed bands (not LAA bands), and operating bands corresponding to index "252" to index "255" are preferably unlicensed bands (LAA bands). Note that it is preferable that the uplink operating band is not applied (n/a, not applicable), from 5150 MHz to 5250 Hz are applied to the downlink operating band, and FDD is applied to the duplex mode, in the index "252". Furthermore, it is preferable that the uplink operating band is reserved (reserved for later use), and the downlink operating band is reserved, and that FDD is applied to the duplex mode, in the index "253". Moreover, it is preferable that the uplink operating band is reserved (reserved for later use), and downlink operating band is reserved, and that FDD is applied to the duplex mode, in the index "254". Note that it is preferable that an uplink operating band is not applied (n/a, not applicable), from 5725 MHz to 5850 Hz are applied to the downlink operating band, and FDD is applied to the duplex mode, in the index "255". Note that the from 5150 MHz to 5250 Hz and from 5725 MHz to 5850 Hz bands are preferably unlicensed bands (LAA bands). That is, the above-mentioned prescribed frequency is preferably an operating band corresponding to the index "252" to index "255".

Note that, in a case that a band combination for carrier aggregation is given by a table, it is preferable that the filtering coefficient included in the third physical quantity configuration for EUTRA is only applied to a measurement of a frequency corresponding to an index of an operating band which corresponds to an LAA band among a plurality of aggregated operating bands.

Note that in the present embodiment, the quantityConfigE-UTRA may be referred to as first higher layer parameter. Note that the quantityConfigE-UTRA may be referred to as (first) higher layer parameter of the related art. Note that the quantityConfigE-UTRA-v12 may be referred to as second higher layer parameter. Note that the quantityConfigE-UTRA-v12 may be referred to as (second) higher layer parameter of the related art. Note that a filtering coefficient specified by the quantityConfigE-UTRA may be referred to as first filtering coefficient. Note that the filtering coefficient specified by the quantityConfigE-UTRA may be referred to as filtering coefficient of the related art. Note that a filtering coefficient specified by the quantityConfigE-UTRA-v13 may be referred to as second filtering coefficient. Note that the filtering coefficient specified by the quantityConfigE-UTRA-v13 may be referred to as new filtering coefficient.

In other words, it is preferable to use different filtering coefficients between a measurement (measurement for RSRP and/or RSRQ and/or RSSI and/or CSI-RSRP and/or CSI-RSRQ and/or CSI-RSSI) in a frequency for a licensed band and a measurement (measurement for RSRP and/or RSRQ and/or RSSI and/or CSI-RSRP and/or CSI-RSRQ and/or CSI-RSSI) in a frequency for an unlicensed band (the LAA band). That is, it is preferable that a filtering coefficient of the measurement in the frequency for the licensed band and a filtering coefficient of the measurement in the frequency for the unlicensed band (the LAA band) are independently configured by the higher layer.

Note that a plurality of filtering coefficients may be configured in the terminal device for the measurement in one frequency (or band), and a filtering coefficient to be applied for each measurement in the frequency (or the band) may be instructed (specified) by signalling from the base station. For example, a first filtering coefficient and a second filtering coefficient may be configured for the terminal device for a measurement in a first frequency (or a first band), and either one of the first filtering coefficient or the second filtering coefficient to be applied for the measurement in the first frequency (or the first band) may be instructed by higher layer signalling. Note that either filtering coefficient to be used may be instructed using a physical layer signal (e.g., the PDCCH/EPDCCH).

Note that a plurality of filtering coefficients may be configured for the terminal device for the measurement in one frequency (or band), and a filtering coefficient to be applied for each measurement in the frequency (or the band) may be determined (decided, selected) by the terminal device. For example, a first filtering coefficient and a second filtering coefficient may be configured for the terminal device for a measurement in a first frequency (or a first band), and either one of the first filtering coefficient or the second filtering coefficient to be applied to the measurement in the first frequency (or the first band) may be instructed based on the information associated with an indication whether the DS is transmitted. Note that in a case of determining, based on the information associated to the indication of whether the DS is transmitted, that the DS is actually transmitted, it is preferable that the first filtering coefficient is used. In a case of determining, based on the information associated to the indication of whether the DS is transmitted, that the DS is actually not transmitted, it is preferable that the second filtering coefficient is used. Note that the information associated with the indication of whether the DS is transmitted may be information explicitly notified from the base station device or may be information acquired by the terminal device by comparing a received power of the DS to a prescribed threshold value.

Note that it is preferable that the first filtering coefficient is applied to a plurality of measurement objects corresponding to the first frequency and that the second filtering coefficient is applied to a plurality of measurement objects corresponding to the second frequency. In other words, it is preferable that the first filtering coefficient is applied to a plurality of measurement objects corresponding to a measurement associated with the first frequency and that the second filtering coefficient is applied to a plurality of measurement objects corresponding to a measurement associated with the second frequency. For example, it is preferable that the first filtering coefficient is applied to a plurality of measurement objects corresponding to a frequency of a certain licensed band and that the second filtering coefficient is applied to a plurality of measurement objects corresponding to a frequency of a certain LAA band.

Furthermore, in a case of the third physical quantity configuration for EUTRA being included in a DS measurement configuration, a filtering coefficient included in the third physical quantity configuration may only be applied to a measurement result based on the corresponding DS.

Moreover, in a case of the third physical quantity configuration for EUTRA being included in a CSI-RS configuration in the DS measurement configuration, the filtering coefficient included in the third physical quantity configuration may only be applied to a measurement result based on the corresponding CSI-RS.

For all measurements except for a measurement associated with a frequency of the LAA band, the terminal device may apply third layer filtering before using the measurement result for evaluating the report criteria (reporting criteria). On the other hand, for the measurement associated with the frequency of the LAA band, it is preferable that the terminal device does not apply third layer filtering before using the measurement result for evaluating the report criteria (reporting criteria).

Note that it is preferable that "not applying third layer filtering (Layer 3 filtering)" is the same as a case in which "0" is configured as the third layer filtering coefficient for the measurement. For example, even in a case of any third layer filtering coefficient being configured for the terminal device, the terminal device configures "0" as the third layer filtering coefficient for the measurement, regardless of the above-mentioned configuration. Note that it is preferable that "not applying third layer filtering" means that an output based only on the latest measurement result from the physical layer is an output after application of the filter. Note that it is preferable that "not applying third layer filtering" means that an output not based on an old (previous), filtered measurement result is the output after application of the filter.

In other words, it is preferable that the terminal device assumes that "0" is configured as the third layer filtering coefficient for a measurement associated with a prescribed frequency. For example, it is preferable that the terminal device assumes that "0" is configured as the filtering coefficient for the measurement associated with the frequency of the LAA band.

Note that it is preferable that the filtering coefficient is only applicable to a band except for a prescribed band (prescribed frequency). In other words, it is preferable that filtering is not applied to the prescribed band. Note that, in the present embodiment, "filtering not being applied" includes at least that "the terminal device assumes that k is set to '0'".

Furthermore, in a case of a third physical quantity configuration for EUTRA being included in the report configuration, the filtering coefficient included in the third physical quantity configuration may only be applied when reporting a measurement result corresponding to the report configuration. Moreover, in the case of the third physical quantity configuration for EUTRA being included in the report configuration, the configuration may be associated with an event triggering criteria. That is, the filtering coefficient included in the third physical quantity configuration may only be applied to a specific event.

Note that it is preferable that configuration associated with a measurement and/or a report is performed by the higher layer. In other words, it is preferable that the terminal device is configured with a configuration associated with the measurement and/or the report, based on a signal from the higher layer. In other words, it is preferable that a parameter (information) associated with the measurement and/or the report is configured by the higher layer processing unit (higher layer treatment unit) of the terminal device.

Next, a measurement will be described. The base station device uses an RRC Connection Reconfiguration message of RRC signalling (a Radio Resource Control signal) to transmit a Measurement configuration message to the terminal device. In addition to configuring system information included in the Measurement configuration message, the terminal device performs, in accordance with the notified system information, measurement, event evaluation, and measurement reporting for the Serving cell and the neighbour cell (including a listed cell and/or a detected cell). The listed cell is a cell listed in the Measurement object (a cell notified to the terminal device from the base station device in the neighbour cell list). The detected cell is a cell detected by the terminal device in a frequency indicated by the Measurement object, and not listed in the Measurement object (a cell detected by the terminal device, not notified in the neighbour cell list).

The measurements include three types of measurements (intra-frequency measurements, inter-frequency measurements, and inter-Radio Access Technology measurements (inter-RAT measurements)). The intra-frequency measurements are measurements in a downlink frequency of the Serving cell. The inter-frequency measurements are measurements in a frequency different from the downlink frequency of the Serving cell. Inter-Radio Access Technology measurements (inter-RAT measurements) are measurements in a radio technology (e.g., UTRA, GERAN, CDMA2000, and the like) different from a radio technology of the Serving cell (e.g., EUTRA).

The Measurement configuration message includes a measurement identifier (measId), Measurement objects, an addition and/or modification and/or deletion of a configuration of Reporting configurations, a physical quantity configuration (quantityConfig), a measurement gap configuration (measGapConfig), a serving cell quality threshold value (s-Measure), and the like.

The measurement gap configuration (measGapConfig) is utilized for controlling a configuration of a measurement gap pattern and Activation/Deactivation of the measurement gap. In the measurement gap configuration (measGapConfig), a gap pattern, a start system frame number (startSFN), and a start subframe number (startSubframeNumber) are notified as information in a case that the measurement gap is being activated. The gap pattern prescribes a pattern to be used as the measurement gap. The start system frame number (startSFN) prescribes a system frame number (SFN) starting the measurement gap. The start subframe number (startSubframeNumber) prescribes a subframe number starting the measurement gap.

In a case that no uplink/downlink transmission is scheduled, the measurement gap is a duration (time, subframe) which may be utilized by the terminal device to perform a measurement.

The serving cell quality threshold value (s-Measure) expresses a threshold value for a serving cell quality and is utilized for controlling whether the terminal device needs to perform a measurement. The serving cell quality threshold value (s-Measure) is configured as a value for the RSRP.

Here, the measurement identifier (measId) is utilized for linking the Measurement objects to the Reporting configurations, specifically, for linking a measurement object identifier (measObjectId) to the reporting configuration identifier (reportConfigId). In the measurement identifier (measId), one measurement object identifier (measObjectId) and one reporting configuration identifier (reportConfigId) are associated. The Measurement configuration message can add/modify/delete a relationship between the measurement identifier (measId), the Measurement objects, and the Reporting configurations.

A measObjectToRemoveList is a command for deleting a specified measurement object identifier (measObjectId) and Measurement objects corresponding to the specified measurement object identifier (measObjectId). In this case, all measurement identifiers (measIds) associated with the specified measurement object identifier (measObjectId) are deleted. By the command, it is possible to simultaneously specify a plurality of measurement object identifiers (measObjectIds).

A measObjectToAddModifyList (which may be alternatively referred to as measObjectToAddModList) is a command for modifying specified measurement object identifiers (measObjectIds) into specified Measurement objects, or adding the specified measurement object identifiers (measObjectIds) and the specified Measurement objects. By the command, it is possible to simultaneously specify a plurality of measurement object identifiers (measObjectIds).

A reportConfigToRemoveList is a command for deleting a specified reporting configuration identifier (reportConfigId) and Reporting configurations corresponding to the specified reporting configuration identifier (reportConfigId). In this case, all measurement identifiers (measIds) associated with the specified reporting configuration identifier (reportConfigId) are deleted. By the command, it is possible to simultaneously specify a plurality of reporting configuration identifiers (reportConfigIds).

A measIdToRemoveList is a command for deleting a specified measurement identifier (measId). In this case, a measurement object identifier (measObjectId) and a reporting configuration identifier (reportConfigId) associated with the specified measurement identifier (measId) are maintained and not deleted. By the command, it is possible to simultaneously specify a plurality of measurement identifiers (measIds).

A measIdToAddModifyList is a command for modifying to associate a specified measurement identifier (measId) with a specified measurement object identifier (measObjectId) and with a specified reporting configuration identifier (reportConfigId), or for associating a specified measurement object identifier (measObjectId) and a specified reporting configuration identifier (reportConfigId) with a specified measurement identifier (measId) and adding the specified measurement identifier (measId). By this command, a plurality of measurement identifiers (measIds) can be simultaneously specified.

The Measurement objects are prescribed for each Radio Access Technology (RAT) and frequency. Furthermore, the Reporting configurations have prescriptions for EUTRA and prescriptions for a RAT other than EUTRA.

The Measurement objects include measurement object EUTRA (measObjectEUTRA) associated with the measurement object identifier (measObjectId), and the like.

Note that, in a case that configuration for a plurality of Measurement objects is performed in one frequency, a plurality of Measurement objects are configured for the one frequency. In other words, in the case that configuration for a plurality of measurement objects is performed in one frequency, a plurality of Measurement objects corresponding to the one frequency are configured. Note that, in the case that configuration for a plurality of measurement objects is performed in one frequency, a plurality of Measurement objects are configured for a plurality of measurements corresponding to the one frequency. In other words, a common frequency may be configured for the plurality of Measurement objects. In other words, the same EUTRA carrier frequency information (eutra-CarrierInfo or carrierFreq) may be configured for the plurality of Measurement objects.

The measurement object identifier (measObjectId) is used for identifying a configuration of the Measurement objects. The configuration of the Measurement objects is prescribed for each Radio Access Technology (RAT) and frequency, as mentioned above. The Measurement objects are specified separately for EUTRA, UTRA, GERAN, and CDMA2000. Measurement objects for EUTRA, or measurement object EUTRAs (measObjectEUTRAs), prescribe information applied to a neighbour cell in EUTRA. Furthermore, some measurement object EUTRAs (measObjectEUTRA) with different frequencies are treated as different Measurement objects, and are assigned with measurement object identifiers (measObjectIds) separately.

An example of measurement object information will be described.

The measurement object EUTRA (measObjectEUTRA) includes carrier frequency information (eutra-CarrierInfo or carrierFreq), a measurement bandwidth (measurementBandwidth), antenna port 1 presence information (presenceAntennaPort1), an offset frequency (offsetFreq), information about a neighbour cell list (neighbourcell list), and information about a black list.

Next, information included in the measurement object EUTRA (measObjectEUTRA) will be described. The EUTRA carrier frequency information (eutra-CarrierInfo) specifies a carrier frequency to be measured. The measurement bandwidth (measurementBandwidth) indicates a common measurement bandwidth to all neighbour cells operating in the carrier frequency to be measured. The antenna port 1 presence information (presenceAntennaPort1) indicates whether the antenna port 1 is used in a cell to be measured. The offset frequency (offsetFreq) indicates a measurement offset value to be applied in a frequency to be measured. Note that the offset frequency (offsetFreq) is a power offset value in a carrier frequency to be measured, and is given in decibel.

An example of measurement object information will be described.

The terminal device performs the following operation in a case that an entry accompanying a measurement object identifier (measObjectId) adapted to each measurement object identifier (measObjectId) included in a received measObjectToAddModList (to each measurement object identifier (measObjectId) included in the received measObjectToAddModList), is present in a measurement object list (measObjectList) within a higher layer parameter (VarMeasConfig) for the entry.

In a case of the received measurement object (measObject) including the DS measurement configuration (measDS-Config), in a case of the DS measurement configuration (measDS-Config) being set to "setup", and in a case of the received DS measurement configuration (measDS-Config) including a measCSI-RS-ToRemoveList, an entry accompanying an adopted measCSI-RS-Id from a measCSI-RS-ToAddModList for each measCSI-RS-Id included in the measCSI-RS-ToRemoveList is deleted.

In the case of the received measurement object (measObject) including the DS measurement configuration (measDS-Config), in the case of the DS measurement configuration (measDS-Config) being set to "setup", in a case of the received DS measurement configuration (measDS-Config) including a measCSI-RS-ToAddModList, and in a case of an entry accompanying an adopted measCSI-RS-Id for each measCSI-RS-Id value included in the measCSI-RS-ToAddModList being present in the measCSI-RS-ToAddModList, the entry is replaced with an entry accompanying a value received for the measCSI-RS-Id.

In the case of the received measurement object (measObject) including the DS measurement configuration (measDS-Config), in the case of the DS measurement configuration (measDS-Config) being set to "setup", in the case of the received DS measurement configuration (measDS-Config) including the measCSI-RS-ToAddModList, and in a case of the entry accompanying the adopted measCSI-RS-Id for each measCSI-RS-Id value included in the measCSI-RS-ToAddModList not being present (not existing) in the measCSI-RS-ToAddModList, a new entry for the received measCSI-RS-Id is added to the measCSI-RS-ToAddModList.

In the case of the received measurement object (measObject) including the DS measurement configuration (measDS-Config), and in the case of the DS measurement configuration (measDS-Config) being set to "setup", a received field value is set in another field of the DS measurement configuration (measDS-Config) within the higher layer parameter (VarMeasConfig). That is, in the case of the received measurement object (measObject) including the DS measurement configuration (measDS-Config), and in the case of the DS measurement configuration (measDS-Config) being set to "setup", it is preferable that the field value of the DS measurement configuration (measDS-Config) within the higher layer parameter (VarMeasConfig) is updated.

In the case of the received measurement object (measObject) including the DS measurement configuration (measDS-Config), and in the case of the DS measurement configuration (measDS-Config) being set to "setup", it is preferable that a DS measurement timing configuration (DMTC, discovery signals measurement timing configuration) procedure is performed.

In a case of the received measurement object (measObject) not including the DS measurement configuration (measDS-Config), it is preferable that measurement is performed based on the CRS. In other words, in the case of the received measurement object (measObject) including the DS measurement configuration (measDS-Config), it is preferable that measurement is performed based on the DS.

That is, it is preferable that the first filtering coefficient is applied in the case that the received measurement object (measObject) does not include the DS measurement configuration (measDS-Config), and that the second filtering coefficient included in the DS measurement configuration (measDS-Config) is applied in the case that the received measurement object (measObject) includes the DS measurement configuration (measDS-Config). Note that it is preferable that the first filtering coefficient is specified by the physical quantity configuration (quantifyConfig). Note that it is preferable that the first filtering coefficient is configured as a default value.

An example of a DS measurement timing configuration (DMTC, discovery signals measurement timing configuration) will be described.

The terminal device should set up the DS measurement timing configuration in accordance with a received message (dmtc-PeriodOffset). For example, the first subframe of each DMTC occasion is generated at a system frame number and a subframe number of a PCell satisfying a condition described below. Note that the dmtc-PeriodOffset indicates a DMTC period (dmtc-Periodicity) and a DMTC offset (dmtc-offset). Note that it is preferable that the dmtc-PeriodOffset is configured for a frequency. That is, it is preferable that the dmtc-PeriodOffset is configured for each carrier frequency. It is preferable that a DMTC period (dmtc-Periodicity) value corresponds to 40 ms, 80 ms, 160 ms, and the like. Note that it is preferable that the DMTC offset (dmtc-offset) is given by a subframe number. It is preferable that a duration of the DMTC occasion is a prescribed time. For example, it is preferable that the duration of the DMTC occasion is 6 ms.

An example of a condition for the first subframe of each DMTC occasion will be described. A system frame number in which a remainder obtained by dividing the system frame number by T corresponds FLOOR (dmtc-PeriodOffset/10) is a system frame number of a system frame in which the first subframe of the DMTC occasion is generated. Furthermore, a subframe number corresponding to a remainder obtained by dividing a dmtc-PeriodOffset in the system frame by 10 (dmtc-PeriodOffset mod 10) is a subframe number of a subframe in which the first subframe of the DMTC occasion is generated. Note that T is given by dmtc-Periodicity/10. Note that FLOOR ( ) is a floor function. Note that it is preferable that the system frame number and the subframe number are based on a PCell. That is, it is preferable that the terminal device specifies the first subframe of each DMTC occasion in a PCell and or SCell based on a system number and a subframe number of the PCell specified based on the above-mentioned condition.

Note that, in a corresponding (associated) frequency, the terminal device should consider DS transmission in a subframe out of the DMTC occasion. That is, the terminal device should consider DS transmission in a subframe within the DMTC occasion. That is, it is preferable that the base station device performs DS transmission in a subframe within the DMTC occasion. That is, it is preferable that the base station device does not perform DS transmission in a subframe out of the DMTC occasion.

Furthermore, the DS measurement configuration (measDS-Config) may include an individual CSI-RS offset (csi-RS-IndividualOffset), a DS occasion duration (ds-OccasionDuration), a measurement CSI-RS addition modification list (measCSI-RS-ToAddModList), a measurement CSI-RS removal list (measCSI-RS-ToRemoveModList), a physical cell ID (phyCellId), a resource configuration (resourceConfig), a scrambling identifier (scramblingIdentity), and a subframe offset (subframeOffset). Note that the individual CSI-RS offset (csi-RS-IndividualOffset) is a power offset value applied to a specific CSI-RS resource and is given as a decibel value. Note that a DMTC period offset (dmtc-PeriodOffset) indicates a DMTC period and offset for the frequency. Note that the DS occasion duration (ds-OccasionDuration) indicates a duration of the DS occasion for the frequency. The DS Occasion duration is common to DS transmission in all cells on one frequency. Note that the measurement CSI-RS addition modification list (measCSI-RS-ToAddModList) is a list for adding/modifying a CSI-RS resource for the DS measurement. Note that the measurement CSI-RS removal list (measCSI-RS-ToRemoveModList) is a list for adding/modifying the CSI-RS resource for the DS measurement. Note that the resource configuration (resourceConfig) is a parameter associated with the CSI-RS configuration. The subframe offset (subframeOffset) is an inter-SSS subframe offset indicated by a CSI-RS resource and a physical cell ID (phyCellId) in the DS Occasion.

The measurement object EUTRA (measObjectEUTRA) includes EUTRA carrier frequency information (eutra-CarrierInfo), a measurement bandwidth (measurementBandwidth), a DS measurement configuration (measDS-Config), an offset frequency (offsetFreq), information about a neighbour cell list, and information about a black list.

Next, information included in the measurement object EUTRA (measObjectEUTRA) will be described. The EUTRA carrier frequency information (eutra-CarrierInfo) specifies the carrier frequency to be measured. The measurement bandwidth (measurementBandwidth) indicates a common measurement bandwidth to all neighbour cells operating in the carrier frequency to be measured.

An example of information about a neighbour cell list and a black list will be described.

The information about the neighbour cell list includes event evaluation and information about a neighbour cell for which measurement reporting is to be performed. Information about a neighbour cell list includes a physical cell identifier (physical cell ID), an individual cell offset (cellIndividualOffset, indicating a measurement offset value applied to a neighbour cell), and the like. In the case of EUTRA, the information is utilized as information for adding/modifying, or deleting items for a neighbour cell list already obtained by the terminal device from broadcast information (broadcast system information).

Furthermore, the information about the black list includes event evaluation and information about a neighbour cell for which and measurement reporting are not performed. As information about the black list, a physical cell identifier (physical cell ID) and the like are included. In the case of EUTRA, the information is utilized as information for adding/modifying or deleting items for a black cell list (black listedcell list) already obtained by the terminal device from broadcast information.

For all measurements, the terminal device applies third layer filtering (Layer 3 filtering) before using the measurement result for evaluating the report criteria (reporting criteria).

For all measurements, the terminal device applies third layer filtering (Layer 3 filtering) before using the measurement result for measurement reporting.

RSRP and RSRQ measurement for each Serving cell are always performed as follows, in a case that the terminal device has the measurement configuration (measConfig).

In a case that the terminal device supports DS measurement based on the CRS, the terminal device applies DMTC to each SCell in a deactivated state, in accordance with the DS measurement configuration (measDS-Config). Note that it is preferable that the DMTC is applied in a case of the DMTC being configured in a measurement object (measObject) corresponding to the frequency of the SCell.

A measurement below is performed for each measId included in a measIdList within the parameter (VarMeasConfig), except in a case of a purpose for an associated reporting configuration (reportConfig) being configured in a CGI report (reportCGI).

In a case of the DS configuration (measDS-config) being configured for an associated measurement object (measObject), in a case of the terminal device supporting DS measurement based on the CSI-RS, and in a case of an event C1 (eventC1) or an event C2 (eventC2) being configured in an event identifier (eventId) of the associated reporting configuration (reportConfig), the terminal device performs a corresponding measurement of a CSI-RS resource on a frequency indicated by a related measurement object (measObject). Note that the DMTC is applied in accordance with the DS measurement configuration (measDS-Config) in the related measurement object (measObject).

Furthermore, in a case that a prescribed parameter (e.g., reportCRS-Meas) is included in the associated reporting configuration (reportConfig), a corresponding measurement of a neighbour cell on a frequency indicated by the related measurement object (measObject) is performed. Note that, in a case that a neighbour cell measurement subframe pattern configuration (measSubframePatternConfigNeigh) is included in the related measurement object (measObject), a time domain measurement resource limitation may be applied in accordance with the neighbour cell measurement subframe pattern configuration (measSubframePatternConfigNeigh) to a neighbour cell on a primary frequency (e.g., carrier frequency of the PCell). Note that the DMTC may be applied in accordance with the DS measurement configuration (measDS-Config) of the related measurement object (measObject).

In the case of the DS configuration (measDS-config) being configured for the associated measurement object (measObject), and in the case of the terminal device supporting DS measurement based on the CSI-RS, and in a case of a prescribed parameter (e.g., reportStrongestCSI-RSs) being included in the associated reporting configuration (reportConfig), the terminal device performs the corresponding measurement of the CSI-RS resource on the frequency indicated by the related measurement object (measObject). Note that the DMTC is applied in accordance with a DS measurement configuration (measDS-Config) in the related measurement object (measObject).

Furthermore, in the case of a prescribed parameter (e.g., reportCRS-Meas) being included in the associated reporting configuration (reportConfig), a corresponding measurement of a neighbour cell on the frequency indicated by the related measurement object (measObject) is performed. Note that, in a case that a neighbour cell measurement subframe pattern configuration (measSubframePatternConfigNeigh) is included in the related measurement object (measObject), a time domain measurement resource limitation may be applied in accordance with the neighbour cell measurement subframe pattern configuration (measSubframePatternConfigNeigh) to a neighbour cell on a primary frequency (e.g., carrier frequency of the PCell). Note that the DMTC may be applied in accordance with the DS measurement configuration (measDS-Config) of the related measurement object (measObject).

In a case other than the above-mentioned cases, the terminal device performs a corresponding measurement of a neighbour cell on a frequency and a RAT indicated by the related measurement object (measObject). Note that, in the case that the neighbour cell measurement subframe pattern configuration (measSubframePatternConfigNeigh) is included in the related measurement object (measObject), a time domain measurement resource limitation may be applied in accordance with the neighbour cell measurement subframe pattern configuration (measSubframePatternConfigNeigh) to the neighbour cell on the primary frequency (e.g., carrier frequency of the PCell). Note that, in the case that the terminal device supports DS measurement based on the CRS, the DMTC may be applied in accordance with the DS measurement configuration (measDS-Config) of the related measurement object (measObject).

Next, details of the reporting configurations will be described.

The Reporting configurations include a reporting configuration EUTRA (reportConfigEUTRA) associated with a reporting configuration identifier (reportConfigId), and the like.

The reporting configuration identifier (reportConfigId) is used for identifying Reporting configurations for measurement. As mentioned before, the Reporting configurations for measurement include prescriptions for EUTRA and prescriptions for RATs (UTRA, GERAN, CDMA 2000) other than EUTRA. The reporting configuration EUTRA (reportConfigEUTRA), or Reporting configurations for EUTRA, prescribes the event triggering criteria utilized for measurement reporting in EUTRA.

Furthermore, the reporting configuration EUTRA (reportConfigEUTRA) includes an event identifier (eventId), a trigger quantity (triggerQuantity), a hysteresis, a trigger time (timeToTrigger), a report quantity (reportQuantity), a maximum reporting cell number (maxReportCells), a report interval (reportInterval), and a report amount (reportAmount).

The event identifier (eventId) is utilized for selecting a criterion for event triggered reporting. Here, the event triggered reporting is a method for reporting a measurement in a case that the event triggering criteria are satisfied. Another method is, in the case that the event triggering criteria are satisfied, event triggered periodic reporting in which a certain number of measurements are reported at a fixed interval.

In a case of the event triggering criteria specified by the event identifier (eventId) being satisfied, the terminal device performs measurement report to the base station device. The trigger quantity (triggerQuantity) is utilized for evaluating the event triggering criteria. That is, RSRP or RSRQ are specified. That is, the terminal device utilizes the quantity specified by the trigger quantity (triggerQuantity) to measure the downlink Reference Signal, and to determine whether the event triggering criteria specified by the event identifier (eventId) are satisfied.

The hysteresis is a parameter utilized in the event triggering criteria. The trigger time (timeToTrigger) indicates a duration during which the event triggering criteria need to be satisfied. The report quantity (reportQuantity) indicates a quantity reported in the measurement report. Here, the quantity is specified by the trigger quantity (triggerQuantity), or the RSRP and RSRQ is specified.

The maximum reporting cell number (maxReportCells) indicates a maximum number of cells included in the measurement report. The report interval (reportInterval) is utilized for periodical reporting or event triggered periodic reporting and reporting is performed periodically for each interval indicated at a report interval (reportInterval). The report amount (reportAmount) prescribes the number of times to perform periodical reporting, as needed.

Note that a threshold value parameter and an offset parameter utilized in the later-mentioned event triggering criteria are notified, together with the event identifier (eventId), in the reporting configuration to the terminal device.

Note that the base station device may or may not notify the serving cell quality threshold value (s-Measure). In a case that the base station device notifies the serving cell quality threshold value (s-Measure), the terminal device performs measurement of the neighbour cell and event evaluation (whether the event triggering criteria are satisfied, also referred to as reporting criteria evaluation) in a case that RSRP of the Serving cell is lower than the serving cell quality threshold value (s-Measure). On the other hand, in a case that the base station device does not notify the serving cell quality threshold value (s-Measure), the terminal device performs measurement of the neighbour cell and event evaluation, regardless of the RSRP of the serving cell.

Next, details of an event and event triggering criteria will be described.

In a case of satisfying the event triggering criteria, the terminal device transmits the measurement report to the base station device. The measurement report includes a measurement result.

The event triggering criteria for measurement report include a plurality of definitions each of which has a subscription condition and a withdrawal condition. That is, in a case of satisfying a subscription condition for an event specified by the base station device, the terminal device transmits a measurement report to the base station device. On the other hand, in a case of satisfying the event subscription condition and transmitting the measurement report, the terminal device stops transmission of the measurement report in a case of an event withdrawal condition being satisfied.

In an example of an event and event triggering criteria described below, either a first measurement result or a second measurement result is used.

An example of the event will be described.

The event is triggered in a case that the measurement result of the Serving cell is improved than a threshold value. In a case that a condition A1-1 is satisfied, the terminal device transmits the measurement report. In a case that a condition A1-2 is satisfied, the terminal device stops transmission of the measurement report.

The subscription condition A1-1 is Ms−Hys>Threshold. The withdrawal condition A1-2 is Ms+Hys<Threshold.

Here, Ms is a first measurement result or a second measurement result for the Serving cell (without considering the cell-specific measurement offset value), Hys is a hysteresis parameter for the target event, and Threshold is a threshold parameter utilized for the target event.

An example of the event will be described.

The event is triggered when a measurement result of the Serving cell is worsened than a threshold value. In a case of satisfying a condition A2-1, the terminal device transmits the measurement report. In a case of satisfying a condition A2-2, the terminal device stops transmitting the measurement report.

The subscription condition A2-1 is Ms−Hys<Threshold. The withdrawal condition A2-2 is Ms+Hys>Threshold.

Here, Ms is a first measurement result or a second measurement result for the Serving cell (without considering the cell-specific measurement offset value), Hys is a hysteresis parameter for the target event, and Threshold is a threshold parameter utilized for the target event.

An example of the event will be described.

The event is triggered when a measurement result of a Neighboring cell is improved than a measurement result of a Primary cell. In a case of satisfying a condition A3-1, the terminal device transmits the measurement report. In a case of satisfying a condition A3-2, the terminal device stops transmitting the measurement report.

The subscription condition A3-1 is Mn+Ofn+Ocn−Hys>Mp+Ofp+Ocp+Off. The withdrawal condition A3-2 is Mn+Ofn+Ocn+Hys<Mp+Ofp+Ocp+Off.

Here, Mn is a first measurement result or a second measurement result for the Neighboring cell (without considering the cell-specific measurement offset value), Ofn is a frequency-specific measurement offset value for the frequency of the Neighboring cell, Ocn is a cell-specific measurement offset value for the Neighboring cell (0 is set in a case that Ocn is not configured for the Neighboring cell), Mp is a first measurement result or a second measurement result for the Primary cell (without considering the cell-specific measurement offset value), Ofp is a frequency-specific measurement offset value for the frequency of the Primary cell, Ocp is a cell-specific measurement offset value for the Primary cell (0 is set in a case that Ocp is not configured for the Primary cell), Hys is a hysteresis parameter for the target event, and Off is an offset parameter utilized for the target event.

An example of the event will be described.

The event is triggered when a measurement result of the Neighboring cell is improved than a threshold value. In a case of satisfying a condition A4-1, the terminal device transmits the measurement report. In a case of satisfying a condition A4-2, the terminal device stops transmitting the measurement report.

The subscription condition A4-1 is Mn+Ofn+Ocn−Hys>Threshold. The withdrawal condition A4-2 is Mn+Ofn+Ocn+Hys<Threshold.

Here, Mn is a first measurement result or a second measurement result for the Neighboring cell (without considering the cell-specific measurement offset value), Ofn is a frequency-specific measurement offset value for the frequency of the Neighboring cell, Ocn is a cell-specific measurement offset value for the Neighboring cell (0 is set in a case that Ocn is not configured for the Neighboring cell), Hys is a hysteresis parameter for the target event, and Threshold is a threshold parameter utilized for the target event.

An example of the event will be described.

The event is triggered when a measurement result of the Primary cell is worsened than a threshold 1 and a measurement result of the Neighboring cell is improved than a threshold 2. In a case of satisfying a condition A5-1 and a condition A5-2, the terminal device transmits the measurement report. In a case of satisfying a condition A5-3 and a condition A5-4, the terminal device stops transmitting the measurement report.

The subscription condition A5-1 is Mp−Hys<Threshold 1. The subscription condition A5-2 is Mn+Ofn+Ocn−Hys>Threshold 2. The withdrawal condition A5-3 is Mp+Hys>Threshold 1. The withdrawal condition A5-4 is Mn+Ofn+Ocn+Hys<Threshold 2.

Here, Mp is a first measurement result or a second measurement result for the Primary cell (without considering the cell-specific measurement offset value), Mn is a first measurement result or a second measurement result for the Neighboring cell (without considering the cell-specific measurement offset value), Ofn is a frequency-specific measurement offset value for the frequency of the Neighboring cell, Ocn is a cell-specific measurement offset value for the Neighboring cell (0 is set in a case that Ocn is not configured for the Neighboring cell), Hys is a hysteresis parameter for the target event, and Threshold 1 and Threshold 2 are threshold parameters utilized for the target event.

An example of the event will be described.

The event is triggered when a measurement result of the Neighboring cell is improved than a measurement result of the Secondary cell. In a case of satisfying a condition A6-1, the terminal device transmits the measurement report. In a case of satisfying a condition A6-2, the terminal device stops transmitting the measurement report.

The subscription condition A6-1 is Mn+Ocn−Hys>Ms+Ocs+Off. The withdrawal condition A6-2 is Mn+Ocn+Hys<Ms+Ocs+Off.

Here, Mn is a first measurement result or a second measurement result for the Neighboring cell (without considering the cell-specific measurement offset value), Ocn is a cell-specific measurement offset value for the Neighboring cell (0 is set in a case that Ocn is not configured for the Neighboring cell), Ms is a first measurement result or a second measurement result for the Serving cell (without considering the cell-specific measurement offset value), Ocs is a cell-specific measurement offset value for the Serving cell (0 is set in a case that Ocs is not configured for the Serving cell), Hys is a hysteresis parameter for the target event, and Off is an offset parameter utilized for the target event.

An example of the above-described events and event triggering criteria use either the first measurement result or the second measurement result to evaluate the event triggering criteria. Therefore, it is necessary to specify either the first measurement result or the second measurement result to be used.

Hereinafter, an example of a method of specifying the type of the measurement result utilized for evaluating the event triggering criteria will be described.

The reporting configuration specifies the type of the measurement result utilized for evaluating the event triggering criteria. A parameter evaluates the event triggering criteria by using either the first measurement result or the second measurement result.

As a specific example, either one of the first measurement result or the second measurement result is specified by a trigger quantity (triggerQuantity). In the trigger quantity, (a first RSRP, a first RSRQ, a second RSRP, a second RSRQ) and four selection columns are defined. The terminal device utilizes a quantity specified by this trigger quantity (triggerQuantity) to measure the downlink Reference Signal, and determines whether the event triggering criteria specified by an event identifier (eventId) is satisfied.

As a specific example, either one of the first measurement result or the second measurement result is defined by a new parameter (triggerMeasType) specifying the type of the measurement result utilized for evaluating the event triggering criteria in addition to the trigger quantity. Information indicating that the parameter evaluates the event triggering criteria by using the first measurement result or information indicating that the parameter evaluates the event triggering criteria by using the second measurement result is set to the parameter. For example, in a case that the information indicating that the event triggering criteria is evaluated by using the second measurement result is set to the parameter, the terminal device performs the second measurement and evaluates the event triggering criteria by using the second measurement result. Note that, the parameter may be also used as a parameter (reportMeasType) specifying the type of the measurement result to be reported.

Note that, in the event triggering criteria using two or more measurement results in one conditional expression, such as a comparison between the measurement result of the Serving cell and the measurement result of the Neighboring cell, the type of the measurement result utilized for evaluating the event triggering criteria may be specified. For example, a new parameter (triggerMeasTypeServ) for the measurement result of the Serving cell and a new parameter (triggerMeasTypeNeigh) for the measurement result of the Neighboring cell may be defined.

Hereinafter, an example of a method of specifying the type of the measurement result utilized for evaluating the event triggering criteria will be described.

The reporting configuration determines, depending on the condition specifying the measurement, the type of the measurement result utilized for evaluating the event triggering criteria.

As a specific example, the type of the measurement result utilized for evaluating the event triggering criteria is determined depending on a starting/stopped state of the target cell. For example, when the target cell is in the starting state, the event triggering criteria is evaluated by using the first measurement result, and when the target cell is in a stopped state, the event triggering criteria is evaluated by using the second measurement result.

As a specific example, the type of the measurement result utilized for evaluating the event triggering criteria is determined depending on detection of the Reference Signal. For example, in a case of detecting the CRS but no DRS, the event triggering criteria is evaluated by using the first measurement result, and in a case of detecting the DRS but no CRS, the event triggering criteria is evaluated by using the second measurement result. In a case of detecting both the CRS and the DRS, the event triggering criteria is evaluated by using the measurement result with higher received power. In a case of detecting neither the CRS nor the DRS, the event triggering criteria is not evaluated.

An example of the event and the event triggering criteria described below use both the first measurement result and the second measurement result.

An example of the event will be described.

The event is triggered in a case that the measurement result of the Serving cell is improved than the threshold value. In a case of satisfying a condition C1-1 and a condition C1-1', the terminal device transmits the measurement report. In a case of satisfying a condition C1-2 and a condition C1-2', the terminal device stops transmitting the measurement report.

The subscription condition C1-1 is Ms−Hys>Threshold. The withdrawal condition C1-2 is Ms+Hys<Threshold. The subscription condition C1-1' is Ms'−Hys'>Threshold. The withdrawal condition C1-2' is Ms'+Hys'>Threshold.

Here, Ms is a first measurement result for the Serving cell (without considering the cell-specific measurement offset value), Ms' is a second measurement result for the Serving cell (without considering the cell-specific measurement offset value), Hys is a hysteresis parameter for the first measurement result for the target event, Hys' is a hysteresis parameter for the second measurement result for the target event, Threshold is a threshold parameter utilized for the first measurement result for the target event, and Threshold' is a threshold parameter utilized for the second measurement result for the target event.

An example of the event will be described.

The event is triggered when a measurement result of the Serving cell is worsened than a threshold value. In a case of satisfying a condition C2-1 and a condition C2-1', the terminal device transmits the measurement report. In a case of satisfying a condition C2-2 and a condition C2-2', the terminal device stops transmitting the measurement report.

The subscription condition C2-1 is Ms−Hys<Threshold. The withdrawal condition C2-2 is Ms+Hys>Threshold. The subscription condition C2-1' is Ms'−Hys'<Threshold'. The withdrawal condition C2-2' is Ms'+Hys'>Threshold'.

Here, Ms is a first measurement result for the Serving cell (without considering the cell-specific measurement offset value), Ms' is a second measurement result for the Serving cell (without considering the cell-specific measurement offset value), Hys is a hysteresis parameter for the first measurement result for the target event, Hys' is a hysteresis parameter for the second measurement result for the target event, Threshold is a threshold parameter utilized for the first measurement result for the target event, and Threshold' is a threshold parameter utilized for the second measurement result for the target event.

An example of the event will be described.

The event is triggered when a measurement result of the Neighboring cell is improved than a measurement result of the Primary cell. In a case of satisfying a condition C3-1 and a condition C3-1', the terminal device transmits the measurement report. In a case of satisfying a condition C3-2 and a condition C3-2', the terminal device stops transmitting the measurement report.

The subscription condition C3-1 is Mn+Ofn+Ocn−Hys>Mp+Ofp+Ocp+Off. The withdrawal condition C3-2 is Mn+Ofn+Ocn+Hys<Mp+Ofp+Ocp+Off. The subscription condition C3-1' is Mn'+Ofn'+Ocn'−Hys'>Mp'+Ofp'+Ocp'+Off'. The withdrawal condition C3-2' is Mn'+Ofn'+Ocn'+Hys'<Mp'+Ofp'+Ocp'+Off'.

Here, Mn is a first measurement result for the Neighboring cell (without considering the cell-specific measurement offset value), Mn' is a second measurement result for the Neighboring cell (without considering the cell-specific measurement offset value), Ofn is a frequency-specific measurement offset value for the first measurement result for the frequency of the Neighboring cell, Ofn' is a frequency-specific measurement offset value for the second measurement result for the frequency of the Neighboring cell, Ocn is a cell-specific measurement offset value for the first measurement result for the Neighboring cell (0 is set in a case that Ocn is not configured for the Neighboring cell), Ocn' is a cell-specific measurement offset value for the second measurement result for the Neighboring cell (0 is set in a case that Ocn' is not configured for the Neighboring cell), Mp is a first measurement result for the Primary cell (without considering the cell-specific measurement offset value), Mp' is a second measurement result for the Primary cell (without considering the cell-specific measurement offset value), Ofp is a frequency-specific measurement offset value for the first measurement result for the frequency of the Primary cell, Ofp' is a frequency-specific measurement offset value for the second measurement result for the frequency of the Primary cell, Ocp is a cell-specific measurement offset value for the first measurement result for the Primary cell (0 is set in a case that Ocp is not configured for the Primary cell), Ocp' is a cell-specific measurement offset value for the second measurement result for the Primary cell (0 is set in a case that Ocp' is not configured for the Primary cell), Hys is a hysteresis parameter for the first measurement result for the target event, Hys' is a hysteresis parameter for the second measurement result for the target event, Off is an offset parameter utilized for the first measurement result for the target event, and Off' is an offset parameter utilized for the second measurement result for the target event.

An example of the event will be described.

The event is triggered when a measurement result of the Neighboring cell is improved than a threshold value. In a case of satisfying a condition C4-1 and a condition C4-1', the terminal device transmits the measurement report. In a case of satisfying a condition C4-2 and a condition C4-2', the terminal device stops transmitting the measurement report.

The subscription condition C4-1 is Mn+Ofn+Ocn−Hys>Threshold. The withdrawal condition C4-2 is Mn+Ofn+Ocn+Hys<Threshold. The subscription condition C4-1' is Mn'+Ofn'+Ocn'−Hys'>Threshold'. The withdrawal condition C4-2' is Mn'+Ofn'+Ocn'+Hys'<Threshold'.

Here, Mn is a first measurement result for the Neighboring cell (without considering the cell-specific measurement offset value), Mn' is a second measurement result for the Neighboring cell (without considering the cell-specific measurement offset value), Ofn is a frequency-specific measurement offset value for the first measurement result for the frequency of the Neighboring cell, Ofn' is a frequency-specific measurement offset value for the second measurement result for the frequency of the Neighboring cell, Ocn is a cell-specific measurement offset value for the first measurement result for the Neighboring cell (0 is set in a case that Ocn is not configured for the Neighboring cell), Ocn' is a cell-specific measurement offset value for the second measurement result for the Neighboring cell (0 is set in a case that Ocn' is not configured for the Neighboring cell), Hys is a hysteresis parameter for the first measurement result for the target event, Hys' is a hysteresis parameter for the second measurement result for the target event, Threshold is a threshold parameter utilized for the first measurement result for the target event, and Threshold is a threshold parameter utilized for the second measurement result for the target event.

An example of the event will be described.

The event is triggered when a measurement result of the Primary cell is worsened than a threshold 1 and a measurement result of the Neighboring cell is improved than a threshold 2. In a case of satisfying a condition C5-1 and a condition C5-2 and a condition C5-1' and a condition C5-2', the terminal device transmits the measurement report. In a case of satisfying a condition C5-3 and a condition C5-4 and a condition C5-3' and a condition C5-4', the terminal device stops transmitting the measurement report.

The subscription condition C5-1 is Mp−Hys<Threshold 1. The subscription condition C5-2 is Mn+Ofn+Ocn−Hys>Threshold 2. The withdrawal condition C5-3 is Mp+Hys>Threshold 1. The withdrawal condition C5-4 is Mn+Ofn+Ocn+Hys<Threshold 2. The subscription condition C5-1' is Mp'−Hys'<Threshold 1'. The subscription condition C5-2' is Mn'+Ofn'+Ocn'−Hys'>Threshold 2'. The withdrawal condition C5-3' is Mp'+Hys'>Threshold 1'. The withdrawal condition C5-4' is Mn'+Ofn'+Ocn'+Hys'<Threshold 2'.

Here, Mp is a first measurement result for the Primary cell (without considering the cell-specific measurement offset value), Mp' is a second measurement result for the Primary cell (without considering the cell-specific measurement offset value), Mn is a first measurement result for the Neighboring cell (without considering the cell-specific measurement offset value), Mn' is a second measurement result for the Neighboring cell (without considering the cell-specific measurement offset value), Ofn is a frequency-specific measurement offset value for the first measurement result for the frequency of the Neighboring cell, Ofn' is a frequency-specific measurement offset value for the second measurement result for the frequency of the Neighboring cell, Ocn is a cell-specific measurement offset value for the first measurement result for the Neighboring cell (0 is set in a case that Ocn is not configured for the Neighboring cell), Ocn' is a cell-specific measurement offset value for the second measurement result for the Neighboring cell (0 is set in a case that Ocn' is not configured for the Neighboring cell), Hys is a hysteresis parameter for the first measurement result for the target event, Hys' is a hysteresis parameter for the second measurement result for the target event, Threshold 1 and Threshold 2 are threshold parameters utilized for the first measurement result for the target event, and Threshold 1' and Threshold 2' are threshold parameters utilized for the second measurement result for the target event.

An example of the event will be described.

The event is triggered when a measurement result of the Neighboring cell is improved than a measurement result of the Secondary cell. In a case of satisfying a condition C6-1 and a condition C6-1', the terminal device transmits the measurement report. In a case of satisfying a condition C6-2 and a condition C6-2', the terminal device stops transmitting the measurement report. Note that, the Neighboring cell is a cell on the same frequency as that of the aforementioned Secondary cell.

The subscription condition C6-1 is Mn+Ocn−Hys>Ms+Ocs+Off. The withdrawal condition C6-2 is Mn+Ocn+Hys<Ms+Ocs+Off. The subscription condition C6-1' is Mn'+Ocn'−Hys'>Ms'+Ocs'+Off'. The withdrawal condition C6-2' is Mn'+Ocn'+Hys'<Ms'+Ocs'+Off'.

Here, Mn is a first measurement result for the Neighboring cell (without considering the cell-specific measurement offset value), Mn' is a second a measurement result for the Neighboring cell (without considering the cell-specific measurement offset value), Ocn is a cell-specific measurement offset value for the first measurement result for the Neighboring cell (0 is set in a case that Ocn is not configured for the Neighboring cell), Ocn' is a cell-specific measurement offset value for the second measurement result for the Neighboring cell (0 is set in a case that Ocn' is not configured for the Neighboring cell), Ms is a first measurement result for the Serving cell (without considering the cell-specific measurement offset value), Ms' is a second measurement result for the Serving cell (without considering the cell-specific measurement offset value), Ocs is a cell-specific measurement offset value for the first measurement result for the Serving cell (0 is set in a case that Ocs is not configured for the Serving cell), Ocs' is a cell-specific measurement offset value for the second measurement result for the Serving cell (0 is set in a case that Ocs' is not configured for the Serving cell), Hys is a hysteresis parameter for the first measurement result for the target event, Hys' is a hysteresis parameter for the second measurement result for the target event, Off is an offset parameter utilized for the first measurement result for the target event, and Off' is an offset parameter utilized for the second measurement result for the target event.

Next, details of the measurement result will be described.

This measurement result includes a measurement identifier (measId), a serving cell measurement result (measResultServing), and an EUTRA measurement result list (measResultListEUTRA). Here, the EUTRA measurement result list (measResultListEUTRA) includes a physical cell identifier (physcalCellIdentity) and an EUTRA cell measurement result (measResultEUTRA). Here, as mentioned before, the measurement identifier (measId) is an identifier utilized by a link between a measurement object identifier (measObjectId) and a reporting configuration identifier (reportConfigId). Furthermore, the physical cell identifier (physicalCellIdentity) is utilized for identifying a cell. The EUTRA cell measurement result (measResultEUTRA) is a measurement result for an EUTRA cell. The measurement result of the neighbour cell is included only when the related event occurs.

An example of the measurement result will be described.

The measurement result reports both results of the RSRP and the RSRQ for the target cell. The RSRP and the RSRQ reported at one time are either the first measurement result or the second measurement result.

As a specific example, the measurement result is reported based on a parameter that determines either one of the first measurement result or the second measurement result. A criterion for determining either one of the first measurement result or the second measurement result is, for example, a new parameter (reportMeasType). Information indicating a report of the first measurement result or information indicating a report of the second measurement result is set to the parameter. For example, in a case that the information indicating a report of the second measurement result is set to the parameter, the terminal device recognizes the parameter, performs the second measurement, transmits the second measurement result on a measurement report message, and does not transmit the first measurement result.

Note that, the parameter may also be a parameter (triggerMeasType) specifying the type of the measurement result utilized for evaluating the event triggering criteria. Note that, the parameter may also be a higher layer parameter specifying a measurement method.

Note that the parameter (reportQuantity) may be configured for each type to be measured as a parameter for the RSRP (reportQuantityRSRP) and a parameter for the RSRQ (reportQuantityRSRQ). For example, in a case of configuring the reportQuantityRSRP as a first RSRP and configuring the reportQuantityRSRQ as a second RSRQ, the terminal device transmits the first RSRP and the second RSRQ, and does not transmit a second RSRP and a first RSRQ.

As a specific example, in a case of configuring, for the terminal device, a periodic report or an event trigger periodic report, the first measurement result and the second measurement result are periodically and alternately reported. For example, the first measurement result is reported in a first report, the second measurement result is reported in a second report, the first measurement result is reported in a third report, the second measurement result is reported in a fourth report, and each of them is repeatedly and alternately reported thereafter.

Note that the first measurement result and the second measurement result may not be reported at the same frequency. For example, the terminal device may be configured with a cycle in which the second measurement result is reported once after the first measurement result is reported twice. Specifically, the first measurement result is reported in the first report and the second report, and the second measurement result is reported in the third report. The number of reports is configured by a parameter in a higher layer.

As a specific example, measurement results are reported depending on the condition that specifies the measurement.

For example, the type of the measurement result to be reported is determined depending on a starting/stopped state of the target cell.

For example, a type of the measurement result to be reported is determined depending on detection of the Reference Signal. For example, in a case of detecting a CRS but no DRS, the first measurement result is reported, and in a case of detecting a DRS but no CRS, the second measurement result is reported. In a case of detecting both a CRS and a DRS, the measurement result with higher received power is reported. In a case of not detecting neither a CRS nor a DRS, the measurement result is not reported, or the lowest value is reported.

Note that in order to cause the base station device to recognize whether the reported measurement result is a result calculated by the first measurement or a result calculated by the second measurement, a parameter clearly indicating that which type of measurement is set to the measurement result may be added in the terminal device.

An example of report of the measurement result will be described.

The measurement result reports results of the first RSRP and the first RSRQ, and the second RSRP and the second RSRQ for the target cell.

The terminal device performs the first measurement and the second measurement, and transmits the measurement result on the measurement report message.

In a case that a CRS cannot be detected, the terminal device sets the lowest value to the first measurement result for reporting. Note that in a case that a CRS cannot be detected, the terminal device may not report the first measurement result.

In a case that the DRS cannot be detected, the terminal device sets the lowest value to the second measurement result to report. Note that in a case that the DRS cannot be detected, the terminal device need not report the second measurement result.

An example of report of the measurement result will be described.

The measurement result reports the RSRP and the RSRQ for the target cell, and, a result of an inter-cell interference measurement. The result of the inter-cell interference measurement is, for example, a received power measured by an interference measurement resource, the SINR, the RSSI, and the like.

The terminal device recognizes the parameter, performs measurement and an inter-cell interference quantity, and transmits the measurement result on the measurement report message.

An example of the event, the event triggering criteria, and the report of the measurement result has been described above. The terminal device reports the first measurement result and/or the second measurement result to the base station device, by a combination of these. In the present embodiment, a combination of the event, the event triggering criteria, and the report of the measurement result is not limited, however, an example of a preferable combination will be described below.

An example of a combination of the event, the event triggering criteria, and the report of the measurement result is described.

In a case of performing the first measurement, a measurement object (measObject) including a neighbour cell list and a black list for which the physical cell identifier is configured, is configured and a reporting configuration (reportConfig) for which the event triggered by the first measurement and the event triggering criteria are configured, is configured, and they are associated with each other by an ID, thereby a measurement report message including the first measurement results (measResults) is transmitted. Moreover, in a case of performing the second measurement, a measurement object (measObject) including a new neighbour cell list or a new black list for which an extended cell ID is configured, is configured and a reporting configuration (reportConfig) for which the event triggered by the second measurement and the event triggering criteria are configured, is configured, and they are associated with each other by an ID, thereby a measurement report message including the second measurement results (measResults) is transmitted.

That is, the measurement object, the reporting configuration, and the measurement result for the first measurement, and the measurement object, the reporting configuration, and the measurement result for the second measurement are configured for the terminal device. That is, the reporting configuration of the first measurement result and the reporting configuration of the second measurement result are configured independently.

An example of a combination of the event, the event triggering criteria, and the report of the measurement result is described.

In a case of performing the first measurement, a measurement object (measObject) including a neighbour cell list and a black list for which a physical cell identifier is configured, is configured and a reporting configuration (reportConfig) for which the event triggered by the first measurement and the event triggering criteria are configured, is configured, and they are associated with each other by measurement results (measResults) and an ID. In a case of performing the second measurement, a measurement object (measObject) including a new neighbour cell list or a new black list for which an extended cell ID is configured, is configured and a reporting configuration (reportConfig) for which the event triggered by the second measurement and the event triggering criteria are configured, is configured, and they are associated with each other by the measurement results (measResults) and an ID. In a case that the event triggered by the first measurement occurs, the first measurement result is substituted to the measurement result to be transmitted on a measurement report message. In a case that the event triggered by the second measurement occurs, the second measurement result is substituted to the measurement result to be transmitted on a measurement report message.

That is, the measurement object and the reporting configuration for the first measurement, and the measurement object and the reporting configuration for the second measurement are configured, and a field for the measurement result is shared between the first measurement and the second measurement. The first measurement result or the second measurement result is transmitted by the event.

Thus, the terminal device can report the first measurement result and the second measurement result to the base station device.

The terminal device in the present embodiment is a terminal device configured to communicate with a base station device. The terminal device includes: a reception unit configured to perform a first measurement based on a first RS (CRS) and perform a second measurement based on a second RS (DRS); and a higher layer processing unit configured to report the first measurement result and the second measurement result to the base station device. The terminal device reports, in a first state, the first measurement result to the base station device, and reports, in a second state, the first measurement result or the second measurement result to the base station device.

As an example, in the second state, an event of reporting the first measurement result and an event of reporting the second measurement result are configured by the base station device. Furthermore, as an example, in the second state, only an event of reporting the second measurement is configured by the base station device. The event triggering criteria for reporting the second measurement result is defined by using the second measurement result.

As an example, the first state is a state in which configuration information of the second RS is not notified, and the second state is a state in which configuration information of the second RS is notified from the base station device. Furthermore, as an example, the first state is a state in which the second measurement information is not configured, and the second state is a state in which the second measurement information is configured from the base station device. Furthermore, as an example, the second state is a state in which the first RS is not transmitted.

In a transmit power of a PUSCH and a Power Headroom (PHR), a value is determined depending on a path loss. Hereinafter, an example of a method for estimating the path loss (a propagation path attenuation value) will be described.

A downlink path loss estimated value of a Serving cell c is calculated by the terminal device, by using an equation of PLc=referenceSignalPower−higher layer filtered RSRP. Here, referenceSignalPower is given in the higher layer. referenceSignalPower is information based on a transmit power of the CRS. Here, higher layer filtered RSRP is a first RSRP of a reference Serving cell filtered in the higher layer.

In a case that the Serving cell c belongs to a TAG including the Primary cell, the Primary cell is used for the reference Serving cell of referenceSignalPower and higher layer filtered RSRP, for an uplink Primary cell. For an uplink Secondary cell, a Serving cell configured by a parameter pathlossReferenceLinking in the higher layer is used for the reference Serving cell of referenceSignalPower and higher layer filtered RSRP. In a case that the Serving cell c belongs to the TAG not including the Primary cell, the Serving cell c is used for the reference Serving cell of referenceSignalPower and higher layer filtered RSRP.

In a first aspect of the present embodiment, the terminal device includes: a higher layer processing unit for which a physical quantity configuration (quantityConfig) and Measurement objects are configured; and a measurement unit configured to perform measurement for a first frequency and a second frequency based on the physical quantity configuration and the Measurement objects. It is preferable that: the physical quantity configuration includes at least a first filtering coefficient used for measurement for the first frequency and a second filtering coefficient used for measurement for the second frequency; the Measurement objects include at least a Discovery Signal measurement configuration (measDS-Config) used for measurement at the second frequency; the measurement unit performs measurement based on a Cell-specific Reference Signal for the first frequency, and measurement based on a Discovery Signal in accordance with the Discovery Signal measurement configuration for the second frequency; a filtering based on the first filtering coefficient is applied to a measurement result for the first frequency; and a filtering based on the second filtering coefficient is applied to a measurement result for the second frequency.

In a second aspect of the present embodiment, the terminal device includes: a higher layer processing unit for which a physical quantity configuration (quantityConfig) and Measurement objects are configured; and a measurement unit configured to perform measurement for a first frequency and a second frequency based on the physical quantity configuration and the Measurement objects. It is preferable that: the physical quantity configuration includes at least a first filtering coefficient used for measurement for the first frequency; the Measurement objects include at least a Discovery Signal measurement configuration (measDS-Config) used for measurement in the second frequency; the measurement unit performs measurement based on a Cell-specific Reference Signal for the first frequency, and measurement based on a Discovery Signal in accordance with the Discovery Signal measurement configuration for the second frequency; a filtering based on the first filtering coefficient is applied to a measurement result for the first frequency; and a filtering based on a filtering coefficient is not applied to a measurement result for the second frequency (a filtering based on other than a filtering coefficient, or a filtering coefficient based on a filtering coefficient different from a filtering coefficient configured from a higher layer (for example, a filtering coefficient "0" configured as a default value) is applied).

In the first aspect and the second aspect of the present embodiment, it is preferable that the filtering is given by $F_n=(1-\alpha)\times F_{n-1}+\alpha\times M_n$, $M_n$ is the latest received measurement result from the physical layer, $F_n$ is an updated filtered measurement result used for a report criteria evaluation or a measurement report, $F_{n-1}$ is the last filtered measurement result, $\alpha$ is $1/2^{(k/4)}$, k is a first filtering coefficient for the first frequency, and k is a second filtering coefficient for the second frequency.

In the first aspect and the second aspect of the present embodiment, it is preferable that the first filtering coefficient and the second filtering coefficient are configured independently.

In the first aspect and the second aspect of the present embodiment, it is preferable that the second filtering coefficient is always zero.

In the first aspect and the second aspect of the present embodiment, it is preferable that the first frequency corresponds to a licensed band, and the second frequency corresponds to an unlicensed band.

In the first aspect and the second aspect of the present embodiment, it is preferable that the Discovery Signal is transmitted based on Listen Before Talk (LBT) of a downlink.

In the first aspect and the second aspect of the present embodiment, it is preferable that measurement based on the Cell-specific Reference Signal and measurement based on the Discovery Signal are measurement of Reference Signal Received Power (RSRP).

In a third aspect of the present embodiment, a base station device includes: a higher layer signalling unit configured to transmit a signal for configuration of a physical quantity configuration (quantityConfig) and Measurement objects; and a reception unit configured to receive a measurement report for a first frequency and a second frequency, measured based on the physical quantity configuration and the Measurement objects. It is preferable that the physical quantity configuration includes at least a first filtering coefficient used for measurement for the first frequency and a second filtering coefficient used for measurement for the second frequency, the Measurement objects include at least a Discovery Signal measurement configuration (measDS-Config) used for measurement at the second frequency, the reception unit receives a measurement report based on a Cell-specific Reference Signal for the first frequency and a measurement report based on a Discovery Signal in accordance with the Discovery Signal measurement configuration for the second frequency, a measurement result for the first frequency is a measurement result to which a filtering based on the first filtering coefficient is applied, and a measurement result for the second frequency is a measurement result to which a filtering based on the second filtering coefficient is applied.

In a fourth aspect of the present embodiment, a base station device includes: a higher signalling unit configured to transmit a signal for configuration of a physical quantity configuration (quantityConfig) and Measurement objects; and a reception unit configured to receive a measurement result for a first frequency and a second frequency, measured based on the physical quantity configuration and the Measurement objects. It is preferable that the physical quantity configuration includes at least a first filtering coefficient used for measurement for the first frequency, the Measurement objects include at least a Discovery Signal measurement configuration (measDS-Config) used for measurement in the second frequency, the reception unit receives a measurement report based on a Cell-specific Reference Signal for the first frequency, and a measurement report based on a Discovery Signal in accordance with the Discovery Signal measurement configuration for the second frequency, a measurement result for the first frequency is a measurement result to which a filtering based on the first filtering coefficient is applied, and a measurement result for the second frequency is a measurement result to which a filtering based on a filtering coefficient is not applied (a measurement result to which a filtering based on other than a filtering coefficient is applied, or a measurement result to which a filtering based on a filtering coefficient different from a filtering coefficient configured from a higher layer (for example, a filtering coefficient "0" configured as a default value) is applied).

In the third aspect and the fourth aspect of the present embodiment, it is preferable that the filtering is given by $F_n=(1-\alpha)\times F_{n-1}+\alpha\times M_n$, $M_n$ is the latest received measurement result from the physical layer, $F_n$ is an updated filtered measurement result used for a report criteria evaluation or a measurement report, $F_{n-1}$ is a previous filtered measurement result, $\alpha$ is $\frac{1}{2}^{(k/4)}$, k is a first filtering coefficient for the first frequency, and k is a second filtering coefficient for the second frequency.

In the third aspect and the fourth aspect of the present embodiment, it is preferable that the first filtering coefficient and the second filtering coefficient are configured independently.

In the third aspect and the fourth aspect of the present embodiment, it is preferable that the second filtering coefficient is always zero.

In the third aspect and the fourth aspect of the present embodiment, it is preferable that the first frequency corresponds to a licensed band, and the second frequency corresponds to an unlicensed band.

In the third aspect and the fourth aspect of the present embodiment, it is preferable that the Discovery Signal is transmitted based on Listen Before Talk (LBT) of a downlink.

In the third aspect and the fourth aspect of the present embodiment, it is preferable that measurement based on the Cell-specific Reference Signal and a measurement result based on the Discovery Signal are a measurement result of Reference Signal Received Power (RSRP).

Figure 2:
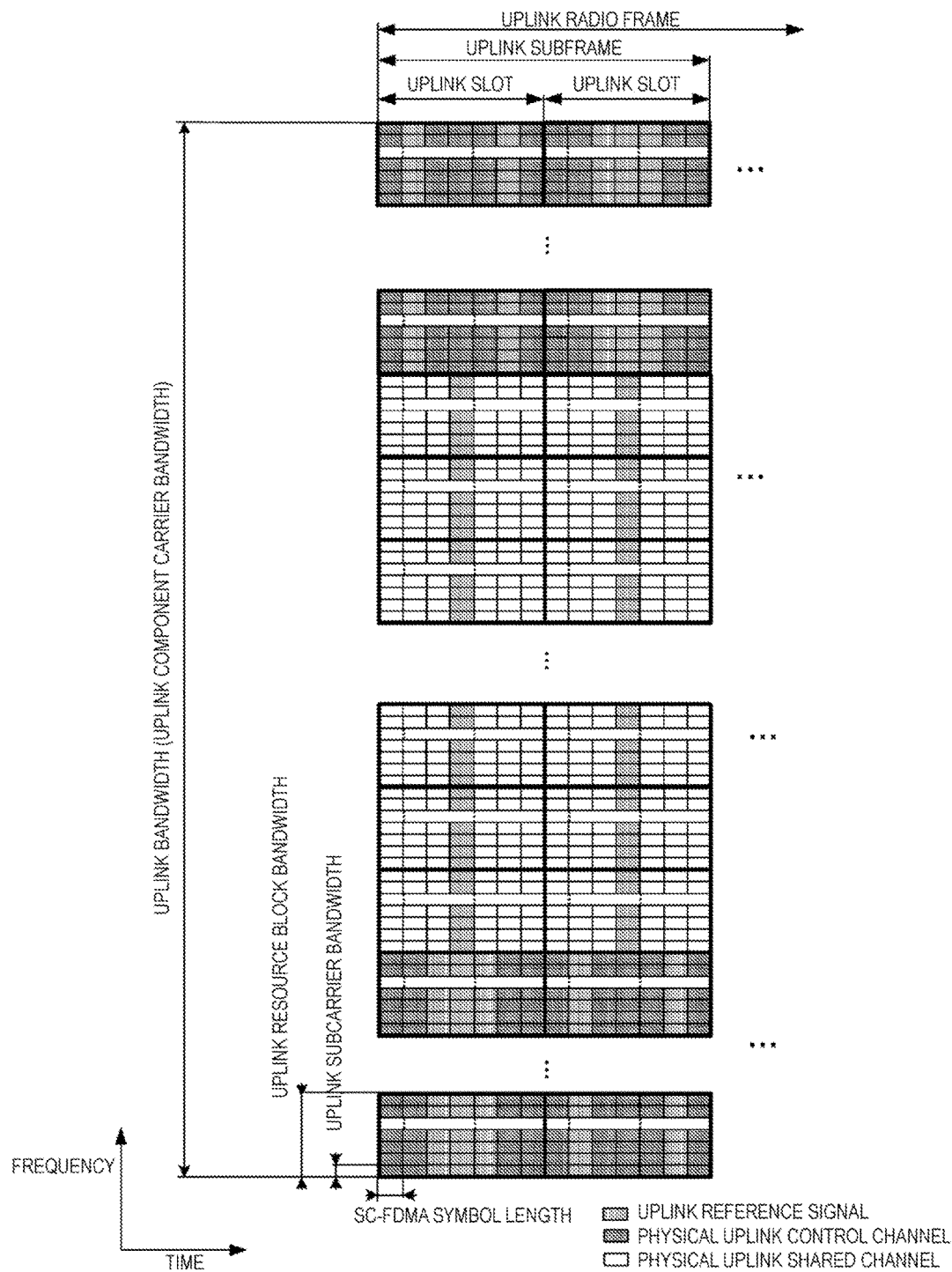
FIG. 2 is a diagram illustrating an example of an uplink radio frame configuration according to the present embodiment.

FIG. 2 is a diagram illustrating an example of an uplink radio frame configuration according to the present embodiment. The uplink uses an SC-FDMA scheme. In the uplink, a Physical Uplink Shared Channel (PUSCH), a PUCCH, and the like are allocated. An Uplink Reference Signal is assigned to one or some of PUSCHs and PUCCHs. An uplink radio frame is constituted of uplink RB pairs. This uplink RB pair is a unit for allocation of uplink radio resources and the like and is constituted of the frequency band of a predetermined width (RB bandwidth) and a predetermined time duration (two slots=1 subframe). A single uplink RB pair is constituted of two uplink RBs (RB bandwidth*slots) that are contiguous in the time domain. Each of the uplink RBs is constituted of 12 subcarriers in the frequency domain. In the time domain, the uplink RB is constituted of seven SC-FDMA symbols when a normal cyclic prefix is added, while the uplink RB is constituted of six SC-FDMA symbols when a cyclic prefix that is longer than the normal cyclic prefix is added. Note that although an uplink subframe in a single CC is described here, an uplink subframe is defined for each CC.

A Synchronization Signal is constituted of three types of primary Synchronization Signals and secondary Synchronization Signals constituted of 31 types of codes that are interleaved in the frequency domain. 504 patterns of cell identifiers (physical cell identities; PCIs) for identifying base station devices, and a frame timing for radio synchronization are indicated by combinations of the primary Synchronization Signal and the secondary Synchronization Signal. The terminal device identifies the physical cell ID of a received Synchronization Signal by cell search.

The Physical Broadcast Channel (PBCH) is transmitted for the notification (configuration) of a control parameter (broadcast information i.e., system information) commonly used among the terminal devices within the cell. The radio resource in which broadcast information is transmitted is notified on the Physical Downlink Control Channel to the terminal devices in the cell. Broadcast information not notified on the Physical Broadcast Channel is transmitted, as a layer-3 message (system information) for notifying the broadcast information on the Physical Downlink Shared Channel, in the notified radio resource.

Broadcast information to be notified includes, for example, a Cell Global Identifier (CGI), which indicates a cell-specific identifier, a Tracking Area Identifier (TAI) for managing standby areas in paging, random access configuration information (such as a transmission timing timer), and shared radio resource configuration information, Neighboring cell information and uplink access control information on the cell.

A downlink Reference Signal is classified into a plurality of types according to its use. For example, Cell-specific RSs (Cell-specific Reference Signals) are pilot signals transmitted with prescribed power from each cell and are downlink Reference Signals periodically repeated in the frequency domain and the time domain under a prescribed rule. The terminal device receives the Cell-specific RS and thereby measures the reception quality of each cell. The terminal device also uses a Cell-specific RS as a Reference Signal for demodulation of a Physical Downlink Control Channel or a Physical Downlink Shared Channel transmitted at the same time as a Cell-specific RS. The sequence used for a Cell-specific RS is a sequence distinguishable among the cells.

The downlink Reference Signal is also used for estimation of downlink channel fluctuation. A downlink Reference Signal used for estimation of channel fluctuations is referred to as "Channel State Information Reference Signal (CSI-RS)". A downlink Reference Signal individually configured for the terminal device is referred to as UE-specific Reference Signal (URS), a Demodulation Reference Signal (DMRS), or a dedicated RS (DRS), and is referred to for a channel compensation process for demodulating an enhanced Physical Downlink Control Channel or a Physical Downlink Shared Channel.

The Physical Downlink Control Channel (PDCCH) occupying one or several OFDM symbols (e.g., 1 to 4 OFDM symbols) from the start of each subframe is transmitted. The Enhanced Physical Downlink Control Channel (EPDCCH)

is a Physical Downlink Control Channel allocated to the OFDM symbols to which the Physical Downlink Shared Channel (PDSCH) is allocated. The PDCCH or EPDCCH is used for notifying each terminal device of radio resource allocation information according to scheduling determined by the base station device and information indicating an adjustment amount for an increase or decrease in transmit power. In the following, even when the Physical Downlink Control Channel (PDCCH) alone is described, both physical channels that is, the PDCCH and the EPDCCH, are included unless otherwise noted.

The terminal device needs to monitor a Physical Downlink Control Channel addressed to the terminal device itself, and receive the Physical Downlink Control Channel addressed to the terminal device itself, before transmitting and/or receiving downlink data, a layer-2 message, and layer-3 message, which are higher-layer control information (such as a paging or handover command), and thereby acquire, from the Physical Downlink Control Channel, radio resource allocation information called uplink grant in a case of transmission and downlink grant (downlink assignment) in a case of reception. Note that it is also possible to constitute the Physical Downlink Control Channel so that the Physical Downlink Control Channel is to be transmitted in the dedicated Resource Block domain allocated to each terminal device by the base station device, instead of transmission through OFDM symbols described above.

The Physical Uplink Control Channel (PUCCH) is used for an acknowledgment in response to reception of downlink data transmitted on the Physical Downlink Shared Channel (HARQ-ACK; Hybrid Automatic Repeat Request-Acknowledgment or ACK/NACK; Acknowledgment/Negative Acknowledgment), downlink channel (channel state) information (CSI: Channel State Information), and uplink radio resource allocation request (radio resource request, Scheduling Request (SR)).

CSI includes a Channel Quality Indicator (CQI), a Precoding Matrix Indicator (PMI), a Precoding Type Indicator (PTI), and a Rank Indicator (RI), which can be used respectively for specifying (representing) a preferable modulation scheme and coding rate, a preferable precoding matrix, a preferable PMI type, and a preferable rank. Indication may be used as a notation for each indicator. Moreover, the CQI and the PMI are classified into a wideband CQI and PMI in which transmission using all the Resource Blocks in a single cell is assumed and a subband CQI and PMI in which transmission using some contiguous Resource Blocks (subbands) in a single cell is assumed. Moreover, PMI may be a type of PMI that represents a single preferable precoding matrix by using two kinds of PMIs, a first PMI and a second PMI, in addition to a normal type of PMI, which represents a single preferable precoding matrix by using a single PMI.

The Physical Downlink Shared Channel (PDSCH) is also used to notify the terminal device of broadcast information (system information) that is not notified by paging or on the Physical Broadcast Channel, in addition to downlink data, as a layer-3 message. Radio resource allocation information of the Physical Downlink Shared Channel is indicated by a Physical Downlink Control Channel. The Physical Downlink Shared Channel is allocated to OFDM symbols other than the OFDM symbols used to transmit a Physical Downlink Control Channel and is transmitted. In other words, the Physical Downlink Shared Channel and the Physical Downlink Control Channel are time division multiplexed in a single subframe.

The Physical Uplink Shared Channel (PUSCH) mainly transmits uplink data and uplink control information which may also include uplink control information such as CSI and ACK/NACK. Moreover, the physical uplink shared channel is also used by the terminal device to notify the base station device of a layer-2 message and layer-3 message, which are higher-layer control information, in addition to uplink data. Radio resource allocation information of the Physical Uplink Shared Channel is provided by a Physical Downlink Control Channel, as in a case of downlink.

An Uplink Demodulation Reference Signal (also referred to as "uplink pilot signal" or "uplink pilot channel") includes a Reference Signal (DMRS) to be used by the base station device to demodulate the Physical Uplink Control Channel PUCCH and/or Physical Uplink Shared Channel PUSCH, and a Sounding Reference Signal (SRS) to be mainly used by the base station device to estimate an uplink channel state. Moreover, the sounding Reference Signal includes a periodic sounding Reference Signal (Periodic SRS), which is transmitted periodically, or an aperiodic Sounding Reference Signal (Aperiodic SRS), which is transmitted when transmission is instructed by the base station device.

A Physical Random Access Channel (PRACH) is a channel used for the notification (configuration) of a preamble sequence and includes a guard time. The preamble sequence is constituted so that the base station device is notified of the information with multiple sequences. For example, when 64 sequences are available, 6-bit information can be provided to the base station device. A Physical Random Access Channel is used by the terminal device as a means for accessing the base station device.

The terminal device uses the Physical Random Access Channel to request an uplink radio resource when no Physical Uplink Control Channel is configured for an SR or to request the base station device for a transmission timing adjustment information (also referred to as Timing Advance (TA) command) necessary for matching uplink transmission timing to a reception timing window of the base station device, for example. Moreover, the base station device can request the terminal device to start a random access procedure, by using a Physical Downlink Control Channel.

A layer-3 message is a message exchanged between the RRC (Radio Resource Control) layers of the terminal device and the base station device and handled in a protocol for a Control-plane (C-plane), and may be used as a synonym of RRC signalling or RRC message. A protocol handling user data (uplink data and downlink data) is referred to as "User-plane (UP (U-plane))" in contrast to "Control plane". Here, a transport block which is transmission data in the physical layer, includes C-plane messages and U-plane data in higher layers. Detailed description of other physical channels is omitted.

A communicable range (communication area) at each frequency controlled by the base station device is assumed to be a cell. Here, the communication area covered by the base station device may be different in size and shape for each frequency. Moreover, the covered area may be different for each frequency. A radio network in which cells having different types of base station devices and different cell radii coexist in the area on the same frequency and/or different frequencies to form a single communication system, is referred to as "Heterogeneous Network".

The terminal device operates by assuming the inside of a cell as a communication area. When the terminal device moves from a cell to a different cell, the terminal device moves to an appropriate different cell through a cell reselection procedure at the time of having no radio connection (during no communication) and through a handover procedure at the time of having radio connection (during communication). A suitable cell is in general a cell that is determined that access from the terminal device is not prohibited based on information specified by the base station device and that has a downlink reception quality satisfying a prescribed condition.

Moreover, the terminal device and the base station device may employ a technique for aggregating the frequencies (component carriers or frequency band) of a plurality of different frequency bands through carrier aggregation and treating the resultant as a single frequency (frequency band). A component carrier includes an uplink component carrier corresponding to the uplink and a downlink component carrier corresponding to the downlink. In this specification, "frequency" and "frequency band" may be used as synonyms.

For example, when five component carriers each having a frequency bandwidth of 20 MHz are aggregated through carrier aggregation, a terminal device capable of carrier aggregation performs transmission and/or reception by assuming that the aggregated carriers have a frequency bandwidth of 100 MHz. Note that component carriers to be aggregated may have contiguous frequencies or frequencies some or all of which are discontiguous. For example, assuming that available frequency bands are a band of 800 MHz, a band of 2 GHz, and a band of 3.5 GHz, a component carrier may be transmitted in a band of 800 MHz, another component carrier may be transmitted in a band of 2 GHz, and yet another component carrier may be transmitted in a band of 3.5 GHz.

It is also possible to aggregate multiple contiguous or discontiguous component carriers of the same frequency band. The frequency bandwidth of each component carrier may be narrower (e.g., 5 MHz or 10 MHz) than the receivable frequency bandwidth (e.g., 20 MHz) of the terminal device, and the frequency bandwidths of component carriers to be aggregated may be different from each other. Each frequency bandwidth is preferably equal to any of the frequency bandwidths of cells of the related art in consideration of backward compatibility but may be a frequency bandwidth different from any of the frequency bands of cells of the related art.

Moreover, component carriers (carrier types) without backward compatibility may be aggregated. Note that the number of uplink component carriers to be allocated to (configured for or added for) the terminal device by the base station device is preferably the same as or fewer than the number of downlink component carriers.

A cell constituted of an uplink component carrier in which an uplink control channel is configured for a radio resource request and a downlink component carrier having a cell-specific connection with the uplink component carrier is referred to as "Primary cell (PCell)". A cell constituted of component carriers other than those of the Primary cell is referred to as "Secondary cell (SCell)". The terminal device receives a paging message, detects update of broadcast information, carries out an initial access procedure, configures security information, and the like in a Primary cell, and need not perform these operations in Secondary cells.

Although a Primary cell is not a target of Activation and Deactivation controls (in other words, considered as being activated at any time), a Secondary cell has activated and deactivated states, the change of which is explicitly specified by the base station device or is made based on a timer configured for the terminal device for each component carrier. The Primary cell and Secondary cell are collectively referred to as "Serving cell".

Carrier aggregation is communication using multiple component carriers (frequency bands) by multiple cells and is also referred to as "cell aggregation". The terminal device may have radio connection with the base station device via a relay station device (or repeater) for each frequency. In other words, the base station device of the present embodiment may be replaced with a relay station device.

The base station device manages a cell, which is an area where terminal devices can communicate with the base station device, for each frequency. A single base station device may manage multiple cells. Cells are classified into multiple types of cells depending on the sizes of the areas (cell size) that allow for communication with terminal devices. For example, cells are classified into macro cells and small cells. Moreover, small cells are classified into femto cells, pico cells, and nano cells depending on the sizes of the areas. When a terminal device can communicate with a certain base station device, the cell configured so as to be used for the communication with the terminal device is referred to as "Serving cell" while the other cells not used for the communication are referred to as "Neighboring cell", among the cells of the base station device.

In other words, in carrier-aggregation (also referred to as "carrier aggregation"), a plurality of Serving cells thus configured include one Primary cell and one or a plurality of Secondary cells.

A Primary cell is a Serving cell in which an initial connection establishment procedure has been carried out, a Serving cell in which a connection re-establishment procedure has been started, or a cell indicated as a Primary cell during a handover procedure. The Primary cell operates at a primary frequency. At the point of time when a connection is (re)established, or later, a Secondary cell may be configured. Each Secondary cell operates at a secondary frequency. The connection may be referred to as "RRC connection". For the terminal device supporting CA, a single Primary cell and one or more Secondary cells are aggregated.

In the present embodiment, Licensed Assisted Access (LAA) is used. In the LAA, an allocated frequency is configured (used) for a Primary cell, and an unallocated frequency is configured for at least one of Secondary cells. A Secondary cell for which an unallocated frequency is configured is assisted by a Primary cell or a Secondary cell for which an allocated frequency is configured. For example, a Primary cell or a Secondary cell for which an allocated frequency is configured notifies a Secondary cell for which an unallocated frequency is configured, of configuration and/or control information, by RRC signalling, MAC signalling, and/or PDCCH signalling. In the present embodiment, a cell assisted by the Primary cell or the Secondary cell is also referred to as "LAA cell". The LAA cell can be aggregated with (assisted by) a Primary cell and/or a Secondary cell by carrier aggregation. A Primary cell or a Secondary cell assisting the LAA cell is also referred to as "assist cell". Furthermore, a cell for which an allocated frequency is configured is also referred to as "normal cell (cell of the related art)", and a subframe in the normal cell is also referred to as "normal subframe (subframe of the related art)". The normal subframe includes a downlink subframe, an uplink subframe, and a special subframe. In the present embodiment, the normal subframe is described in distinction from a subframe used in the LAA cell.

The LAA cell can be aggregated with (assisted by) a Primary cell and/or a Secondary cell by dual connectivity.

A basic configuration (architecture) of dual connectivity will be described below. For example, a case will be described where a terminal device 1 connects to a plurality of base station devices 2 (for example, a base station device 2-1 and a base station device 2-2) at the same time. The base station device 2-1 is a base station device constituting a macro cell, and the base station device 2-2 is a base station device constituting a small cell. The terminal device 1 connecting to the base station devices 2 at the same time by using the plurality of cells belonging to the plurality of base station devices 2 as described above is referred to as "dual connectivity". The cells belonging to the respective base station devices 2 may be operated at the same frequency or different frequencies.

Note that carrier aggregation is different from dual connectivity in that one of the base station devices 2 manages a plurality of cells and the frequency of each cell differs from each other. In other words, carrier aggregation is a technique for connecting one terminal device 1 and one base station device 2 via a plurality of cells having different frequencies, while dual connectivity is a technique for connecting one terminal device 1 and the plurality of base station devices 2 via a plurality of cells having the same frequency or different frequencies.

The terminal device 1 and the base station devices 2 can apply a technique used for carrier aggregation, to dual connectivity. For example, the terminal device 1 and the base station devices 2 may apply a technique of allocation of a Primary cell and Secondary cells or Activation/Deactivation, to cells connected through dual connectivity.

In dual connectivity, the base station device 2-1 or the base station device 2-2 is connected to MME and SGW via a backbone line. The MME is a host control station device corresponding to a Mobility Management Entity (MME) and has the functions of managing mobility and performing authentication control (security control) for the terminal device 1, and configuring routes for user data to the base station devices 2. The SGW is a host control station device corresponding to a Serving Gateway (S-GW) and has the functions of transmitting user data in accordance with the route for user data to the terminal device 1 configured by the MME.

Moreover, in dual connectivity, the connection route between the base station device 2-1 or the base station device 2-2 and the SGW is referred to as "SGW interface". Moreover, the connection route between the base station device 2-1 or the base station device 2-2 and the MME is referred to as "MME interface". Moreover, the connection route between the base station device 2-1 and the base station device 2-2 is referred to as "base station interface". The SGW interface is also referred to as "S1-U interface" in EUTRA. Moreover, the MME interface is also referred to as "S1-MME interface" in EUTRA. Moreover, the base station interface is also referred to as "X2 interface" in EUTRA.

An example of architecture for enabling dual connectivity will be described. In dual connectivity, the base station device 2-1 and the MME are connected via the MME interface. Moreover, the base station device 2-1 and the SGW 400 are connected via the SGW interface. Moreover, the base station device 2-1 provides, to the base station device 2-2, the communication path to the MME and/or the SGW via the base station interface. In other words, the base station device 2-2 is connected to the MME and/or the SGW via the base station device 2-1.

Moreover, another example of another architecture for enabling dual connectivity will be described. In dual connectivity, the base station device 2-1 and the MME are connected via the MME interface. Moreover, the base station device 2-1 and the SGW are connected via the SGW interface. The base station device 2-1 provides, to the base station device 2-2, the communication route to the MME via the base station interface. In other words, the base station device 2-2 is connected to the MME via the base station device 2-1. Moreover, the base station device 2-2 is connected to the SGW via the SGW interface.

Note that a constitution in which the base station device 2-2 and the MME are directly connected via the MME interface may be employed.

Based on description from a different point of view, dual connectivity is an operation whereby a prescribed terminal device consumes radio resources provided from at least two different network points (master base station device (MeNB or Master eNB) and secondary base station device (SeNB or Secondary eNB)). In other words, in dual connectivity, a terminal device is configured to establish an RRC connection to at least two network points. In dual connectivity, the terminal device may be connected via a non-ideal backhaul in RRC connected (RRC_CONNECTED) state.

In dual connectivity, a base station device that is connected to at least the S1-MME and that acts as the mobility anchor of the core network is referred to as "master base station device". Moreover, a base station device that is not the master base station device and that provides supplemental radio resources to the terminal device is referred to as "secondary base station device". A group of Serving cells that is associated with the master base station device may be referred to as "Master Cell Group" (MCG), and a group of Serving cells that is associated with the secondary base station device may be referred to as "Secondary cell Group" (SCG). Note that the cell groups may be Serving cell groups.

In dual connectivity, the Primary cell belongs to the MCG Additionally, in the SCG, the Secondary cell that corresponds to the Primary cell is referred to as "Primary Secondary cell" (pSCell). Note that the pSCell may be referred to as "special cell" or "Special Secondary cell" (Special SCell). Some of the functions (for example, functions for transmitting and receiving a PUCCH) of the PCell (the base station device constituting the PCell) may be supported by the Special SCell (the base station device constituting the Special SCell). Additionally, some of the functions of the PCell may be supported in the pSCell. For example, the function for transmitting a PDCCH may be supported by the pSCell. Additionally, the function for performing a PDCCH transmission may be supported in the pSCell using a search space different from a CSS or USS. For example, the search space different from a USS is a search space determined based on a value defined in the specification, a search space determined based on an RNTI different from a C-RNTI, a search space determined based on a value configured by a higher layer, that is different from the RNTI, or the like. Moreover, the pSCell may constantly be in a starting state. Moreover, the pSCell is a cell capable of receiving the PUCCH.

In dual connectivity, the Data Radio Bearer (DRB) may be individually allocated to the MeNB and the SeNB. On the other hand, the Signalling Radio Bearer (SRB) may be allocated only to the MeNB. In dual connectivity, a duplex mode may be configured individually for the MCG and the SCG or the PCell and the pSCell. In dual connectivity, the MCG and the SCG or the PCell and the pSCell need not necessarily be synchronized with each other. In dual connectivity, a plurality of parameters for timing adjustment (TAG or Timing Advance Group) may be configured for each of the MCG and the SCG. In other words, the terminal device is capable of performing uplink transmission at a plurality of different timings in each CG.

In dual connectivity, the terminal device is allowed to transmit UCI corresponding to a cell in the MCG only to an MeNB (the PCell) and to transmit UCI corresponding to a cell in the SCG only to an SeNB (the pSCell). For example, the UCI is an SR, HARQ-ACK, and/or CSI. Additionally, in each UCI transmission, a transmission method using the PUCCH and/or the PUSCH is applied to each cell group.

All signals can be transmitted and received in the Primary cell, but some signals cannot be transmitted and received in the Secondary cell. For example, the Physical Uplink Control Channel (PUCCH) is transmitted only in the Primary cell. Additionally, unless a plurality of Timing Advance Groups (TAG) is set between the cells, the Physical Random Access Channel (PRACH) is transmitted only in the Primary cell. Additionally, the Physical Broadcast Channel (PBCH) is transmitted only in the Primary cell. Additionally, a Master Information Block (MIB) is transmitted only in the Primary cell. Signals that can be transmitted and received in the Primary cell are transmitted and received in the primary Secondary cell. For example, the PUCCH may be transmitted in the primary Secondary cell. Additionally, the PRACH may be transmitted in the primary Secondary cell, regardless of whether a plurality of TAGs are configured. Additionally, the PBCH and the MIB may be transmitted in the primary Secondary cell.

Radio link failure (RLF) is detected in the Primary cell. Even in a case where conditions for the detection of an RLF are in place in the Secondary cell, the detection of the RLF is not recognized. However, in the primary Secondary cell, the RLF is detected in a case where the conditions are in place. When an RLF is detected in the primary Secondary cell, the higher layer of the primary Secondary cell notifies, to the higher layer of the Primary cell, that the RLF has been detected. Semi-Persistent Scheduling (SPS) or Discontinuous Transmission (DRX) may be used in the Primary cell. The same DRX as in the Primary cell may be used in the Secondary cell. Fundamentally, in the Secondary cell, the MAC configuration information/parameters are shared with the Primary cell/primary Secondary cell of the same cell group. Some of the parameters (for example, sTAG-Id) may be set for each Secondary cell. Some of the timers or counters may be applied only to the Primary cell and/or the primary Secondary cell. A timer or counter to be applied only to the Secondary cell may be set.

In one example of cases where the dual connectivity is applied to an LAA cell, the MCG (base station device 2-1) is a base station device constituting a Primary cell, and the SCG (base station device 2-2) is a base station device constituting the LAA cell. That is, the LAA cell is configured as a pSCell of the SCG.

In another example of cases where the dual connectivity is applied to an LAA cell, the MCG is a base station device constituting a Primary cell, and the SCG is a base station device constituting a pSCell and the LAA cell. That is, the LAA cell is assisted by the pSCell in the SCG. Note that in a case of further configuring a Secondary cell for the SCG, the LAA cell may be assisted by the Secondary cell.

In another example of cases where the dual connectivity is applied to an LAA cell, the MCG is a base station device constituting a Primary cell and the LAA cell, and the SCG is a base station device constituting a pSCell. That is, the LAA cell is assisted by the Primary cell in the MCG Note that in a case of further configuring a Secondary cell for the MCG, the LAA cell may be assisted by the Secondary cell.

Figure 3:
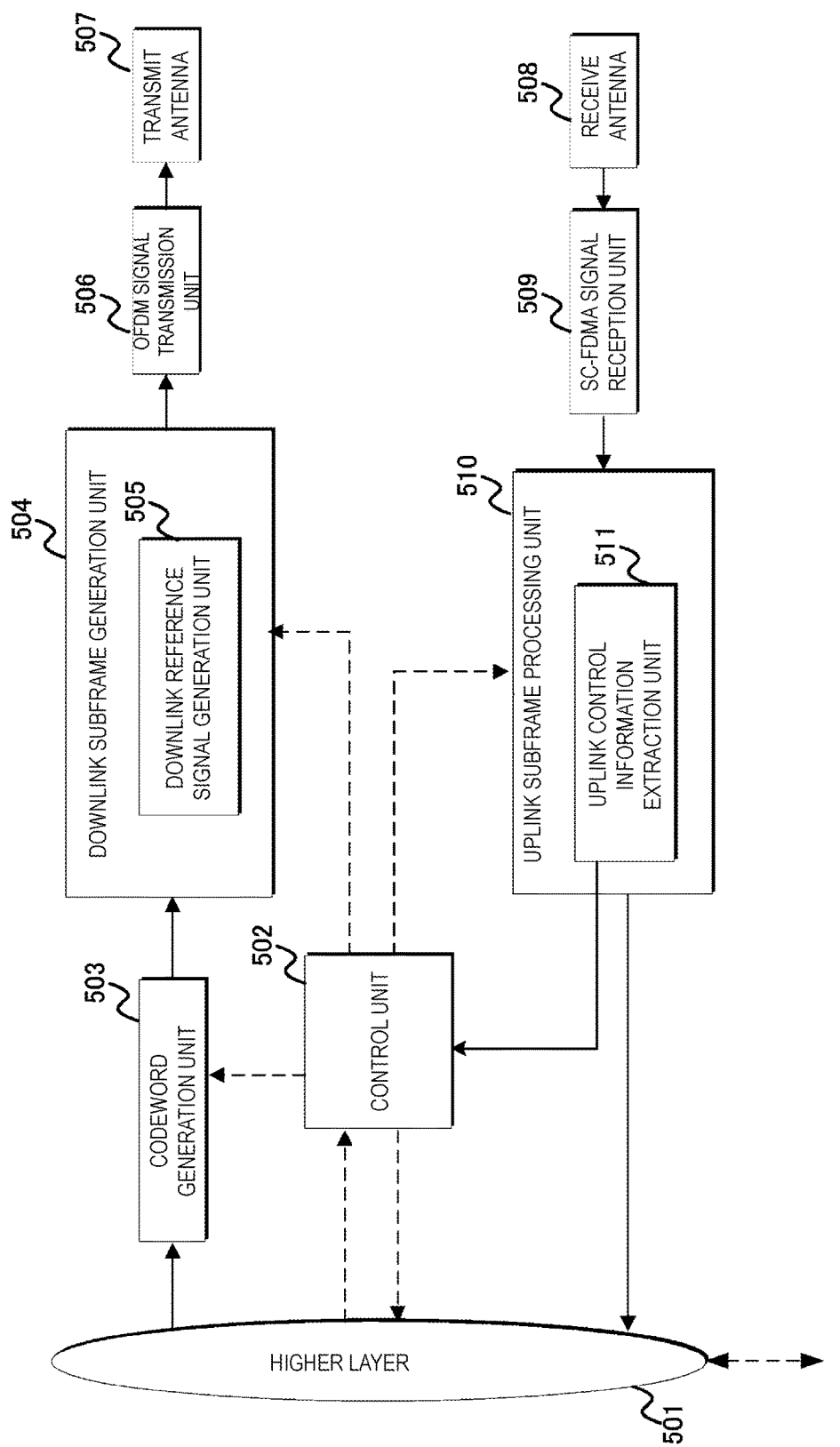
FIG. 3 is a schematic diagram illustrating an example of a block configuration of a base station device 2 according to the present embodiment.

FIG. 3 is a schematic diagram illustrating an example of a block configuration of the base station device 2 according to the present embodiment. The base station device 2 includes a higher layer (higher-layer control information notification unit) 501, a control unit (base station control unit) 502, a codeword generation unit 503, a downlink subframe generation unit 504, an OFDM signal transmission unit (downlink transmission unit) 506, a transmit antenna (base station transmit antenna) 507, a receive antenna (base station receive antenna) 508, an SC-FDMA signal reception unit (CSI reception unit) 509, and an uplink subframe processing unit 510. The downlink subframe generation unit 504 includes a downlink Reference Signal generation unit 505. Moreover, the uplink subframe processing unit 510 includes an uplink control information extraction unit (CSI acquisition unit) 511.

Figure 4:
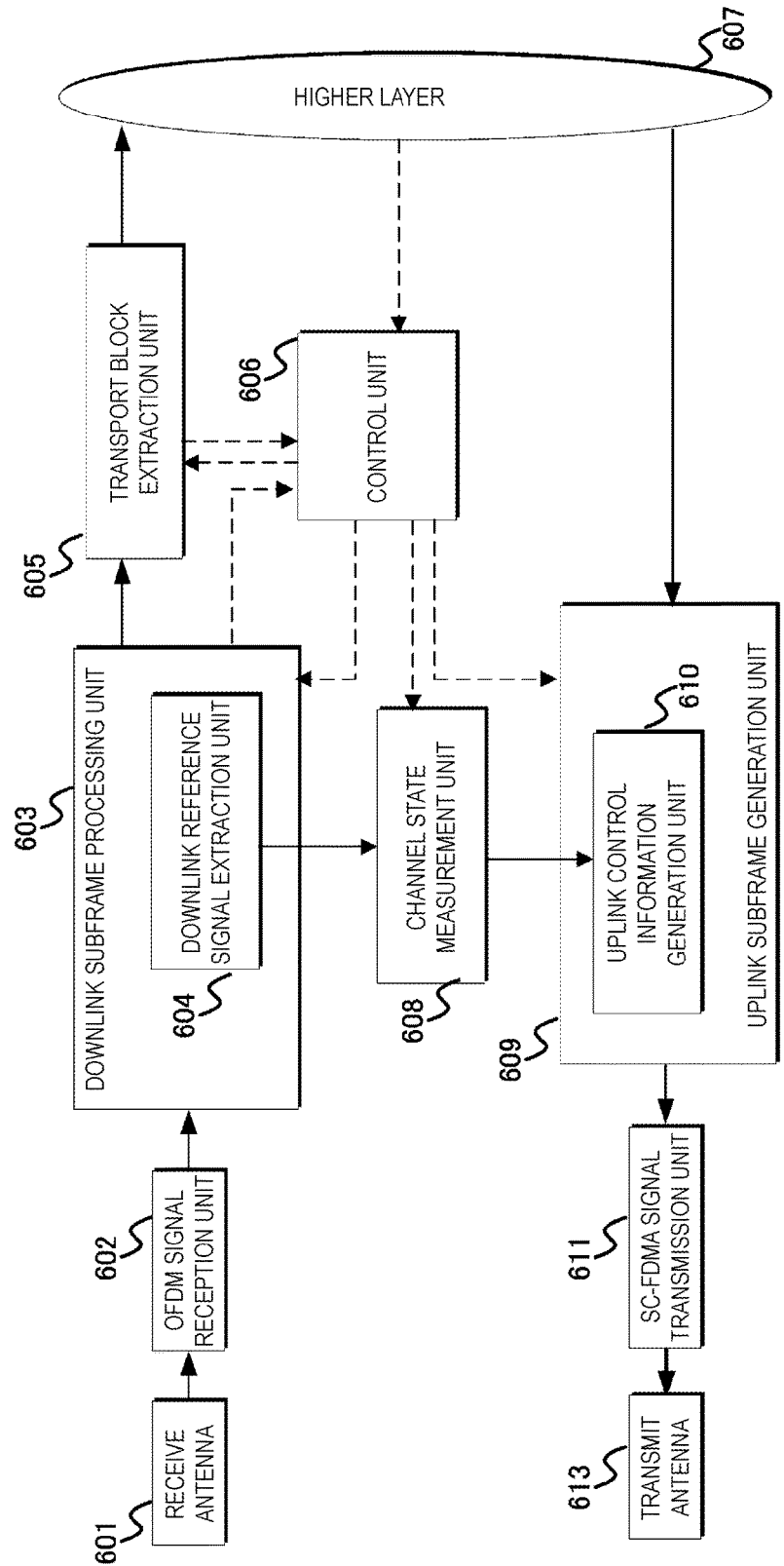
FIG. 4 is a schematic diagram illustrating an example of a block configuration of a terminal device 1 according to the present embodiment.

FIG. 4 is a schematic diagram illustrating an example of a block configuration of a terminal device 1 according to the present embodiment. The terminal device 1 includes a receive antenna (terminal receive antenna) 601, an OFDM signal reception unit (downlink reception unit) 602, a downlink subframe processing unit 603, a transport block extraction unit (data extraction unit) 605, a control unit (terminal control unit) 606, a higher layer (higher-layer control information acquisition unit, higher layer processing unit) 607, a channel state measurement unit (CSI generation unit) 608, an uplink subframe generation unit 609, SC-FDMA signal transmission units (UCI transmission units) 611 and 612, and transmit antennas (terminal transmit antennas) 613 and 614. The downlink subframe processing unit 603 includes a downlink Reference Signal extraction unit 604. Moreover, the uplink subframe generation unit 609 includes an uplink control information generation unit (UCI generation unit) 610.

First, a flow of downlink data transmission and reception will be described with reference to FIG. 3 and FIG. 4. In the base station device 2, the control unit 502 holds a Modulation and Coding Scheme (MCS) indicating a modulation scheme, a coding rate, and the like in the downlink, downlink resource allocation indicating RBs to be used for data transmission, and information to be used for HARQ control (a redundancy version, an HARQ process number, and a new data indicator) and controls the codeword generation unit 503 and downlink subframe generation unit 504 based on these elements. Downlink data (also referred to as downlink transport block) transmitted from the higher layer 501 is processed through error correction coding, rate matching, and the like in the codeword generation unit 503 under the control of the control unit 502 and then, a codeword is generated. Two codewords at maximum are transmitted at the same time in a single subframe of a single cell. In the downlink subframe generation unit 504, a downlink subframe is generated in accordance with an instruction from the control unit 502. First, a codeword generated in the codeword generation unit 503 is converted into a modulation symbol sequence through a modulation process, such as Phase Shift Keying (PSK) modulation or Quadrature Amplitude Modulation (QAM). Moreover, a modulation symbol sequence is mapped to REs of some RBs, and a downlink subframe for each antenna port is generated through a precoding process. In this operation, the transmission data sequence transmitted from the higher layer 501 includes higher-layer control information, which is control information on the higher layer (e.g., dedicated (individual) Radio Resource Control (RRC) signalling). Moreover, in the downlink Reference Signal generation unit 505, a downlink Reference Signal is generated. The downlink subframe generation unit 504 maps the downlink Reference Signal to the REs in the downlink subframes in accordance with an instruction from the control unit 502.

The downlink subframe generated in the downlink subframe generation unit 504 is modulated to an OFDM signal in the OFDM signal transmission unit 506 and then transmitted via the transmit antenna 507. Although a configuration of including one OFDM signal transmission unit 506 and one transmit antenna 507 is provided as an example here, a configuration of including multiple OFDM signal transmission units 506 and transmit antennas 507 may be employed when downlink subframes are transmitted on multiple antenna ports. Moreover, the downlink subframe generation unit 504 may also have the capability of generating physical-layer downlink control channels, such as a PDCCH and an EPDCCH to map the channels to REs in downlink subframes. A plurality of base station devices (the base station device 2-1 and the base station device 2-2) transmit separate downlink subframes.

In the terminal device 1, an OFDM signal is received by the OFDM signal reception unit 602 via the receive antenna 601, and an OFDM demodulation process is performed on the signal. The downlink subframe processing unit 603 first detects physical-layer downlink control channels, such as a PDCCH and an EPDCCH. More specifically, the downlink subframe processing unit 603 decodes the signal by assuming that a PDCCH and an EPDCCH have been transmitted in the regions to which the PDCCH and the EPDCCH can be allocated, and checks Cyclic Redundancy Check (CRC) bits added in advance (blind decoding). In other words, the downlink subframe processing unit 603 monitors a PDCCH and an EPDCCH. When the CRC bits match an ID (a single terminal-specific identifier assigned to a single terminal, such as a Cell-Radio Network Temporary Identifier (C-RNTI) or a Semi Persistent Scheduling-C-RNTI (SPS-C-RNTI), or a temporarily C-RNTI) assigned by the base station device in advance, the downlink subframe processing unit 603 recognizes that a PDCCH or an EPDCCH has been detected and extracts a PDSCH by using control information included in the detected PDCCH or EPDCCH. The control unit 606 holds an MCS indicating a modulation scheme, a coding rate, and the like in the downlink based on the control information, downlink resource allocation indicating RBs to be used for downlink data transmission, and information to be used for HARQ control, and controls the downlink subframe processing unit 603, the transport block extraction unit 605, and the like based on these elements. More specifically, the control unit 606 performs control so as to carry out an RE mapping process in the downlink subframe generation unit 504, an RE demapping process and demodulation process corresponding to the modulation process, and the like. The PDSCH extracted from the received downlink subframe is transmitted to the transport block extraction unit 605. Furthermore, the downlink Reference Signal extraction unit 604 in the downlink subframe processing unit 603 extracts the downlink Reference Signal from the downlink subframe. In the transport block extraction unit 605, a rate matching process, a rate matching process corresponding to error correction coding, error correction decoding, and the like in the codeword generation unit 503 are carried out, and a transport block is extracted and transmitted to the higher layer 607. The transport block includes higher-layer control information, and the higher layer 607 notifies the control unit 606 of a necessary physical-layer parameter based on the higher-layer control information. The plurality of base station devices 2 (the base station device 2-1 and the base station device 2-2) transmit separate downlink subframes, and the terminal device 1 receives the downlink subframes. Hence, the above-described processes may be carried out for the downlink subframe of each of the plurality of base station devices 2. In this case, the terminal device 1 may recognize that multiple downlink subframes have been transmitted from the multiple base station devices 2, or need not recognize this. In a case where the terminal device 1 does not recognize the above, the terminal device 1 may simply recognize that multiple downlinks subframes have been transmitted from multiple cells. Moreover, the transport block extraction unit 605 determines whether the transport block has been detected correctly and transmits the determination result to the control unit 606.

Next, a flow of uplink signal transmission and reception will be described. In the terminal device 1, a downlink Reference Signal extracted by the downlink Reference Signal extraction unit 604 is transmitted to the channel state measurement unit 608 under the instruction from the control unit 606, the channel state and/or interference is measured in the channel state measurement unit 608, and further CSI is calculated based on the measured channel state and/or interference. The control unit 606 instructs the uplink control information generation unit 610 to generate an HARQ-ACK (DTX (not transmitted yet), ACK (detection succeeded), or NACK (detection failed)) and to map the HARQ-ACK to a downlink subframe, based on the determination result of whether the transport block is correctly detected. The terminal device 1 performs these processes on the downlink subframe of each of multiple cells. In the uplink control information generation unit 610, a PUCCH including the calculated CSI and/or HARQ-ACK is generated. In the uplink subframe generation unit 609, the PUSCH including the uplink data transmitted from the higher layer 607 and the PUCCH generated by the uplink control information generation unit 610 are mapped to RBs in an uplink subframe, and an uplink subframe is generated. The uplink subframe is subjected to the SC-FDMA modulation to generate an SC-FDMA signal, and the SC-FDMA signal is transmitted via the transmit antenna 613 by the SC-FDMA signal transmission unit 611.

Hereinafter, details of the LAA cell will be described.

A frequency used by the LAA cell is shared with other communication systems and/or other LTE operators. In frequency sharing, the LAA cell is required to be impartial to other communication systems and/or other LTE operators. For example, in a communication scheme used in the LAA cell, an impartial frequency sharing technique (method) is required. In other words, the LAA cell is a cell configured to perform a communication scheme (communication procedure) to which an impartial frequency sharing technique can be applied (used).

An example of the impartial frequency sharing technique is Listen-Before-Talk (LBT). Before a certain base station or a terminal transmits a signal using a certain frequency (component carrier, cell), the LBT identifies (detects, assumes, determines) whether the frequency is in an idle state (available state, congestion state, Presence, or Occupied) or a busy state (unavailable state, not-congested state, Absence, or Clear), by measuring (detecting) an interference power (interference signal, received power, received signal, noise power, noise signal) and the like, of the frequency. In a case that the frequency is identified to be in the idle state based on the LBT, the LAA cell can transmit a signal at a predetermined timing in the frequency. In a case that the frequency is identified to be in the busy state based on the LBT, the LAA cell does not transmit a signal at a predetermined timing in the frequency. The LBT can control so as not to interfere with signals transmitted by other base stations and/or terminals including other communication systems and/or other LTE operators.

A procedure of the LBT is defined as a mechanism in which a certain base station or a terminal applies a CCA check before using the frequency (channel). In order to identify whether the frequency is in the idle state or the busy state, the CCA detects power or a signal for determining presence or absence of another signal, in the channel. Note that in the present embodiment, a definition of the CCA may be equivalent to the definition of the LBT.

In the CCA, a various method can be used for determining presence or absence of another signal. For example, the determination in the CCA is based on whether the interference power in a certain frequency exceeds a certain threshold value. Moreover, for example, the determination in the CCA is based on whether the received power of a predetermined signal or channel in a certain frequency exceeds a certain threshold value. The threshold value may be prescribed beforehand. The threshold value may be configured from the base station or another terminal. The threshold value may be determined (configured) at least based on another value (a parameter) such as transmit power (maximum transmit power).

Note that the CCA in the LAA cell need not be recognized by the terminal connected to (configured for) the LAA cell.

The LAA cell may be defined as a cell that is different from a Secondary cell using an allocated frequency. For example, the LAA cell is configured to be different from the configuration of a Secondary cell using an allocated frequency. Some of parameters configured for the LAA cell are not configured for a Secondary cell using an allocated frequency. Some of parameters configured for a Secondary cell using an allocated frequency are not configured for the LAA cell. In the present embodiment, although the LAA cell will be described as a cell that is different from a Primary cell and a Secondary cell, the LAA cell may be defined as one of Secondary cells. Further, a Secondary cell of the related art may also be referred to as "first Secondary cell", and the LAA cell may also be referred to as "second Secondary cell". Moreover, a Primary cell and Secondary cell of the related art are also referred to as "first Serving cell", and the LAA cell may also be referred to as "second Serving cell".

Furthermore, the LAA cell may have a frame structure type different from the one of the related art. For example, the Serving cell of the related art uses (configures) a first frame structure type (FDD, frame structure type 1) or a second frame structure type (TDD, frame structure type 2), but the LAA cell uses (configures) a third frame structure type (frame structure type 3).

Here, an unallocated frequency is different from an allocated frequency allocated as an exclusive frequency to a predetermined operator. For example, an unallocated frequency is used by wireless LAN. Moreover, an unallocated frequency is not configured for the LTE of the related art, and an allocated frequency can be configured for the LTE of the related art, for example. In the present embodiment, a frequency configured for the LAA cell will be described as an unallocated frequency, however, it is not limited thereto. That is, an unallocated frequency can be replaced with a frequency configured for the LAA cell. For example, an unallocated frequency cannot be configured for a Primary cell, and can be configured only for a Secondary cell. For example, an unallocated frequency also includes frequencies shared by a plurality of operators. Moreover, an unallocated frequency is configured only for cells to be configured, assumed, and/or processed differently from a Primary cell or Secondary cell of the related art, for example.

The LAA cell can be a cell configured to use a scheme different from the scheme of the related art, with respect to the constitution of a radio frame, a physical signal, and/or a physical channel and the communication procedures in LTE.

For example, a predetermined signal and/or channel configured for (transmitted in) a Primary cell and/or Secondary cell is not configured for (transmitted in) the LAA cell. The predetermined signal and/or channel includes CRS, DS, PDCCH, EPDCCH, PDSCH, PSS, SSS, PBCH, PHICH, PCFICH, CSI-RS, SIB, and/or the like. For example, a signal and/or channel not configured for the LAA cell is as follows. Note that a signal and/or channel described below may be used in combination. Note that in the present embodiment, a signal and/or channel not configured for the LAA cell may be replaced with a signal and/or channel for which the terminal does not expect transmission from the LAA cell.

(1) In the LAA cell, control information of the physical layer is not transmitted on the PDCCH, but only on the EPDCCH.

(2) In the LAA cell, a CRS, DMRS, URS, PDCCH, EPDCCH and/or PDSCH is not transmitted in all subframes including a subframe that is even activated (ON), and the terminal does not assume that transmission is performed in all the subframes.

(3) In the LAA cell, the terminal assumes that a DRS, PSS, and/or SSS is transmitted in a subframe that is activated (ON).

(4) In the LAA cell, the terminal is notified of information on CRS mapping for each subframe, and assumes the CRS mapping based on the information. For example, the assumption of the CRS mapping is that a CRS is not mapped to all Resource Elements of the subframe. The assumption of the CRS mapping is that a CRS is not mapped to some Resource Elements of the subframe (for example, all Resource Elements in the first two OFDM symbols). The assumption of CRS mapping is that a CRS is mapped to all Resource Elements of the subframe. Moreover, information on the CRS mapping is notified from the LAA cell or a cell different form the LAA cell, for example. The information on the CRS mapping is included in the DCI, and notified by the PDCCH or EPDCCH.

Further, a predetermined signal and/or channel not configured for (transmitted in) a Primary cell and/or a Secondary cell is not configured for (transmitted in) the LAA cell, for example.

In addition, in the LAA cell, only downlink component carriers or subframes are defined, and only downlink signals and/or channels are transmitted, for example. That is, in the LAA cell, uplink component carriers or subframes are not defined, and uplink signals and/or channels are not transmitted.

Moreover, in the LAA cell, a compatible Downlink Control Information (DCI) format is different from a DCI format compatible to a Primary cell and/or a Secondary cell, for example. The DCI format corresponding only to the LAA cell is prescribed. The DCI format corresponding to the LAA cell includes control information effective only for the LAA cell.

Moreover, in the LAA cell, the assumption of a signal and/or channel is different from that in a Secondary cell of the related art, for example.

First, the assumption of a signal and/or channel in a Secondary cell of the related art will be described. A terminal that satisfies some or all of the following conditions assumes that a PSS, SSS, PBCH, CRS, PCFICH, PDSCH, PDCCH, EPDCCH, PHICH, DMRS, and/or CSI-RS may not be transmitted by the Secondary cell, except for DS transmission. Moreover, the terminal assumes that the DS is always transmitted by the Secondary cell. Further, the assumption continues to a subframe in which an activation command (command to activate) is received in a Secondary cell at a carrier frequency at which the terminal exists.

(1) The terminal supports the configuration (parameter) for the DS.

(2) The terminal is configured to perform RRM measurement based on the DS, in the Secondary cell.

(3) The Secondary cell is deactivated (in a deactivated state).

(4) The terminal is not configured to receive MBMS by the higher layer, in the Secondary cell.

Moreover, in a case that the Secondary cell is activated (that is in an activated state), the terminal assumes that a PSS, SSS, PBCH, CRS, PCFICH, PDSCH, PDCCH, EPDCCH, PHICH, DMRS, and/or CSI-RS is transmitted by the Secondary cell, in a configured predetermined subframe or all subframes.

Next, an example of an assumption of a signal and/or channel in the LAA cell will be described. A terminal that satisfies some or all of the following conditions assumes that a PSS, SSS, PBCH, CRS, PCFICH, PDSCH, PDCCH, EPDCCH, PHICH, DMRS, and/or CSI-RS including DS transmission may not be transmitted by the LAA cell. Further, the assumption continues to a subframe in which an activation command (command to activate) is received in a Secondary cell at a carrier frequency at which the terminal exists.

(1) The terminal supports the configuration (parameter) for the DS.

(2) The terminal is configured to perform RRM measurement based on the DS, in the LAA cell.

(3) The LAA cell is deactivated (in a deactivated state).

(4) The terminal is not configured to receive MBMS by the higher layer, in the LAA cell.

Furthermore, another example of the assumption of a signal and/or channel in the LAA cell will be described. In a case that the LAA cell is deactivated (in a deactivated state), the assumption of the signal and/or the channel in the LAA cell is the same as the assumption of the signal and/or the channel in a Secondary cell of the related art. In a case that the LAA cell is activated (in an activated state), the assumption of the signal and/or the channel in the LAA cell is different from the assumption of the signal and/or the channel in a Secondary cell of the related art. For example, in the case that the LAA cell is activated (in the activated state), the terminal assumes that a PSS, SSS, PBCH, CRS, PCFICH, PDSCH, PDCCH, EPDCCH, PHICH, DMRS, and/or CSI-RS is not transmitted by the LAA cell, except for the prescribed subframe configured to the LAA cell. The details will be described later.

Next, an example of a communication procedure in the LAA cell will be described. In the LAA cell, it is possible to start transmission of a channel and/or signal at a timing not depending on a Subframe Boundary, based on the LBT. Furthermore, in the LAA cell, it is possible to end transmission of a channel and/or signal at a timing not depending on a Subframe Boundary, based on the LBT and a maximum burst length which can be transmitted. That is, a channel and/or signal can be transmitted in a partial subframe. For example, the partial subframe can be defined as follows. Here, in the present embodiment, an OFDM symbol with which transmission is possible, as indicated by the partial subframe, is defined as an OFDM symbol which the terminal assumes that each or all channel(s) and/or signal(s) can be transmitted with the OFDM symbol.

(1) In a certain subframe, a region up to the last OFDM symbol (Subframe Boundary) of the subframe from any OFDM symbol of the subframe can perform transmission. In the present embodiment, it is also referred to as first partial subframe.

(2) In a certain subframe, a region up to any OFDM symbol of the subframe from the first OFDM symbol (Subframe Boundary) of the subframe can perform transmission. In the present embodiment, it is also referred to as second partial subframe.

(3) In a certain subframe, a region up to any OFDM symbol of the subframe up from any OFDM symbol of the subframe can perform transmission. In the present embodiment, it is also referred to as third partial subframe.

Furthermore, in the partial subframe, any OFDM symbols of the subframe can be limited to a prescribed number. For example, the prescribed number is two, three, and/or four.

Furthermore, in a case that the prescribed number is two, for example, either one slot or one subframe (two slots) can be applied. That is, a unit of a second EPDCCH in a time direction is one slot or one subframe. In a case that the unit of the second EPDCCH in the time direction is one slot, the unit of a PDSCH in the time direction scheduled in the second EPDCCH can also be one slot. In other words, similarly to the LTE of the related art, a communication method (scheme) with one subframe as a unit and a communication method with half the LTE of the related art being one slot as a unit are switched and used. A reduction of latency in the radio communication is possible with one slot as a unit. Thus, a communication method is possible, the method being capable of further achieving a communication method capable of reducing latency in the radio communication, in addition to the communication method similar to the LTE of the related art. The above-described method can be applied not only to the LAA cell but also to the LTE used in the Licensed spectrum of the related art. That is, all methods and constitutions described in the present embodiment can be applied not only to the LAA cells but also to the LTE used in the Licensed spectrum of the related art.

Here, in the LAA cell, a duration is prescribed during which the LAA cell can transmit in a case that the transmission of the channel and/or signal is possible, based on the LBT. The duration is also referred to as a maximum burst length, and the channel and/or signal transmitted during the maximum burst length is also referred to as burst. For example, the maximum burst length is four millisecond (a length of four subframes). Therefore, in each burst, a subframe at the head of the burst is a first partial subframe and a subframe at the end of the burst is a second partial subframe. Note that the partial subframe is also referred to as floating subframe. Furthermore, the partial subframe may be a subframe including a symbol/subframe in which the channel and/or signal is not transmitted (cannot be transmitted) described in the present embodiment.

Furthermore, in a certain subframe, a subframe in which a region from the first OFDM symbol of the subframe (Subframe Boundary) to the last OFDM symbol of the subframe (Subframe Boundary) can perform transmission is also referred to as full subframe. The full subframe is a subframe other than the partial subframes. The full subframe is the subframe other than a subframe at the head of the burst or a subframe at the end of the burst in each burst. The full subframe may be a subframe not including a symbol/subframe in which the channel and/or signal described in the present embodiment are not transmitted (cannot be transmitted). Furthermore, the full subframe in the LAA cell may be a subframe having the same constitution and/or process as those of a normal subframe in a normal cell.

Next, an example of a communication procedure in the LAA cell will be described. In the LAA cell, in a case of capable of transmitting a channel and/or signal, based on the LBT, a duration is prescribed during which the LAA cell can transmit them. The duration is also referred to as a maximum burst length, and a channel and/or signal transmitted during the length is also referred to as burst. The burst is constituted of one or more contiguous downlink subframes. Furthermore, in a case that there is one or more contiguous uplink subframes in the burst, it is preferable to have a constitution in which one or more contiguous uplink subframes follows one or more contiguous downlink subframes. Note that it is preferable that there is a subframe for a downlink-uplink switching between one or more contiguous downlink subframes and one or more contiguous uplink subframes.

Furthermore, for the sake of description, one or more contiguous downlink subframes in the burst are referred to as a downlink transmission burst, one or more contiguous uplink subframes in the burst are referred to as uplink transmission burst, and the subframe for the downlink-uplink switching is referred to as a special subframe (special subframe in an LAA cell).

Note that the special subframe in a LAA cell is a subframe including at least one of three fields of: a Downlink Pilot Time Slot (DwPTS), a Guard Period (GP), and an Uplink Pilot Time Slot (UpPTS). A configuration for the special subframe in an LAA cell may be configured or notified by RRC signalling, or PDCCH or EPDCCH signalling. The configuration described above configures a length of time for at least one of the DwPTS, the GP, and the UpPTS. Furthermore, the configuration is index information indicating candidates of the prescribed length of time. Furthermore, this configuration can use the same length of time as the DwPTS, the GP, and the UpPTS used for the special subframe configuration configured for a TDD cell of the related art. Furthermore, this configuration can use a length of time different from the DwPTS, the GP, and the UpPTS used for the special subframe configuration configured for the TDD cell of the related art. That is, a length of time during which transmission is possible in a subframe is determined based on any of the DwPTS, the GP, and the UpPTS.

Furthermore, it is preferable that the terminal performs the LBT or the CCA in the GP of the special subframe in the LAA cell. That is, in a case that the frequency for the uplink transmission burst is identified (detected, assumed, determined) to be in a busy state (unavailable state, not congested state, absence, clear) based on the LBT, the terminal drops (does not perform, cancels, withdraws) transmission of the uplink transmission burst. That is, in a case that the frequency for the uplink transmission burst is identified (detected, assumed, determined) to be in an idle state (available state, congested state, presence, occupied) based on the LBT, the terminal performs transmission of the uplink transmission burst.

In other words, the burst may be constituted of the downlink transmission burst or the burst may be constituted of the downlink transmission burst, the special subframe, and the uplink transmission burst. Note that a constitution of only the uplink transmission burst without the downlink transmission burst in the burst may be prohibited. Note that in a case that there is only the uplink transmission burst without the downlink transmission burst in the burst, the burst may be constituted only of the uplink transmission burst (that is, there is no need for the special subframe).

Furthermore, in a case that the burst is constituted of the downlink transmission burst constituted of N contiguous downlink subframes and the uplink transmission burst constituted of M contiguous uplink subframes, it is preferable that N and M are notified to the terminal. In addition to N and M, a configuration of the special subframe may further be notified to the terminal.

Figure 5:
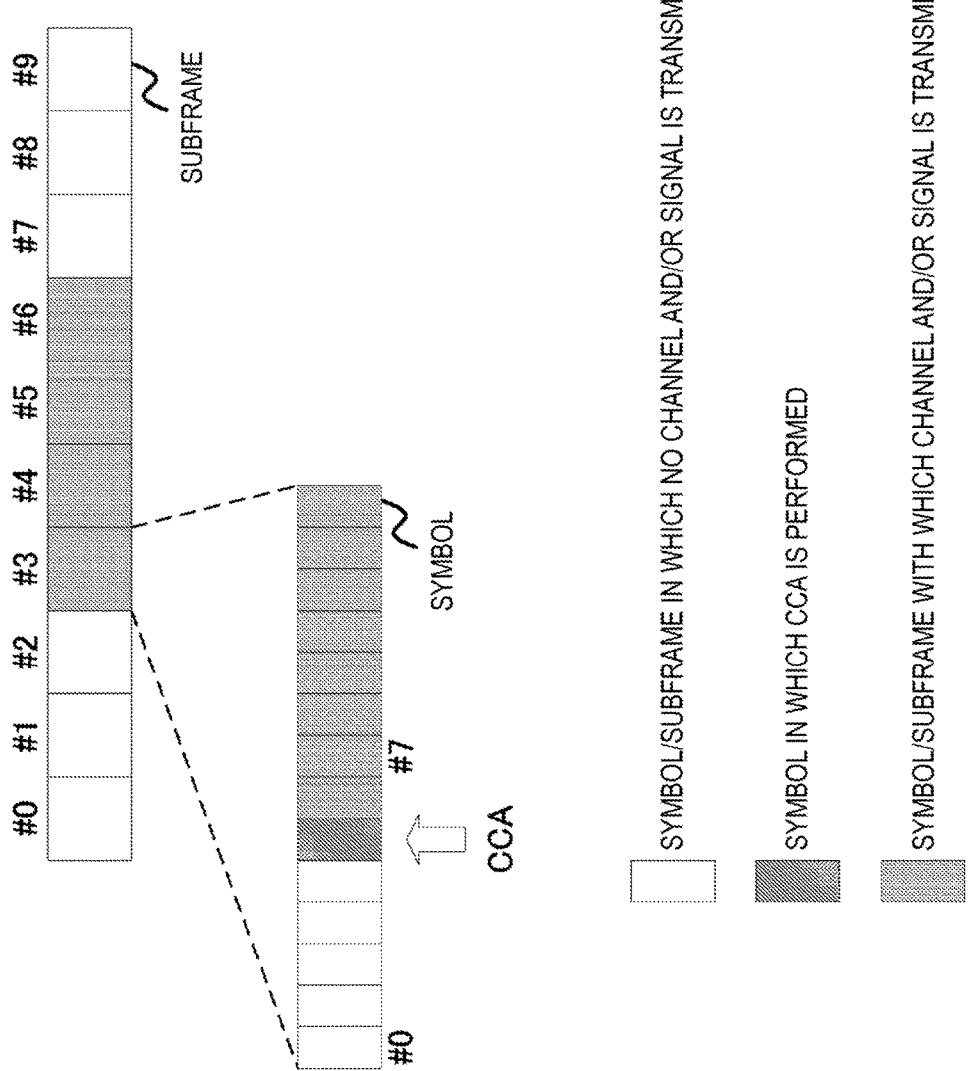
FIG. 5 is a diagram illustrating an example of a communication procedure in an LAA cell according to the present embodiment.

FIG. 5 is a diagram illustrating an example of a communication procedure in a certain LAA cell. FIG. 5 illustrates 10 subframes indicated by subframes #0 to #9, and 14 symbols (OFDM symbols) of symbols #0 to #13 in the subframe #3. Furthermore, in this example, the LAA cell can transmit a signal of a maximum of 4 milliseconds (corresponding to four subframes) and the CCA is performed in the symbol #5 in the subframe #3. Furthermore, a case is assumed in which the LAA cell identifies that the frequency is in an idle state in the CCA, and a signal can be transmitted with a symbol immediately subsequent thereto. In FIG. 5, the LAA cell transmits a signal with from the symbol #6 in the subframe #3 up to a prescribed symbol in the subframe #6.

FIG. 5 illustrates that the LAA does not transmit anything in a symbol or subframe indicated by a symbol/subframe with which a channel and/or signal is not transmitted (cannot be transmitted). Furthermore, FIG. 5 illustrates that the LAA at least transmits the PDSCH and a terminal-specific Reference Signal associated with the PDSCH in a symbol or subframe indicated by the symbol/subframe with which a channel and/or signal is transmitted (can be transmitted). Furthermore, the PDSCH is mapped (scheduled) to each terminal with a Resource Block pair as a unit. Information on the mapping (scheduling) is notified through the PDCCH or the EPDCCH transmitted in each subframe. The mapping information for the PDSCH in a certain subframe may be notified in the same subframe or in another subframe.

In FIG. 5, in a case that the LAA cell transmits the PDSCH by using symbols #6 to #13 in the subframe #3, the terminal configured to receive the PDSCH need to recognize that the PDSCH is mapped to the symbols #6 to #13 in the subframe #3.

In an example of a method of recognizing it, information for recognizing a symbol with which a channel and/or signal is transmitted in a prescribed subframe (for example, the subframe #3) of the LAA cell is used. For example, the information is any of the following items or a combination thereof.

(1) In the prescribed subframe, the information indicates a start symbol of symbols with which the channel and/or signal is transmitted. The information indicating the start symbol is any of 0 to 13, each value indicating the symbol number being the start symbol.

(2) In the prescribed subframe, the information indicates a start symbol of the symbol with which the channel and/or signal is transmitted. The information indicating the start symbol is index information in which the value prescribed from 0 to 13 is indexed.

(3) In the prescribed subframe, the information is bit map information indicating the symbol with which the channel and/or signal is transmitted. The bit map information is constituted of 14 bits. In a case that each bit is in one state (for example, 1), the bit map information indicates a symbol with which the channel and/or signal is transmitted, and in a case that each bit is in the other state (for example, 0), the bit map information indicates a symbol with which the channel and/or signal is not transmitted.

(5) In the prescribed subframe, the information indicates the last symbol of the symbols in which the channel and/or signal is not transmitted, or the number of the symbols in which the channel and/or signal is not transmitted. For example, the last symbol is any one from 0 to 13, and each value indicates the symbol number being the last symbol. For example, the information indicating the symbol number is any one from 1 to 14 and each value indicates the symbol number.

(6) In the prescribed subframe, the information indicates either information indicating the last symbol of the symbols in which the channel and/or signal is not transmitted or information indicating the number of the symbols in which the channel and/or signal is not transmitted. For example, the last symbol is index information in which the value prescribed in advance from 0 to 13 is indexed. For example, the information indicating the symbol number is index information in which the value prescribed in advance from 1 to 14 is indexed.

Furthermore, a method of notifying information for recognizing a symbol with which the channel and/or signal is transmitted uses, for example, the following methods.

(1) The information is notified by a parameter configured for (notified to) the LAA cell through RRC signalling or MAC signalling. In a case that a certain Serving cell is an LAA cell, in a certain subframe, a channel and/or signal is not transmitted with a configured symbol, and a channel and/or signal is transmitted with another symbol. For example, in a certain subframe, a symbol in which a channel and/or signal is not transmitted is configured to be symbols #0 and #1. In a certain subframe, a symbol in which a channel and/or signal is not transmitted is configured to be symbols #2 to #13. Furthermore, this configuration may be different (may be independent) depending on a channel and/or signal. For example, in a certain subframe, the terminal is configured so that an EPDCCH is mapped to symbols #2 to #13, and a PDSCH is mapped to symbols #1 to #13. Furthermore, for example, a range (a possible value) of the start symbol of the PDSCH configured for the LAA cell can be different from a range (1 to 4) of the start symbol of the PDSCH configured for the Secondary cell of the related art. The range of the start symbol of the PDSCH and/or the EPDCCH configured for the LAA cell is 0 to 13.

(2) The information is notified by the PDCCH or the EPDCCH transmitted from the LAA cell or a Serving cell (assist cell, Primary cell, or Secondary cell) different from the LAA cell. The DCI carried (transmitted) by the PDCCH or the EPDCCH includes the information.

(3) The information is notified by a channel or a signal for notifying the information. The channel or the signal for notifying the information is transmitted only to the LAA cell. The channel or the signal for notifying the information is transmitted from the LAA cell, or a Serving cell (assist cell, Primary cell, or Secondary cell) different from the LAA cell.

(4) The candidates of the information are configured for (notified to) the LAA cell, through RRC signalling or MAC signalling. The information is selected from the candidates of the information, based on the information included in the DCI carried (transmitted) by the PDCCH or the EPDCCH. For example, information indicating four start symbols is configured through the RRC signalling or the MAC signalling, and 2-bit information indicating one of the four start symbols is notified by signalling of the PDCCH or the EPDCCH.

(5) The information is notified by a channel or signal mapped to a prescribed Resource Element in a certain subframe. For example, the prescribed Resource Element is a plurality of Resource Elements in a prescribed symbol. For example, the prescribed symbol is the last symbol in the subframe. The subframe to which the channel or the signal for notifying the information is mapped may be all of the subframes in the LAA cell, or may be a prescribed subframe or a subframe configured by RRC signalling.

(6) The information is prescribed in advance. In a case that a certain Serving cell is an LAA cell, in the certain subframe, a channel and/or signal is not transmitted in a prescribed symbol, and a channel and/or signal is transmitted in another symbol. For example, in a certain subframe, the symbols in which a channel and/or signal is not transmitted are symbols #0 and 1. In a certain subframe, the symbols in which a channel and/or signal is not transmitted are symbols #2 to #13. Furthermore, this prescription may be different (may be independent) depending on a channel and/or signal. For example, in a certain subframe, the terminal assumes that the EPDCCH is mapped to the symbols #2 to #13, and the PDSCH is mapped to the symbols #1 to #13.

In another example of a method of recognizing it, the terminal detects a symbol with which a channel and/or signal is transmitted in the prescribed subframe (for example, the subframe #3) of the LAA cell. Furthermore, the terminal may be configured with assist information for performing the detection. For example, the detection method uses methods as follows.

(1) The detection is performed based on a prescribed signal mapped to the prescribed subframe. The terminal detects, in the prescribed sub frame, a symbol with which s channel and/or signal is transmitted, based on whether a signal prescribed in advance or a configured signal is detected. In a case that the signal prescribed in advance or the configured signal is detected in a certain symbol of the prescribed subframe, the terminal recognizes a symbol subsequent to the certain symbol as a symbol with which the channel and/or signal is transmitted in the prescribed subframe. For example, the signal prescribed in advance or the configured signal is a CRS, DMRS, and/or URS.

(2) The detection is performed based on a prescribed channel mapped to the prescribed subframe. The terminal detects, in the prescribed subframe, the symbol with which the channel and/or signal is transmitted, based on whether the channel prescribed in advance or the configured channel has been detected. In a case that the channel prescribed in advance or the configured channel is detected in a certain symbol of the prescribed subframe, the terminal recognizes a symbol subsequent to the certain symbol as a symbol with which the channel and/or signal is transmitted in the prescribed subframe. For example, the channel prescribed in advance or the configured channel is an EPDCCH. Specifically, the terminal performs monitoring (detection processing, blind detection) of the EPDCCH, assuming that the EPDCCH is mapped to a symbol subsequent to the certain symbol in the prescribed subframe. Here, the terminal may perform blind detection of the start symbol to which the EPDCCH is assumed to be mapped. Furthermore, the start symbol or the candidates of the start symbol to which the EPDCCH is assumed to be mapped may be prescribed or configured in advance.

Furthermore, in the subframe #3 of FIG. 5, a mapping method to a Resource Element by the PDCCH, EPDCCH, and/or PDSCH may be different from a mapping method in other subframes. For example, the mapping method can use the flowing methods. Note that the following mapping methods (mapping sequences) can be applied to other signals such as the Reference Signal or the synchronization signal.

(1) In the mapping method, the PDCCH, EPDCCH, and/or PDSCH are mapped to from the last symbol in the subframe. That is, the mapping of the PDCCH, EPDCCH, and/or PDSCH to a Resource Element (k, l) is an allocated physical Resource Block, and the mapping is sequentially performed from an OFDM symbol having an OFDM symbol number l being the largest (that is, the last symbol in a slot) in a Resource Element to which mapping can be performed. Furthermore, the mapping is performed sequentially from the last slot (second slot) of the subframe. Furthermore, in each OFDM symbol, each channel is sequentially mapped from a subcarrier with a subcarrier number k being the smallest.

(2) In the mapping method, the PDCCH, EPDCCH, and/or PDSCH skips a symbol with which a channel and/or signal is not transmitted to be mapped to a Resource Element within a symbol with which a channel and/or signal is transmitted. That is, in the mapping of the PDCCH, EPDCCH, and/or PDSCH, a rate matching is performed on a Resource Element of a symbol in which a channel and/or signal is not transmitted.

(3) In the mapping method, the PDCCH, EPDCCH, and/or PDSCH does not skip a symbol with which a channel and/or signal is not transmitted, and is mapped to a Resource Element in a symbol with which a channel and/or signal is transmitted. In other words, the mapping is applied to the PDCCH, EPDCCH, and/or PDSCH without distinguishing between a symbol with which a channel and/or signal is transmitted and a symbol with which a channel and/or signal is not transmitted, but a channel mapped to a symbol with which a channel and/or signal is not transmitted is not transmitted, and a channel mapped to a symbol with which a channel and/or signal is transmitted is transmitted. That is, in the mapping of the PDCCH, EPDCCH, and/or PDSCH, a Resource Element of a symbol with which a channel and/or signal is not transmitted is punctured.

Figure 6:
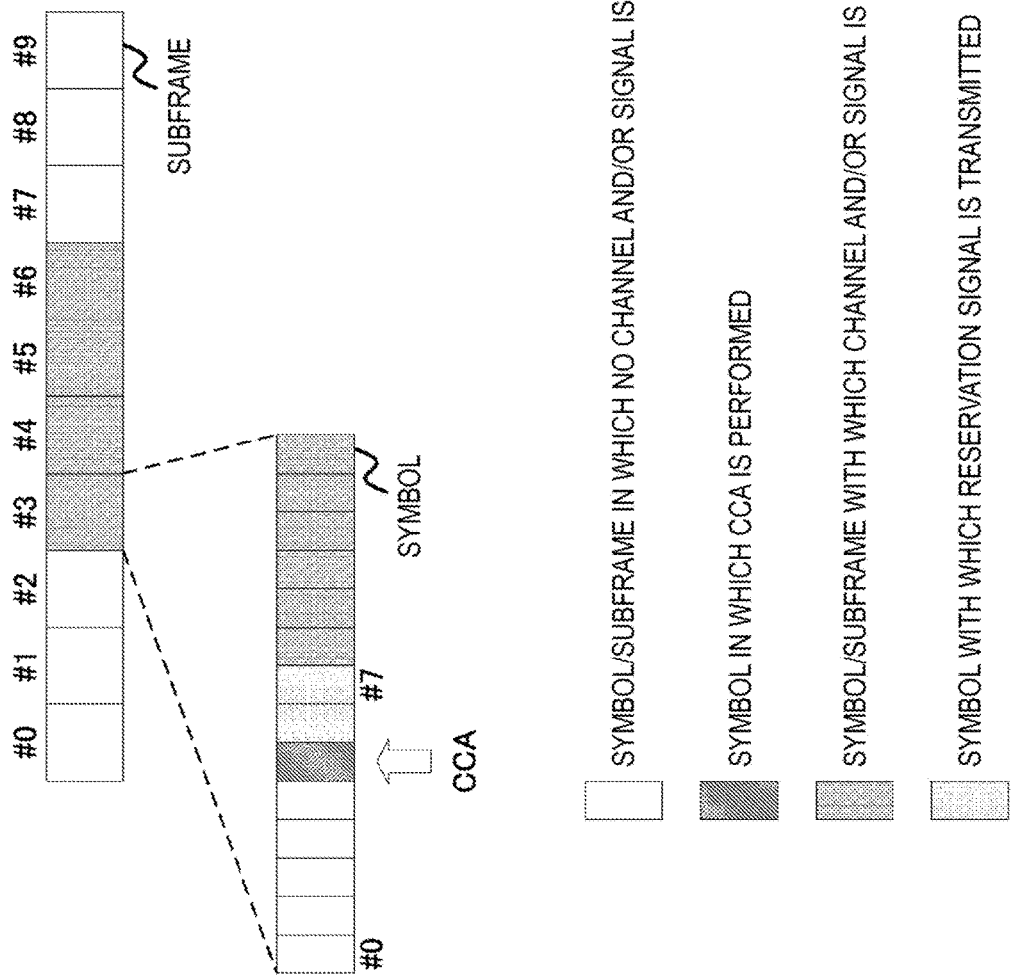
FIG. 6 is a diagram illustrating an example of a communication procedure in an LAA cell according to the present embodiment.

FIG. 6 is a diagram illustrating an example of a communication procedure in a certain LAA cell. Differences from the contents described in FIG. 5 will be described, below. In this example, the CCA is performed in the symbol #5 in the subframe #3. Furthermore, a case is assumed in which the LAA cell identifies that the frequency is in an idle state in the CCA, and a signal can be transmitted with a symbol immediately subsequent thereto. The LAA cell transmits a signal with from the symbol #5 in the subframe #3 up to a prescribed symbol in the subframe #6.

In the example of FIG. 6, the symbols #6 and #7 in the subframe #3 are symbols with which a Reservation Signal is transmitted. The Reservation Signal is transmitted with from a symbol immediately subsequent to the symbol in which the CCA is performed (that is, the symbol #5) up to a symbol immediately before a symbol with which a channel and/or signal is transmitted (that is, the symbol #6). The effects by this Reservation Signal are as follows. As described in FIG. 5, even in a case that candidates of the symbols with which a channel and/or signal is transmitted are prescribed in advanced or configured, the LAA cell can flexibly perform the CCA without depending on the number of the candidates.

The Reservation Signal may not be received (recognized) by the terminal, even in a case where the terminal is configured to receive a channel and/or signal transmitted from the LAA cell. That is, in a case that a channel and/or signal cannot be transmitted after performing the CCA, the Reservation Signal is transmitted in order for the LAA cell in which the CCA is performed to secure (reserve) the frequency.

The symbol with which the Reservation Signal is transmitted may be mapped with a channel and/or signal different from a channel and/or signal transmitted with a symbol with which the channel and/or signal is transmitted. That is, the channel and/or signal mapped to the symbol with which the Reservation Signal is transmitted is recognized (received) by the terminal. For example, the terminal identifies a symbol with which a channel and/or signal is transmitted, based on the channel and/or signal mapped to the symbol with which the Reservation Signal is transmitted. Furthermore, for example, the terminal uses the channel and/or signal mapped to the symbol with which the Reservation Signal is transmitted to synchronize with (to identify) the LAA cell.

Furthermore, the Reservation Signal according to the present embodiment is also referred to as an initial signal. The initial signal is a signal transmitted at the head of the burst, which may be distinguished from a PDSCH, an EPDCCH, a PDCCH, and/or a Reference Signal in the burst. Furthermore, the initial signal can include control information for the burst, control information for a channel and/or signal in the burst, or control information for the cell transmitting the burst.

Figure 7:
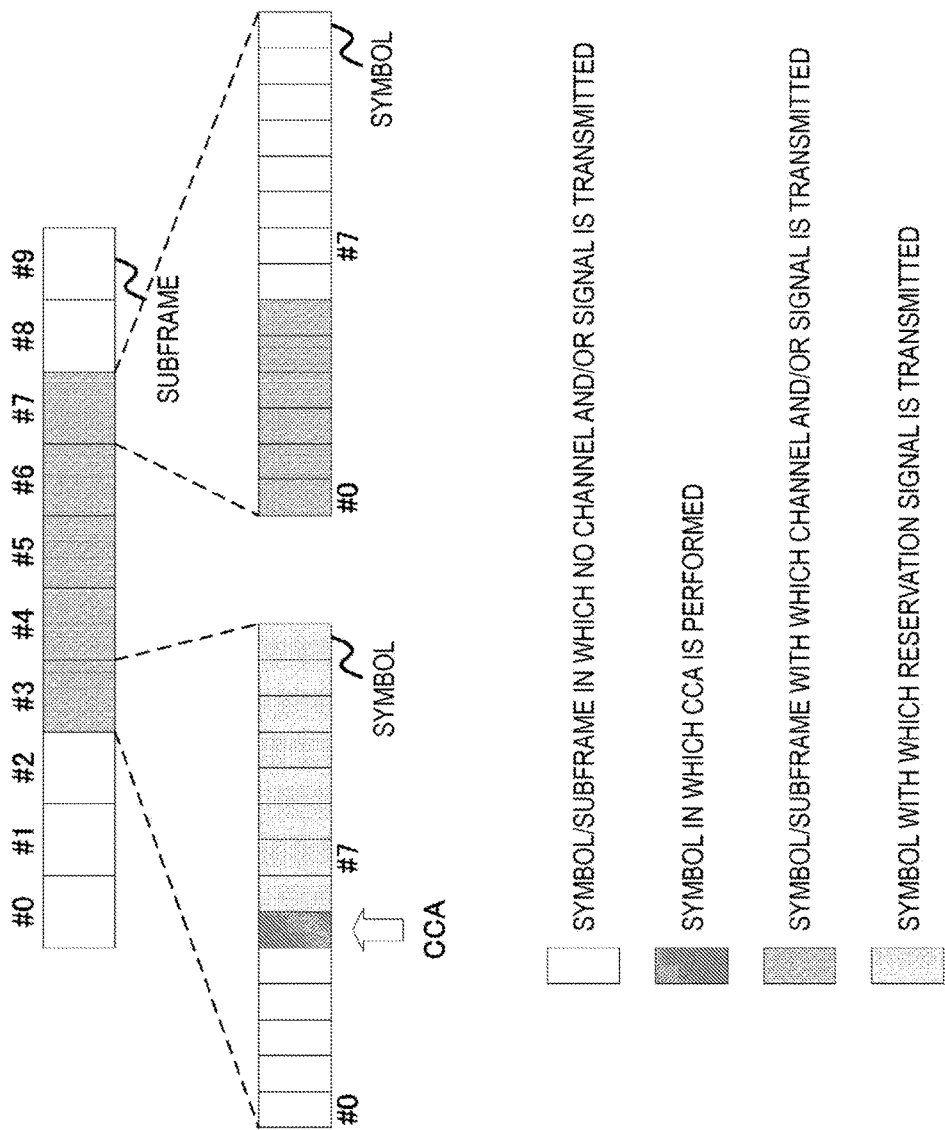
FIG. 7 is a diagram illustrating an example of a communication procedure in an LAA cell according to the present embodiment.

FIG. 7 is a diagram illustrating an example of a communication procedure in a certain LAA cell. Differences from the contents described in FIG. 5 will be described, below. In this example, similarly to the example of FIG. 5, the CCA is performed in the symbol #5 in the subframe #3. Furthermore, a case is assumed in which the LAA cell identifies that the frequency is in an idle state in the CCA, and a signal can be transmitted with a symbol immediately subsequent thereto. In FIG. 7, the LAA cell transmits a signal with from the symbol #6 in the subframe #3 to the symbol #5 in the subframe #7 being 4 milliseconds after the symbol #6.

In the example of FIG. 7, the LAA cell transmits a Reservation Signal with from a symbol immediately subsequent to the symbol in which the CCA is performed to the last symbol, in subframes including the symbol in which the CCA is performed. Furthermore, the LAA cell transmits a channel and/or signal with a subframe subsequent to the subframe including the symbol in which the CCA is performed. Moreover, the Reservation Signal in FIG. 7 includes the Reservation Signal described in FIG. 6.

For example, in FIG. 7, the terminal can assume that a channel and/or signal is transmitted in a subframe subsequent to the subframe #4. Thus, the terminal assumes that a channel and/or signal is transmitted with a symbol including the first symbol of the subframe. Thereby, the base station including the LAA cell can use, for the terminal, a method similar to the method in the related art for transmission of a channel and/or signal and notification of control information for the channel and/or signal.

Furthermore, in FIG. 7, the LAA cell can transmit, in the subframe #7, a channel and/or signal with from the first symbol to the symbol #5. For example, the LAA cell can transmit, to the terminal, the PDSCH and/or EPDCCH mapped to the resource from a prescribed symbol in the subframe #7 to the symbol #5. Furthermore, the LAA cell can transmit, to the terminal, the PDCCH mapped to the resource from the first symbol in the subframe #7 to a prescribed symbol. For example, the prescribed symbol is determined based on information transmitted on the PCFICH, the information being information on the number of OFDM symbols used for the PDCCH transmission. Furthermore, for example, the prescribed symbol is determined based on control information configured by RRC signalling, the control information being information indicating the OFDM start symbol for the PDSCH scheduled by the EPDCCH and the PDCCH, and the PDSCH scheduled by the EPDCCH.

Furthermore, in FIG. 7, the LAA cell can notify or configure, to the terminal of the last symbol or configure the last symbol for the terminal, a channel and/or signal being transmitted with the last symbol, in the subframe #7. In a certain subframe of the LAA cell, a method described in the example of FIG. 5 can be used for information for the terminal to recognize the last symbol and a method of notifying the information. The method described in the example of FIG. 5 is information for recognizing a symbol with which the channel and/or signal is transmitted, and the method of notifying the information in FIG. 5. For example, the LAA cell includes the information on the last symbol into the DCI notified by the PDCCH or the EPDCCH transmitted in the subframe #7. Thus, the LAA cell can efficiently use the resource in a case that a channel and/or signal can be transmitted with up to any symbol in the subframe as in the subframe #7 in FIG. 7. Moreover, for example, the LAA cell includes the information on the last symbol into information configured by RRC signalling or MAC signalling.

Furthermore, in FIG. 7, a method of combining and using the transmission method in the subframe #3 and the transmission method in the subframe #7 has been described, but it is not limited thereto. The transmission method in the subframe #3 and the transmission method in the subframe #7 may be used independently. Furthermore, some or all of the methods described in FIGS. 5 to 7 may be used in combination.

Furthermore, in the subframe #7 of FIG. 7, the mapping to the Resource Element of the PDCCH, the EPDCCH, and/or the PDSCH may be different from mapping in another subframe.

Furthermore, in the LAA cell, a subframe in which a channel and/or signal can be transmitted to all OFDM symbols in one subframe (that is, the subframes #4 to 6 in FIGS. 5 to 7) may be recognized, configured, or notified as a subframe different from a subframe in which a channel and/or signal cannot be transmitted to some OFDM symbols in one subframe (that is, the subframe #3 in FIGS. 5 to 7, and the subframe #7 in FIG. 7). For example, a subframe in which a channel and/or signal can be transmitted to all OFDM symbols in one subframe is equivalent to a subframe in a Serving cell of the related art.

In the present embodiment, the subframe in which a channel and/or signal cannot be transmitted to all OFDM symbols in one subframe is also referred to as first LAA subframe. The subframe in which a channel and/or signal cannot be transmitted to some OFDM symbols in one subframe is also referred to as second LAA subframe. The subframe in which a channel and/or signal can be transmitted to all OFDM symbols in one subframe is also referred to as third LAA subframe. Furthermore, the second LAA subframe is also referred to as a partial subframe, and the third LAA subframe is also referred to as full subframe. Note that the second LAA subframe includes a first partial subframe, a second partial subframe, and/or a third partial subframe.

Furthermore, a method of recognizing, by the terminal, the first LAA subframe, the second LAA subframe, and the third LAA subframe can use the method described in the present embodiment. For example, the method of recognizing the subframes uses the information for recognizing a symbol with which a channel and/or signal is transmitted and the method of notifying the information.

Furthermore, a method of recognizing, by the terminal, the first LAA subframe, the second LAA subframe, and the third LAA subframe may be explicitly notified or configured by the PDCCH or RRC signalling.

Furthermore, a method of recognizing, by the terminal, the first LAA subframe, the second LAA subframe, and the third LAA subframe may be implicitly notified or configured, based on information (a parameter) notified or configured by the PDCCH or RRC signalling. For example, the terminal recognizes the first LAA subframe, the second LAA subframe, and the third LAA subframe, based on information on CRS mapping.

Furthermore, in a case that the terminal recognizes that a certain subframe is the second LAA subframe, the terminal recognizes that a prescribed number of subframes subsequent to the certain subframe are the third LAA subframe. Furthermore, the terminal recognizes that a subframe subsequent to the last subframe recognized as the third LAA subframe is the first LAA subframe until the terminal recognizes that the subframe subsequent to the last subframe is the second LAA subframe. Furthermore, the prescribed number (that is, the subframe number recognized as the third LAA subframe) may be prescribed in advance. The prescribed number may be configured in the LAA cell. The prescribed number may be notified by a channel and/or signal mapped to the second LAA subframe.

Furthermore, each start symbol of the PDSCH and/or the EPDCCH is independently prescribed or configured in the second LAA subframe and the third LAA subframe.

Furthermore, FIGS. 5 to 7 indicated that the CCA is performed in one subframe, but the time (duration) for performing the CCA is not limited thereto. The time for performing the CCA may vary for each LAA cell, each CCA timing, and each execution of the CCA. For example, the CCA is performed during a time based on a prescribed time slot (time interval, time domain). The prescribed time slot may be prescribed or configured with a time obtained by dividing one subframe into a prescribed number. The prescribed time slot may be prescribed or configured with the prescribed number of subframes.

Furthermore, in the present embodiment, a field size in a time domain such as a time (time slot) for performing the CCA and a time for transmitting (being capable of transmitting) a channel and/or signal in a certain subframe can be expressed by using a prescribed time unit. For example, the field size in the time domain is expressed as some time units Ts. Ts is 1/(15000*2048) 15 seconds. For example, a time of one subframe is 30720*Ts (1 millisecond).

Furthermore, as in the subframe #3 in FIGS. 5 to 7, whether the LAA cell can transmit a channel and/or signal (including a Reservation Signal) with symbols subsequent to any symbol in a certain subframe may be configured for the terminal or the LAA cell. For example, the terminal is configured, by RRC signalling, with information indicating whether such transmission is possible in the configuration for the LAA cell. The terminal switches a process for reception (monitoring, recognition, and decoding) in the LAA cell, based on the information.

Furthermore, a subframe in which transmission is possible with symbols subsequent to any symbol (including a subframe in which transmission is possible with symbols up to any symbol) may be all subframes in the LAA cell. Furthermore, the subframe in which transmission is possible with symbols subsequent to any symbol may be a subframe prescribed or configured in advance for the LAA cell.

Furthermore, a subframe in which transmission is possible with symbols subsequent to any symbol (including a subframe in which transmission is possible with symbols up to any symbol) can be configured, notified, or determined based on the uplink-downlink configuration (UL/DL configuration) of TDD. For example, such a subframe is a subframe notified (specified) as the special subframe in the UL/DL configuration. The special subframe in the LAA cell is a subframe including at least one of three fields of: a Downlink Pilot Time Slot (DwPTS), a Guard Period (GP), and an Uplink Pilot Time Slot (UpPTS). A configuration for the special subframe in the LAA cell may be configured or notified by RRC signalling, or PDCCH or EPDCCH signalling. The configuration described above configures a length of time for at least one of the DwPTS, the GP, and the UpPTS. This configuration is also index information indicating candidates of the length of time prescribed in advance. Furthermore, this configuration can use the same length of time as the DwPTS, the GP, and the UpPTS used for the special subframe configuration configured for a TDD cell of the related art. That is, a length of time during which transmission is possible in a subframe is determined based on any of the DwPTS, the GP, and the UpPTS.

Furthermore, in the present embodiment, a Reservation Signal can be a signal which can be received in an LAA cell different from an LAA cell transmitting the Reservation Signal. For example, the LAA cell different from the LAA cell transmitting the Reservation Signal is an LAA cell adjacent to the LAA cell transmitting the Reservation Signal (a neighbour LAA cell). For example, the Reservation Signal includes information on a transmission state (usage state) of a prescribed subframe and/or symbol in the LAA cell. In a case that a certain Reservation Signal is received in an LAA cell different from an LAA cell transmitting the certain Reservation Signal, the LAA cell receiving the Reservation Signal recognizes the transmission state of a prescribed subframe and/or symbol based on the Reservation Signal to perform scheduling accordingly.

Furthermore, the LAA cell receiving the Reservation Signal may perform the LBT before transmitting a channel and/or signal. The LBT is performed based on the received Reservation Signal. For example, in the LBT, scheduling including resource allocation and MCS selection is performed, in consideration of a channel and/or signal transmitted (assumed to be transmit) by the LAA cell transmitting the Reservation Signal.

Furthermore, in a case that the LAA cell receiving the Reservation Signal performs scheduling for transmitting a channel and/or signal based on the Reservation Signal, one or more LAA cells including the LAA cell transmitting the Reservation Signal can be notified of information on the scheduling by a prescribed method. For example, the prescribed method is a method of transmitting a prescribed channel and/or signal including the Reservation Signal. Furthermore, for example, the prescribed method is a method of notifying through a backhaul such as an X2 interface.

Furthermore, in the carrier aggregation and/or the dual connectivity, although up to five Serving cells can be configured for a terminal of the related art, the maximum number of Serving cells that can be configured for the terminal can be enhanced in the present embodiment. That is, the terminal according to the present embodiment can be configured with more than five Serving cells. For example, the terminal according to the present embodiment can be configured with up to 16 or 32 Serving cells. For example, the more than five Serving cells configured for the terminal in the present embodiment include the LAA cell. Furthermore, the more than five Serving cells configured for the terminal in the present embodiment may be all LAA cells.

Furthermore, in a case that more than five Serving cells can be configured, a configuration for some of the Serving cells may be different from the configuration for a Serving cell of the related art (that is, a Secondary cell of the related art). For example, the following is different with respect to the configuration. The configuration described below may be used in combination.

(1) The terminal is configured with up to five Serving cells of the related art and with up to 11 or 27 Serving cells different from the Serving cell of the related art. That is, the terminal is configured with up to four Secondary cells of the related art, in addition to a Primary cell of the related art, and with up to 11 or 27 Secondary cells different from the Secondary cells of the related art.

(2) The configuration for the Serving cell (Secondary cell) different from the Serving cell of the related art includes the configuration for the LAA cell. For example, in addition to the Primary cell of the related art, the terminal is configured with up to four Secondary cells not including the configuration for the LAA cell, and with up to 11 or 27 Secondary cells different from the Secondary cells of the related art.

Furthermore, in a case that more than five Serving cells can be configured, a base station (including an LAA cell) and/or a terminal can perform a process or an assumption different from a case of being configured with up to five Serving cells. For example, the following is different with respect to the process or the assumption. The process or the assumption described below may be used in combination.

(1) In the terminal, it is assumed that the PDCCH, the EPDCCH, and/or the PDSCH are simultaneously transmitted (received) from a maximum of five Serving cells, even in a case where more than five Serving cells are configured. Thus, the terminal can use the method similar to the method of the related art for the reception of the PDCCH, the EPDCCH, and/or the PDSCH, and the transmission of the HARQ-ACK for the PDSCH.

(2) In a case that more than five Serving cells are configured, the terminal is configured with a combination (group) of cells for performing a bundling of the HARQ-ACK for the PDSCH in the respective Serving cells. For example, all Serving cells, all Secondary cells, all LAA cells, or all Secondary cell different from the Secondary cells of the related art each include information (configuration) on the bundling of the HARQ-ACK between Serving cells. For example, the information on the bundling of the HARQ-ACK between the Serving cells is an identifier (index, ID) for performing the bundling. For example, the HARQ-ACK is bundled with an identifier for performing the bundling across the same cell. The bundling is performed by a logical AND operation on the HARQ-ACK to be bundled. Furthermore, the largest number of an identifier for performing the bundling may be five. Moreover, the largest number of an identifier for performing the bundling may be five including the number of cells not performing the bundling. That is, the number of groups for performing the bundling beyond a Serving cell may be up to five. Thus, the terminal can use a method similar to the method of the related art for the reception of the PDCCH, the EPDCCH, and/or the PDSCH, and the transmission of the HARQ-ACK for the PDSCH.

(3) In a case that more than five Serving cells are configured, the terminal is configured with a combination (group) of cells for performing multiplexing of the HARQ-ACK for the PDSCH in the respective Serving cell. In a case that a combination (group) of cells for performing multiplexing of the HARQ-ACK for the PDSCH is configured, the multiplexed HARQ-ACK is transmitted by the PUCCH or the PUSCH, based on the group. In each group, the maximum number of Serving cells to be multiplexed is prescribed or configured. The maximum number is prescribed or configured, based on the maximum number of Serving cells configured for the terminal. For example, the maximum number is the same number as the maximum number of Serving cells configured for the terminal, or half the maximum number of Serving cells configured for the terminal. Furthermore, the maximum number of simultaneously transmitted PUCCHs is prescribed or configured, based on the maximum number of Serving cells to be multiplexed in each group and the maximum number of Serving cells configured for the terminal.

In other words, the number of the first Serving cells to be configured (that is, the Primary cell and/or the Secondary cells) is equal to or lower than a prescribed number (that is, five), and the total number of the first Serving cells and the second Serving cells (that is, the LAA cells) to be configured exceeds the prescribed number.

Next, terminal capability associated with the LAA will be described. The terminal notifies the base station of (transmits, to the base station,) information (terminal capability) on capability of the terminal by RRC signalling, based on the instruction from the base station. The terminal capability for a certain function (feature) is notified (transmitted) in a case of supporting the function (feature), and the terminal capability is not notified (transmitted) in a case of not supporting the function (feature). Furthermore, the terminal capability for the certain function (feature) may be information indicating whether a test and/or an implementation of the function (feature) is completed. For example, the terminal capability in the present embodiment is as follows. The terminal capability described below may be used in combination.

(1) The terminal capability associated with support of an LAA cell and the terminal capability associated with support of configuration of more than five Serving cells are defined independently. For example, the terminal configured to support an LAA cell supports the configuration of more than five Serving cells. That is, the terminal configured not to support the configuration of more than five Serving cells does not support an LAA cell. In such a case, the terminal configured to support the configuration of more than five Serving cells may or may not support an LAA cell.

(2) The terminal capability associated with support of an LAA cell and the terminal capability associated with support of the configuration of more than five Serving cells are independently defined. For example, the terminal configured to support the configuration of more than five Serving cells supports an LAA cell. That is, the terminal configured not to support an LAA cell does not support the configuration of more than five Serving cells. In such a case, the terminal configured to support an LAA cell may or may not support the configuration of more than five Serving cells.

(3) The terminal capability associated with the downlink in the LAA cell and the terminal capability associated with the uplink in the LAA cell are independently defined. For example, the terminal configured to support the uplink in the LAA cell supports the downlink in the LAA cell. That is, the terminal configured not to support the downlink in the LAA cell does not support the uplink in the LAA cell. In such a case, the terminal configured to support the downlink in the LAA cell may or may not support the uplink in the LAA cell.

(4) The terminal capability associated with the support of the LAA cell includes the support of the transmission mode configured only for the LAA cell.

(5) The terminal capability associated with the downlink in the configuration of more than five Serving cells and the terminal capability associated with the uplink in the configuration of more than five Serving cells are independently defined. For example, the terminal configured to support the uplink in the configuration of more than five Serving cells supports the downlink in the configuration of more than five Serving cells. That is, the terminal configured not to support the downlink in the configuration of more than five Serving cells does not support the uplink in the configuration of more than five Serving cells. In such a case, the terminal configured to support the downlink in the configuration of more than five Serving cells may or may not support the uplink in the configuration of more than five Serving cells.

(6) In the terminal capability in the configuration of more than five Serving cells, the terminal capability supporting the configuration of a maximum of 16 downlink Serving cells (component carriers) and the terminal capability supporting the configuration of a maximum of 32 downlink Serving cells are independently defined. Furthermore, the terminal configured to support the configuration of the maximum of 16 downlink Serving cells supports the configuration of at least one uplink Serving cell. The terminal configured to support the configuration of the maximum of 32 downlink Serving cells supports the configuration of at least two uplink Serving cells. That is, the terminal configured to support the configuration of the maximum of 16 downlink Serving cells may not support the configuration of two or more uplink Serving cells.

(7) The terminal capability associated with the support of the LAA cell is notified based on the frequency (band) used in the LAA cell. For example, in the notification of the frequency or the combination of the frequencies supported by the terminal, in a case that the frequency or the combination of frequencies to be notified includes at least one frequency used in the LAA cell, the terminal implicitly notifies that the LAA cell is supported. That is, in a case that the frequency or the combination of frequencies to be notified does not include any frequency used in the LAA cell, the terminal implicitly notifies that the LAA cell is not supported.

Next, the terminal capability associated with a second EPDCCH will be described. In an example of the terminal capability according to the present embodiment, a field of the terminal capability associated with the second EPDCCH defines whether the terminal can receive DCI in USS and/or CSS of the second EPDCCH. That is, in case that the terminal can receive DCI in USS and/or CSS of the second EPDCCH, the terminal notifies support (Supported) in the field of the terminal capability associated with the second EPDCCH. Furthermore, in a case that the terminal cannot receive DCI in USS and/or CSS of the second EPDCCH, the terminal does not notify the field of the terminal capability associated with the second EPDCCH.

Moreover, in a case that the terminal can receive DCI in USS and/or CSS of the second EPDCCH, the terminal has a capability of receiving the DCI in the USS of the first EPDCCH. That is, in a case that the terminal notifies support (Supported) in a field of the terminal capability associated with the second EPDCCH, the terminal notifies support (Supported) in a field of the terminal capability associated with the first EPDCCH. Furthermore, in the case that the terminal notifies support (Supported) in the field of the terminal capability associated with the second EPDCCH, the terminal may indicate that the terminal has the capability of receiving the DCI in the USS of the first EPDCCH.

Furthermore, in a case that the terminal can receive DCI in USS and/or CSS of the second EPDCCH, the terminal also has the capability associated with the LAA (for example, including the above-described capabilities). That is, in a case that the terminal notifies support (Supported) in the field of the terminal capability associated with the second EPDCCH, the terminal notifies support (Supported) in the field of the terminal capability associated with the LAA. Furthermore, in the case that the terminal notifies support (Supported) in the field of the terminal capability associated with the second EPDCCH, the terminal may indicate that the terminal also has an ability associated with the LAA.

Furthermore, in the present embodiment, a case where an LAA cell transmits the PDCCH or the EPDCCH for notifying the DCI for the PDSCH transmitted in the LAA cell (that is, a case of self scheduling) was described, but it is not limited thereto. For example, the method described in the present embodiment can be also applied in a case that a Serving cell different from an LAA cell transmits the PDCCH or the EPDCCH for notifying the DCI for the PDSCH transmitted in the LAA cell (that is, in a case of cross carrier scheduling).

Furthermore, in the present embodiment, information for recognizing a symbol with which a channel and/or signal is transmitted may be based on a symbol with which a channel and/or signal is not transmitted. For example, the information is information indicating the last symbol of symbols in which a channel and/or signal is not transmitted. Furthermore, the information for recognizing a symbol with which a channel and/or signal is transmitted may be determined based on another information or another parameter.

Furthermore, in the present embodiment, a symbol with which a channel and/or signal is transmitted may be independently configured for (notified to, prescribed for) a channel and/or signal. That is, the information for recognizing a symbol with which a channel and/or signal is transmitted and the method of notifying the information can be independently configured for (notified to, prescribed for) a channel and/or signal. For example, the information for recognizing a symbol with which a channel and/or signal is transmitted and the method of notifying the information can be independently configured (notified, prescribed) by the PDSCH and the EPDCCH.

Furthermore, in the present embodiment, from a viewpoint of the terminal, a symbol/subframe with which a channel and/or signal is not transmitted (cannot be transmitted) may be a symbol/subframe with which a channel and/or signal is not assumed to be transmitted (be capable of being transmitted). That is, the terminal can consider that the LAA cell does not transmit a channel and/or signal with the symbol/subframe.

Furthermore, in the present embodiment, from the viewpoint of the terminal, a symbol/subframe with which a channel and/or signal is transmitted (can be transmitted) may be a symbol/subframe with which a channel and/or signal is assumed to be transmitted. That is, the terminal can consider that the LAA cell may or may not transmit a channel and/or signal with the symbol/subframe.

Furthermore, in the present embodiment, from the viewpoint of the terminal, a symbol/subframe with which a channel and/or signal is transmitted (can be transmitted) may be a symbol/subframe with which a channel and/or signal is assumed to be always transmitted. That is, the terminal can consider that the LAA cell always transmits a channel and/or signal with the symbol/subframe.

Furthermore, in the present embodiment, the LAA cell may be a Serving cell using a prescribed frequency band.

Next, an Enhanced Physical Downlink Control Channel (EPDCCH) will be described. Note that the EPDCCH is transmitted and received by using a Resource Element (RE), similarly to another physical channel such as the PDSCH. Each element (element corresponding to one subcarrier and one OFDM symbol) of a resource grid (in which a signal to be transmitted is described with a grid having a subcarrier and an OFDM symbol for each slot) for an antenna port P is referred to as an RE, and the RE is uniquely identified by k (an index starting from 0 and ascending in the frequency axis direction) and l (an index starting from 0 and ascending in the time axis direction) being a pair of indices in one slot.

The constitution and/or the process of the EPDCCH may be different in a normal subframe in the normal cell, a partial subframe in the LAA cell, and/or a full subframe in the LAA cell. For example, an EPDCCH used in the partial subframe is constituted of the OFDM symbols less than those of the EPDCCH used in the normal subframe and/or the full subframe. In the present embodiment, the EPDCCH used in the normal subframe is also referred to as a first EPDCCH, and the EPDCCH used in the partial subframe is also referred to as second EPDCCH. Note that the first EPDCCH and/or the second EPDCCH may be used in the full subframe.

Figure 8:
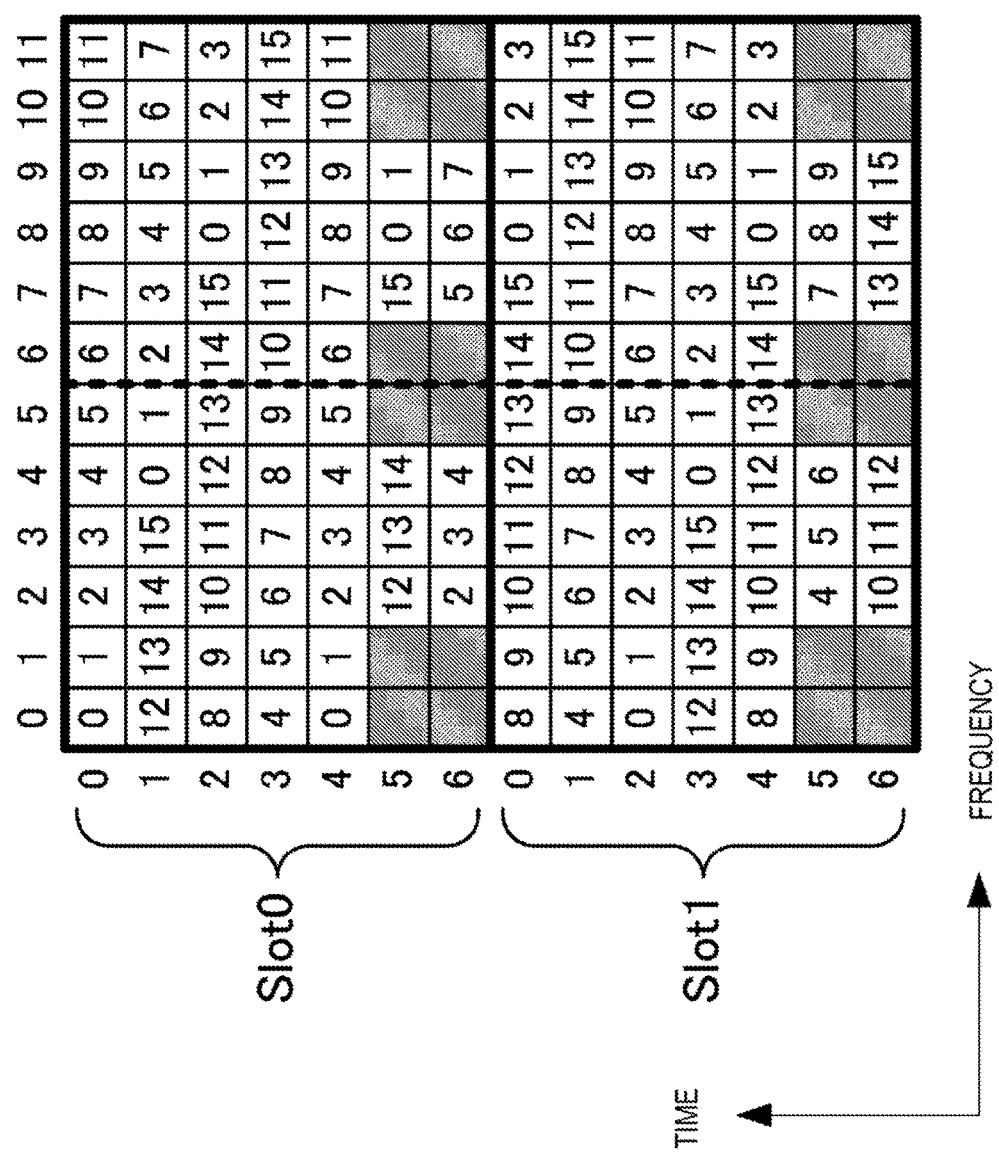
FIG. 8 illustrates an example of an EREG configuration in one RB pair.
Figure 10C:
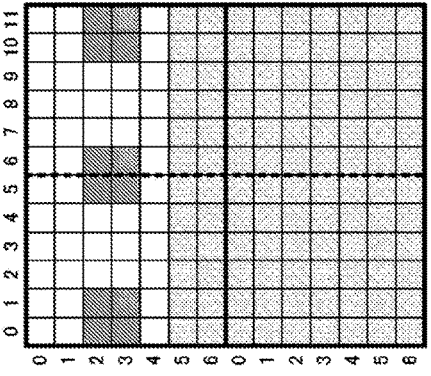
FIGS. 10A to 10E are diagrams illustrating an example of a DMRS configuration associated with a second EPDCCH used in a second partial subframe.
Figure 10E:
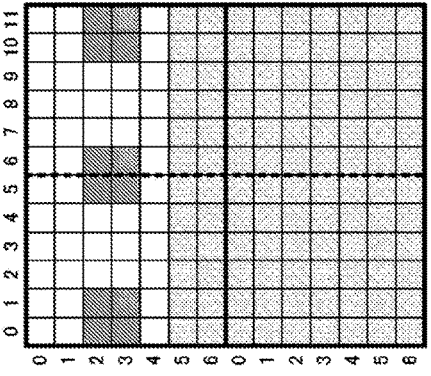
Figure 10B:
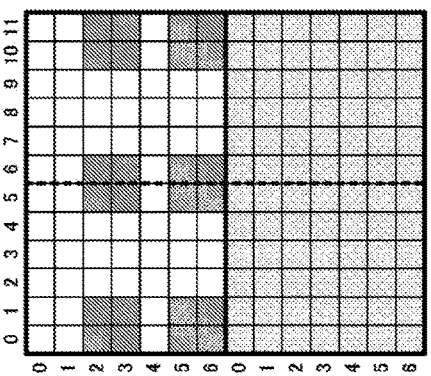
Figure 10D:
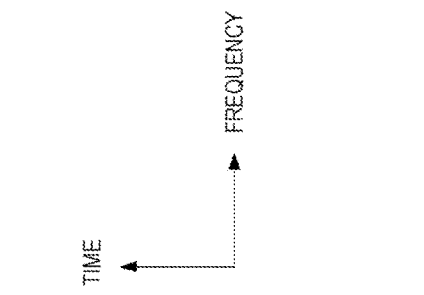
Figure 10A:
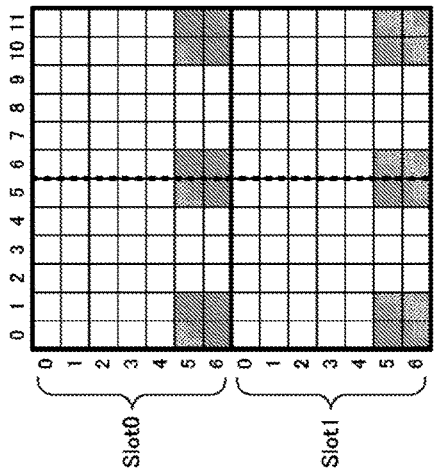

FIG. 8 illustrates an example of an EREG configuration in one RB pair. The Enhanced RE Group (EREG) is used for prescribing mapping to an RE of the EPDCCH. There are 16 EREGs numbered from 0 to 15, for each Resource Block pair. Within one PRB pair, the number from 0 to 15 is assigned to all REs except for REs carrying: a DMRS for antenna ports 107, 108, 109, and 100 for a normal Cyclic Prefix (CP); and a DMRS for the antenna ports 107 and 108 for an extended CP, cyclically in an ascending order in which the frequency precedes the time. In FIG. 8, a Resource Element shaded with hatching is used for carrying a DMRS. All REs assigned with the number i within the PRB pair constitute the EREG assigned with the number i. Here, the CP is a signal attached to the preceding part of an effective symbol interval of an OFDM symbol (in a case of the uplink, an SC-FDMA symbol) in the downlink, the signal being a copy of a part (normally, the last part) within the effective symbol interval. CP lengths has two types of: a normal CP having a normal length (for example, 160 samples or 144 samples for an effective symbol length having 2048 samples), and an extended CP longer than the normal CP (for example, 512 samples or 1024 samples for an effective symbol length having 2048 samples).

Here, the constitution of the EREG may be the same, regardless of the first EPDCCH or the second EPDCCH. That is, the EREG in the first EPDCCH or the second EPDCCH is prescribed for all REs except for REs carrying a DMRS for the antenna ports 107, 108, 109, and 110 for a normal Cyclic Prefix (CP) and a DMRS for the antenna ports 107 and 108 for an extended CP, for each Resource Block pair. Thus, although an RE for constituting the EREG is different, the definition for constituting the EREG is the same, even in a case where the constitution of a DMRS is different.

As illustrated in FIG. 8, one RB pair is constituted of two RBs. Each RB is constituted of Resource Elements indicated by seven OFDM symbols in the time direction and 12 subcarriers in the frequency direction. In FIG. 8, the DMRS is mapped to a Resource Element shaded with hatching.

Furthermore, each DMRS is constituted of 2-chip orthogonal codes and up to two DMRSs can be code-division-multiplexed. The DMRS for the antenna ports 107 and 108 is mapped to the RE with the OFDM symbol number being 5 and 6 and the subcarrier number being 0, 5, and 10 in each slot. The DMRS for the antenna ports 109 and 110 is mapped to the RE with the OFDM symbol number being 5 and 6 and the subcarrier number being 1, 6, and 11 in each slot. Here, the DMRS associated with the first EPDCCH can use the DMRS described in FIG. 8.

An example of the DMRS associated with the second EPDCCH that can be used includes the DMRS described in FIG. 8. That is, the DMRS associated with the second EPDCCH can use a similar configuration to that of the DMRS associated with the first EPDCCH, but in a case that the DMRS is included in an OFDM symbol with which the second EPDCCH cannot be transmitted, the DMRS is not transmitted. For example, in the partial subframe of OFDM symbols #0 to #6 in a slot 1, the DMRS associated with the second EPDCCH is mapped only to the OFDM symbols #5 and #6 in the slot 1, and not mapped to OFDM symbols #5 and #6 in a slot 0. Furthermore, in a case that transmission is not possible with either one of the two OFDM symbols to which 2-chip orthogonal codes are mapped, the DMRS is assumed not to be transmitted.

Another example of the DMRS associated with the second EPDCCH is determined in accordance with an OFDM symbol used for transmission of the second EPDCCH. Specifically, each RE to which the DMRS associated with the second EPDCCH is mapped is prescribed, in accordance with the configuration of the OFDM symbol used for the transmission of the second EPDCCH. For the configuration of the OFDM symbol used for the transmission of the second EPDCCH, the prescribed number of patterns can be prescribed in advance. That is, the prescribed number of patterns can be prescribed in advance, similarly for the configuration of the DMRS associated with the second EPDCCH.

FIGS. 9A to 9E are diagrams illustrating an example of a configuration of the DMRS associated with a second EPDCCH used in a first partial subframe. In FIGS. 9A to 9E, the RE shaded with hatching indicates the RE to which the DMRS associated with the second EPDCCH is mapped. The RE shaded with dots indicates the RE (OFDM symbol) not used for the transmission of the second EPDCCH. That is, in FIG. 9A, the OFDM symbol #0 of the slot 0 is the start symbol of the second EPDCCH; in FIG. 9B, the OFDM symbol #3 of the slot 0 is the start symbol of the second EPDCCH; in FIG. 9C, the OFDM symbol #0 of the slot 1 is the start symbol of the second EPDCCH; in FIG. 9D, the OFDM symbol #0 of the slot 1 is the start symbol of the second EPDCCH, and in FIG. 9E, the OFDM symbol #3 of the slot 1 is the start symbol of the second EPDCCH. As illustrated in FIGS. 9A to 9E, each configuration of the DMRS associated with the second EPDCCH can be prescribed in accordance with the start symbols of the second EPDCCH.

FIGS. 10A to 10E are diagrams illustrating an example of the configuration of the DMRS associated with a second EPDCCH used in a second partial subframe. In FIGS. 10A to 10E, the RE shaded with hatching indicates the RE to which the DMRS associated with the second EPDCCH is mapped. The RE shaded with dots indicates the RE (OFDM symbol) not used for the transmission of the second EPDCCH. That is, in FIG. 10A, the OFDM symbol #6 of the slot 1 is the end symbol of the second EPDCCH; in FIG. 10B, the OFDM symbol #3 of the slot 1 is the end symbol of the second EPDCCH; in FIG. 10C, the OFDM symbol #1 of the slot 1 is the end symbol of the second EPDCCH; in FIG. 10D, the OFDM symbol #6 of the slot 0 is the end symbol of the second EPDCCH, and in FIG. 10E, the OFDM symbol #4 of the slot 0 is the end symbol of the second EPDCCH. As illustrated in FIGS. 10A to 10E, each configuration of the DMRS associated with the second EPDCCH can be prescribed in accordance with the end symbols of the second EPDCCH. Furthermore, the configuration of the DMRS associated with the second EPDCCH used in the second partial subframe can have the same configuration as the DMRS used in the DwPTS.

The EPDCCH carries the scheduling allocation. One EPDCCH is transmitted by using an aggregation of one or some contiguous Enhanced Control Channel Elements (ECCEs). Here, each ECCE is constituted of a plurality of EREGs. The number of ECCEs used for one EPDCCH depends on the format of the EPDCCH and the number of the EREGs for each ECCE. Both localized transmission and distributed transmission are supported. One EPDCCH can use either the localized transmission or the distributed transmission different in mapping to the EREG of the ECCE and to the PRB pair.

Furthermore, the first EPDCCH can configure either the localized transmission or the distributed transmission for each EPDCCH set through the RRC signalling. The second EPDCCH can prescribe in advance, for all EPDCCH set, any of the localized transmission and the distributed transmission. For example, the second EPDCCH can prescribe the distributed transmission for all EPDCCH set in advance.

The terminal device monitors a plurality of EPDCCHs as described later. An arrangement of one or two PRB pairs for the terminal device to monitor the EPDCCH transmission can be configured. As configured by the higher layer, all EPDCCH candidates in the EPDCCH set $X_m$ use only the localized transmission or only the distributed transmission. In the EPDCCH set $X_m$ of a subframe i, the ECCEs available to the EPDCCH transmission are numbered from 0 to $N_{ECCE, m, i}-1$. Here, $N_{ECCE, m, i}$ is the number of ECCEs available to the EPDCCH transmission in the EPDCCH set $X_m$ of the subframe i. In a case of localized mapping, the ECCE of the number n corresponds to the EREG numbered with $(n \bmod N^{RB}_{ECCE})+jN^{RB}_{ECCE}$ in the PRB where the index is floor $(n/N^{RB}_{ECCE})$; in a case of distributed mapping, the ECCE of the number n corresponds to the EREG numbered with floor $(n/N^{Xm}_{RB})+jN^{RB}_{ECCE}$ in the PRB where the index is $(n+j \max (1, N^{Xm}_{RB}/N^{ECCE}_{EREG})) \bmod N^{Xm}_{RB}$, where $j=0, 1, \ldots, N^{ECCE}_{EREG}-1$, and $N^{ECCE}_{EREG}$ is the number of EREGs per ECCE. Furthermore, $N^{RB}_{ECCE}$ is equivalent to $16/N^{ECCE}_{EREG}$, which is the number of ECCEs per PRB pair. Furthermore, floor, mod, and max are the floor function, the modulus function (mod function), and the maximum value function (max function), respectively. Note that the PRB pairs included in the EPDCCH set $X_m$ are numbered from 0 to $N^{Xm}_{RB}-1$ in ascending order.

In the first EPDCCH, $N^{ECCE}_{EREG}$ is determined based on the type of the CP and the subframe. More specifically, $N^{ECCE}_{EREG}$ is four, in a case of the normal CP and the normal subframe (normal downlink subframe), or in a case of the normal CP and a special subframe with the special subframe configuration 3, 4, or 8. $N^{ECCE}_{EREG}$ is 8, in a case of: the normal CP and a special subframe with the special subframe configuration 1, 2, 6, 7, or 9 (that is, a special subframe in which a DwPTS includes from 6 to 10 OFDM symbols); an extended CP and a normal subframe; or an extended CP and a special subframe with the special subframe configuration 1, 2, 3, 5, or 6 (that is, a special subframe in which a DwPTS includes from 6 to 10 OFDM symbols). Note that the details of the special subframe configuration will be described later.

In an example of $N^{ECCE}_{EREG}$ in the second EPDCCH, $N^{ECCE}_{EREG}$ is a value prescribed in advance. For example, $N^{ECCE}_{EREG}$ in the second EPDCCH is 8, the number being the same as that in the case of the normal CP and the special subframe with the special subframe configuration 1, 2, 6, 7, or 9 in the first EPDCCH. Furthermore, for example, $N^{ECCE}_{EREG}$ in the second EPDCCH is 16, the number being the same as the number of EREGs constituted of one Resource Block pair.

In another example of $N^{ECCE}_{EREG}$ in the second EPDCCH, $N^{ECCE}_{EREG}$ is determined depending on $n_{EPDCCH}$ (described later) in the second EPDCCH. Specifically, in a case that $n_{EPDCCH}$ in the second EPDCCH is the prescribed number or more, $N^{ECCE}_{EREG}$ is four (or eight), and in a case that it is smaller than the prescribed number, $N^{ECCE}_{EREG}$ is 8 (or 16). The prescribed number may be prescribed in advance, or may be configured specifically to a cell or specifically to a terminal through RRC signalling. For example, the prescribed number is 104, the number being the same as the prescribed number used in the first EPDCCH. Furthermore, for example, the prescribed number may be different from the prescribed number used in the first EPDCCH.

Furthermore, a plurality of prescribed numbers for $n_{EPDCCH}$ may be prescribed or configured. Specifically, in a case that $n_{EPDCCH}$ in the second EPDCCH is a first prescribed number or more, $N^{ECCE}_{EREG}$ is 4; in a case that it is a second prescribed number or more and smaller than the first prescribed number, $N^{ECCE}_{EREG}$ is 8, and in a case that it is smaller than the second prescribed number, $N^{ECCE}_{EREG}$ is 16. For example, the first prescribed number is 104, the number being the same as the prescribed number used in the first EPDCCH. The second prescribed number is a value smaller than the first prescribed number.

In another example of $N^{ECCE}_{EREG}$ in the second EPDCCH, $N^{ECCE}_{EREG}$ is determined depending on the number of OFDM symbols in the detected (assumed, to be monitored) second EPDCCH. Specifically, in a case that the number of the OFDM symbols in the second EPDCCH is a prescribed number or more, $N^{ECCE}_{EREG}$ is 4 (or 8), and in a case that it is smaller than the prescribed number, $N^{ECCE}_{EREG}$ is 8 (or 16). The prescribed number may be prescribed in advance, or may be configured specifically to a cell or specifically to a terminal through RRC signalling.

Furthermore, a plurality of prescribed numbers for the number of OFDM symbols may be prescribed or configured. Specifically, in a case that the number of OFDM symbols in the second EPDCCH is the first prescribed number or more, $N^{ECCE}_{EREG}$ is 4; in a case that it is the second prescribed number or more and smaller than the first prescribed number, $N^{ECCE}_{EREG}$ is 8, and in a case that it is smaller than the second prescribed number, $N^{ECCE}_{EREG}$ is 16. For example, the second prescribed number is a value smaller than the first prescribed number.

Although another example of $N^{ECCE}_{EREG}$ in the second EPDCCH is determined based on the type of the CP and the subframe similarly to the first EPDCCH, $N^{ECCE}_{EREG}$ is a value twice that of the first EPDCCH. More specifically, $N^{ECCE}_{EREG}$ is 8, in a case of the normal CP and the normal subframe (normal downlink subframe) or in a case of the normal CP and the special subframe with the special subframe configuration 3, 4, or 8. $N^{ECCE}_{EREG}$ is 16, in a case of the normal CP and the special subframe with the special subframe configuration 1, 2, 6, 7, or 9 (that is, a special subframe in which a DwPTS includes from 6 to 10 OFDM symbols); in a case of an extended CP and the normal subframe, or in a case of an extended CP and a special subframe with the special subframe configuration 1, 2, 3, 5, or 6 (that is, a special subframe in which a DwPTS includes from 6 to 10 OFDM symbols).

The correspondence between the EPDCCH format and the number of ECCEs per EPDCCH (the aggregation level) can be prescribed. Furthermore, the correspondence can be prescribed differently between the first EPDCCH and the second EPDCCH.

In the first EPDCCH, the correspondence between the EPDCCH format and the number of ECCEs per EPDCCH (the aggregation level) can be prescribed for a plurality of cases including a case A and a case B. The case A is used in a case of satisfying a condition corresponding to a case 1 described later, otherwise, the case B is used. The aggregation level in the case A is 2, 4, 8, and 16 in the case of the localized transmission, and 2, 4, 8, 16 and 32 in the case of the distributed transmission. The aggregation level in the case B is 1, 2, 4, and 8 in the case of the localized transmission, and 1, 2, 4, 8, and 16 in the case of the distributed transmission. That is, the aggregation level in the case A is larger than the aggregation level in the case B. Thus, even in a case that the number of REs used for each EREG in the EPDCCH is small, a prescribed reception performance for the EPDCCH can be obtained by increasing the aggregation level.

$n_{EPDCCH}$ being the number for a certain terminal device is defined as the number of the downlink REs satisfying all or some of Standards (a1) to (a4) below within one PRB pair configured for the EPDCCH transmission of an EPDCCH set $X_0$ (the first EPDCCH set out of up to two EPDCCH sets).

(a1) The downlink RE is some of any one of 16 EREGs in the PRB pairs.

(a2) The downlink RE is assumed not to be used as a CRS by the terminal device. Here, unless another value is provided to parameters of the antenna port number of the CRS and of the frequency shift, the position of the CRS is given by the parameters in the Serving cell (the antenna port number according to the same antenna port configuration as that in the PBCH and the frequency shift obtained based on a physical cell identifier). Conversely, in a case that a set of the parameters is configured for the terminal device by a higher layer parameter re-MappingQCL-ConfigID-r11, the position of the CRS is determined by using the parameter.

(a3) The downlink RE is assumed not to be used as a CSIRS by the terminal device. Here, a position of the CSIRS is given by a configuration of a zero power CSIRS in the Serving cell (in a case that another value is not provided to the configuration for a zero power CSIRS) and a configuration of a non-zero power CSIRS therein. Conversely, in a case that the zero power CSIRS is configured for the terminal device by a higher layer parameter re-MappingQCL-ConfigID-r11, the position of the CSIRS is determined by using the parameter.

(a4) An index I in the first slot in the subframe satisfies being $I_{EPDCCHStart}$ or more. That is, mapping is performed to an RE on an OFDM symbol subsequent to $I_{EPDCCHStart}$ within one subframe. Here, I is an index assigned to an OFDM symbol within the slot, I being sequentially assigned from the first OFDM symbol within the slot, in ascending order from 0 in the time direction. $I_{EPDCCHStart}$ will be described later.

In the second EPDCCH, an example of the correspondence between the EPDCCH format and the number of ECCEs per EPDCCH (the aggregation level) is the same as that in the first EPDCCH.

In the second EPDCCH, another example of the correspondence between the EPDCCH format and the number of ECCEs per EPDCCH (aggregation level) is prescribed in advance for one case. For example, in the second EPDCCH, the correspondence between the EPDCCH format and the number of ECCEs per EPDCCH (aggregation level) is prescribed in advance for the case A.

In the second EPDCCH, another example of the correspondence between the EPDCCH format and the number of ECCEs per EPDCCH (the aggregation level) can be prescribed for a plurality of cases including a case A, a case B, and a case C. The aggregation level in the case A and the aggregation level in the case B are the same as that in the first EPDCCH. The aggregation level in the case C may be larger than the aggregation level in the case A. For example, the aggregation level in the case C is 4, 8, 16, and 32 in the case of the localized transmission, and 4, 8, 16, 32, and 64 in the case of the distributed transmission.

Furthermore, in an example of $n_{EPDCCH}$ being the number for a certain terminal device, each $n_{EPDCCH}$ is independent between the first EPDCCH and the second EPDCCH. In the first EPDCCH, $n_{EPDCCH}$ is defined as the number of the downlink REs satisfying all of Standards (a1) to (a4) described above within one PRB pair configured for the EPDCCH transmission of the EPDCCH set $X_0$ (the first EPDCCH set out of up to two EPDCCH sets) in the first EPDCCH. Furthermore, in the second EPDCCH, $n_{EPDCCH}$ is defined as the number of the downlink REs satisfying all or some of Standards (a1) to (a4) described above within one PRB pair configured for the EPDCCH transmission of the EPDCCH set $X_0$ (the first EPDCCH set out of one or more EPDCCH sets) in the second EPDCCH.

Furthermore, in an example of $n_{EPDCCH}$ being the number for a certain terminal device, $n_{EPDCCH}$ is common to the first EPDCCH and the second EPDCCH. Specifically, $n_{EPDCCH}$ in the second EPDCCH is the same as the $n_{EPDCCH}$ in the first EPDCCH. That is, in the second EPDCCH, $n_{EPDCCH}$ is defined as the number of the downlink REs satisfying all of Standards (a1) to (a4) described within one PRB pair configured for the EPDCCH transmission of the EPDCCH set $X_0$ (the first EPDCCH set out of up to two EPDCCH sets) in the first EPDCCH.

A block of bits transmitted on one EPDCCH in one subframe, the block of bits being b (0), . . . , b ($M_{bit}$–1) is scramble based on h (i)=(b (i)+c (i)) mod 2, and the resulting h (0), . . . , h ($M_{bit}$–1) becomes a scrambled block of bits, where $M_{bit}$ is the number of bits transmitted on one EPDCCH, and c (i) is a scrambling sequence specific to the terminal device initialized by a parameter $c_{init}$. This scrambling sequence generator is $c_{init}$=floor $(n_s/2)$ $2^9$+ $n^{EPDCCH}_{ID, m}$, where m is the number of an EPDCCH set, $n_s$ is the slot number in a radio frame, and $n^{EPDCCH}_{ID, m}$ is a DMRS scrambling initialization parameter that can be configured for each EPDCCH set by higher layer signalling, and can take any value of 0 to 503.

The scrambled block of bits h (0), . . . , h ($M_{bit}$–1) is modulated to provide a block of complex valued modulation symbols of d (0), . . . , d ($M_{symb}$–1), where $M_{symb}$ is the number of modulation symbols transmitted on one EPDCCH. The modulation method of the EPDCCH is a Quadrature Phase Shift Keying (QPSK). The block of complex valued modulation symbols is mapped to a single layer to be precoded, based on an equation y (i)=d (i), where i=0, . . . , $M_{symb}$–1, and y is a precoded modulation symbol.

y (0), . . . , y ($M_{symb}$–1) being a block of complex valued symbols are sequentially mapped with starting from y (0), to an RE on an associated antenna port (RE on the position given by k and l) satisfying all Standards (m1) to (m4) below.

(m1) The RE is some of an EREG allocated for EPDCCH transmission.

(m2) The RE is assumed not to be used for a CRS by the terminal device. Here, unless another value is provided to parameters of the antenna port number of the CRS and of the frequency shift, the position of the CRS is given by the parameters in the Serving cell (the antenna port number according to the same antenna port configuration as that in the PBCH and the frequency shift obtained based on a physical cell identifier). Conversely, in a case that a set of the parameters is configured for the terminal device by a higher layer parameter re-MappingQCL-ConfigID-r11, the position of the CRS is determined by using the parameter.

(m3) The RE is assumed not to be used for a CSIRS by the terminal device. Here, a position of the CSIRS is given by a configuration of a zero power CSIRS in the Serving cell (in a case that another value is not provided to the configuration for a zero power CSIRS) and a configuration of a non-zero power CSIRS therein. Conversely, in a case that the zero power CSIRS is configured for the terminal device by a higher layer parameter re-MappingQCL-ConfigID-r11, the position of the CSIRS is determined by using the parameter.

(m4) An index l in the first slot in the subframe satisfies being $I_{EPDCCHStart}$ or more. That is, mapping is performed to an RE on an OFDM symbol subsequent to $I_{EPDCCHStart}$ within one subframe. Here, l is an index assigned to an OFDM symbol within the slot, l being sequentially assigned from the first OFDM symbol within the slot, in ascending order from 0 in the time direction. $I_{EPDCCHStart}$ will be described later.

Mapping to an RE (RE on the position given by k and l) in an antenna port P, the RE satisfying the above standards ascends, is performed in ascending order of the index k and the index l (in a direction in which k and l increase), the index k preceding the index l. The mapping starts from the first slot and ends at the second slot in a subframe.

Here, the antenna port P is a port of a logical antenna. One antenna port may correspond to one physical antenna, or a signal of one antenna port may be actually transmitted with a plurality of physical antennas. Alternatively, a signal of a plurality of antenna ports may be actually transmitted with the same physical antenna. As long as antenna ports are the same, the same channel performance can be obtained. Here, antenna ports 0 to 3 are associated with (used for) transmission of a CRS; an antenna port 4 is associated with (used for) transmission of a Reference Signal for Multimedia Broadcast multicast service Single Frequency Network (MBSFN); antenna ports 5 and 7 to 14 are associated with (used for) transmission of a Reference Signal specific to a terminal device associated with the PDSCH; antenna ports 107 to 110 are associated with (used for) transmission of a Demodulation Reference Signal associated with the EPDCCH; an antenna port 6 is associated with (used for) transmission of a positioning Reference Signal, and antenna ports 15 to 22 are associated with (used for) transmission of a CSIRS.

In the localized transmission, the single antenna port P to be used is given by n' calculated by n'=$n_{ECCE, low}$ mod $N^{RB}_{ECCE}$+$n_{RNTI}$ mod min ($N^{EPDCCH}_{ECCE}$, $N^{RB}_{ECCE}$) and (n1) to (n4) below. Here, $n_{ECCE, low}$ is a lowest ECCE index used by the EPDCCH transmission in the EPDCCH set, and $n_{RNTI}$ is equivalent to a Cell-RNTI (C-RNTI) being one of Radio Network Temporary Identifiers (RNTIs). Furthermore, $N^{EPDCCH}_{ECCE}$ is the number of ECCEs used for the EPDCCH. Moreover, min is the maximum value function (max function).

(n1) n'=0 corresponds to P=107, in a case of a normal CP, and a normal subframe or a special subframe with the special subframe configuration 3, 4, or 8. n'=0 corresponds to P=107 in a case of the normal CP, and a special subframe of the special subframe configuration 1, 2, 6, 7, or 9. In a case of an extended CP, n'=0 corresponds to P=107, in any subframe type.

(n2) n'=1 corresponds to P=108 in a case of a normal CP, and a normal subframe or a special subframe of the special subframe configuration 3, 4, or 8. n'=1 corresponds to P=109 in a case of a normal CP and a special subframe of the special subframe configuration 1, 2, 6, 7 or 9. n'=1 corresponds to P=108 in a case of an extended CP, in any subframe type.

(n3) n'=2 corresponds to P=109, in a case of a normal CP, and a normal subframe or a special subframe with the special subframe configuration 3, 4, or 8.

(n4) n'=3 corresponds to P=110, in a case of a normal CP, and a normal subframe or a special subframe of the special subframe configuration 3, 4, or 8.

In the distributed transmission, each RE in one EREG is associated with one out of two antenna ports, in accordance with the alternating rule with starting from the antenna port 107. Here, in the normal CP, two antenna ports are the antenna port 107 and the antenna port 109, and in the extended CP, the two antenna ports are the antenna port 107 and the antenna port 108.

For each Serving cells, the base station device can configure, for a UE, by higher layer signalling, one or two EPDCCH-PRB sets for monitoring an EPDCCH (an aggregation of PRB pairs in which an EPDCCH can be arranged, which is also referred to as an EPDCCH set). Here, a plurality of PRB pairs corresponding to one EPDCCH-PRB set (the number of PRB pairs corresponding to one EPDCCH-PRB set and a PRB pair which the EPDCCH-PRB set corresponds to) are also indicated by the higher layer signalling. Each EPDCCH-PRB set is constituted of a set of ECCEs numbered from 0 to $N_{ECCE,\ p,\ k}-1$. Here, $N_{ECCE,\ p,\ k}-1$ is the number of ECCEs within an EPDCCH-PRB set p (p+1-th EPDCCH-PRB set, where p is 0 or 1) in a subframe k. Each EPDCCH-PRB set can be configured by either a localized EPDCCH transmission or a distributed EPDCCH transmission. That is, in an EPDCCH-PRB set configured with the localized EPDCCH transmission, one EPDCCH is arranged in the frequency direction relatively in a localized manner, and in an EPDCCH-PRB set configured with the distributed EPDCCH transmission, one EPDCCH is arranged in the frequency direction relatively in a distributed manner.

An EPDCCH set can be independently configured between the first EPDCCH and the second EPDCCH. For example, a different parameter can be used to configure an EPDCCH set for the first EPDCCH and an EPDCCH set for the second EPDCCH.

Furthermore, in a certain Serving cell, the terminal may configure so that the EPDCCH set for the first EPDCCH and the EPDCCH set for the second EPDCCH are not simultaneously configured. For example, the EPDCCH set for the first EPDCCH is configured for a Serving cell using the LTE of the related art, and the EPDCCH set for the second EPDCCH is configured for an LAA cell. Furthermore, for example, in a case that a method (mode) in which one subframe is provided as the unit in the time direction similarly to the LTE of the related art is configured for the terminal in the Serving cell, the EPDCCH set for the first EPDCCH is configured, and in a case that a method (mode) in which one slot is provided as the unit in the time direction is configured therefor, the EPDCCH set for the second EPDCCH is configured.

Furthermore, in a certain Serving cell, the terminal may configure so that the EPDCCH set for the first EPDCCH and the EPDCCH set for the second EPDCCH are simultaneously configured. For example, in an LAA cell, the first EPDCCH is monitored in a partial subframe, based on the EPDCCH set for the first EPDCCH, and the second EPDCCH is monitored in a full subframe, based on the EPDCCH set for the second EPDCCH.

An example of the EPDCCH set for the first EPDCCH and the EPDCCH set for the second EPDCCH being configured by using different parameters is the number of PRB pairs which can be configured, the PRB pairs corresponding to one EPDCCH set. For example, in the EPDCCH set for the first EPDCCH, the number of PRB pairs which can be configured is 2, 4, or 8, the PRB pairs corresponding to one EPDCCH set. In the EPDCCH set for the second EPDCCH, the number of PRB pairs which can be configured is 4, 8, or 18, the number being two times number of the EPDCCH set for the first EPDCCH, the PRB pairs corresponding to one EPDCCH set. Furthermore, in the EPDCCH set for the second EPDCCH, it is prescribed that the number of PRB pairs corresponding to one EPDCCH set may be determined in accordance with an assumed start symbol or end symbol of the second EPDCCH. For example, it is prescribed that the number of PRB pairs corresponding to one EPDCCH set increases as the number of OFDM symbols used for the transmission of the second EPDCCH decreases.

An example of the EPDCCH set for the first EPDCCH and the EPDCCH set for the second EPDCCH being configured by using different parameters is a parameter for a partial subframe. For example, the parameter includes a parameter indicating a start symbol and/or end symbol of the second EPDCCH and a candidate thereof.

Furthermore, in an example, the start symbol of the second EPDCCH is independently or commonly configured for each EPDCCH set through RRC signalling. For example, any one of OFDM symbols from #0 to #6 in a slot 0 and OFDM symbols from #0 to #6 in a slot 1 is configured as the start symbol of the second EPDCCH. Furthermore, for example, of the OFDM symbols from #0 to 6 in the slot 0 and the OFDM symbols from #0 to #6 in the slot 1, the prescribed number of the symbols are prescribed in advance as candidates, and any one of the candidates is configured as the start symbol of the second EPDCCH. Furthermore, for example, either the OFDM symbol #0 in the slot 0 or the OFDM symbol #0 in the slot 1 is configured as the start symbol of the second EPDCCH. Moreover, for example, the start symbol of the second EPDCCH is determined based on an OFDM symbol in which an initial signal is detected. Specifically, the start symbol of the second EPDCCH is an OFDM symbol in which an initial signal is detected or an OFDM symbol a prescribed number of the symbols after the OFDM symbol in which an initial signal is detected. Furthermore, for example, the start symbol of the second EPDCCH is an OFDM symbol in which a plurality of candidates are prescribed or configured, the OFDM symbol being immediately subsequent to the OFDM symbol in which an initial signal is detected.

Furthermore, in an example, the end symbol of the second EPDCCH is independently or commonly configured for each EPDCCH set through RRC signalling. For example, any one of the OFDM symbols from #0 to #6 in the slot 0 and the OFDM symbols from #0 to #6 in the slot 1 is configured as the end symbol of the second EPDCCH. Furthermore, for example, of the OFDM symbols from #0 to #6 in the slot 0 and the OFDM symbols from #0 to #6 in the slot 1, the prescribed number of the symbols are prescribed in advance as candidates, and any one of the candidates is configured as the end symbol of the second EPDCCH. Furthermore, for example, either the OFDM symbol #6 in the slot 0 or the OFDM symbol #6 in the slot 1 is configured as the end symbol of the second EPDCCH. Furthermore, for example, the end symbol of the second EPDCCH is determined based on the start symbol of the second EPDCCH in the corresponding burst. Furthermore, for example, the end symbol of the second EPDCCH is determined based on the start symbol of the second EPDCCH in the corresponding burst and the longest length of the corresponding burst. Furthermore, for example, the end symbol of the second EPDCCH is determined based on control information included in the initial signal in the corresponding burst. Specifically, the control information includes information indicating the end symbol of the second EPDCCH. Furthermore, for example, the end symbol of the second EPDCCH is determined based on the control information included in a prescribed channel and/or signal transmitted in the partial subframe thereof.

The terminal device monitors a set of EPDCCH candidates in one or more effective Serving cells so that the terminal device is configured by the higher layer signalling for the control information. Here, the monitoring (to monitor) implicitly refers to an attempt to decode each EPDCCH in a set of EPDCCH candidates, in accordance with a DCI format to be monitored. A set of EPDCCH candidates to be monitored is prescribed in a UE-specific Search Space (USS) of the EPDCCH. Here, the USS is a logical region configured specifically to a terminal device, and the region may be used for transmission of downlink control information. The monitoring is also referred to as blind detection.

Furthermore, the start symbol of the second EPDCCH and/or the end symbol of the second EPDCCH may be blind-detected (monitored) by the terminal from a plurality of OFDM symbol candidates. For example, a plurality of candidates are prescribed or configured for the start symbol of the second EPDCCH and/or the end symbol of the second EPDCCH, the terminal monitors the second EPDCCH assumed to be transmitted based on an OFDM symbol being a candidate of the start symbol and/or the end symbol. That is, an assumed start symbol and/or end symbol to be may be independent (different) for each of the second EPDCCHs in the set of the second EPDCCH candidates.

A subframe in which a UE monitors an EPDCCH USS is configured by the higher layer for each Serving cell. More specifically, the higher layer configures the monitoring of the EPDCCH in a subframe during an active time (a duration not being an inactivity timer start-up duration by a discontinuous reception, a duration not being a non-reception period, a total period during which the terminal device is awake), the subframe not being requested for the uplink transmission for a FDD half duplex terminal device and not being a part of a measurement gap. Here, the discontinuous reception refers to an operation in which the terminal device need not be awake (in an active state) (may be non-active) except for some duration in order to optimize the battery consumption of the terminal device. The Frequency Division Duplex (FDD) half duplex terminal device is a terminal device that does not have a function of simultaneously performing the uplink transmission and the downlink reception (in the same subframe) in an FDD band. Furthermore, the measurement gap refers to a duration during which transmission and/or reception is stopped in a Serving cell in order to perform measurement (reception power measurement of cells other than the Serving cell) for mobility (handover), a pattern of the measurement gap being configured by an RRC.

The terminal device does not monitor an EPDCCH in Cases (e1) to (e4) below.

(e1) In a case of a special subframe with the special subframe configurations 0 and 5 (special subframe in which the number of OFDM symbols in a DwPTS is less than six) in TDD and a normal downlink CP.

(e2) In a case of a special subframe with the special subframe configurations 0, 4, and 7 (special subframe in which the number of OFDM symbols in a DwPTS is less than six) in TDD and an extended downlink CP.

(e3) In a case of a subframe instructed to decode a Physical Multicast Channel (PMCH) by a higher layer.

(e4) In a case of TDD and different UL/DL configurations being configured in a Primary cell and a Secondary cell, a subframe being a downlink subframe in the Secondary cell and the subframe in the Primary cell being a special subframe, and the terminal device not having capability of performing simultaneous reception and transmission in the Primary cell and the Secondary cell.

Here, the special subframe indicates a subframe including, in one subframe, three regions in order of: a region (DwPTS) for performing downlink transmission, a Guard Period (GP), and a region (UpPTS) for performing uplink transmission. Lengths of the DwPTS, GP, and UpPTS are uniquely determined by the special subframe configuration and a length of CP. The PMCH is a channel for providing Multimedia Broadcast/Multicast Service (MBMS), the channel being only arranged in an MBSFN subframe.

Note that the special subframe configuration is configured by any one of the following 10 configurations.

In the special subframe configuration 0, a DwPTS is 6592 samples in a normal downlink CP, and an UpPTS is 2192 samples in a normal uplink CP, and 2560 samples in an extended uplink CP. On the other hand, the DwPTS is 7680 samples in an extended downlink CP, and the UpPTS is 2192 samples in the normal uplink CP, and 2560 samples in the extended uplink CP. The DwPTS is constituted of three OFDM symbols, and the UpPTS is constituted of one SC-FDMA symbol.

In the special subframe configuration 1, a DwPTS is 19760 samples in a normal downlink CP, an UpPTS is 2192 samples in a normal uplink CP, and 2560 samples in an extended uplink CP. On the other hand, the DwPTS is 20480 samples in an extended downlink CP, the UpPTS is 2192 samples in the normal uplink CP, and 2560 samples in the extended uplink CP. The DwPTS is constituted of nine OFDM symbols in a case of the normal downlink CP, and eight OFDM symbols in a case of the extended downlink CP. The UpPTS is constituted of one SC-FDMA symbol.

In the special subframe configuration 2, a DwPTS is 21952 samples in a normal downlink CP, an UpPTS is 2192 samples in a normal uplink CP, and 2560 samples in an extended uplink CP. On the other hand, the DwPTS is 23040 samples in an extended downlink CP, the UpPTS is 2192 samples in the normal uplink CP, and 2560 samples in the extended uplink CP. The DwPTS is constituted of 10 OFDM symbols in a case of the normal downlink CP and nine OFDM symbols in a case of the extended downlink CP. The UpPTS is constituted of one SC-FDMA symbol.

In the special subframe configuration 3, a DwPTS is 24144 samples in a normal downlink CP, an UpPTS is 2192 samples in a normal uplink CP, and 2560 samples in an extended uplink CP. On the other hand, the DwPTS is 25600 samples in an extended downlink CP, the UpPTS is 2192 samples in the normal uplink CP, and 2560 samples in the extended uplink CP. The DwPTS is constituted of 11 OFDM symbols in a case of the normal downlink CP, and 10 OFDM symbols in a case of the extended downlink CP. The UpPTS is constituted of one SC-FDMA symbol.

In the special subframe configuration 4, a DwPTS is 26336 samples in a normal downlink CP, an UpPTS is 2192 samples in a normal uplink CP, and 2560 samples in an extended uplink CP. On the other hand, the DwPTS is 7680 samples in an extended downlink CP, the UpPTS is 4384 samples in the normal uplink CP, and 5120 samples in the extended uplink CP. The DwPTS is constituted of 12 OFDM symbols in a case of the normal downlink CP, and three OFDM symbols in a case of the extended downlink CP. The UpPTS is constituted of one SC-FDMA symbol in a case of the normal downlink CP, and two SC-FDMA symbols in a case of the extended downlink CP.

In the special subframe configuration 5, a DwPTS is 6592 samples in a normal downlink CP, an UpPTS is 4384 samples in a normal uplink CP, and 5120 samples in an extended uplink CP. On the other hand, the DwPTS is 20480 samples in an extended downlink CP, the UpPTS is 4384 samples in the normal uplink CP, and 5120 samples in the extended uplink CP. The DwPTS is constituted of three OFDM symbols in a case of the normal downlink CP, and eight OFDM symbols in a case of the extended downlink CP. The UpPTS is constituted of two SC-FDMA symbols.

In the special subframe configuration 6, a DwPTS is 19760 samples in a normal downlink CP, an UpPTS is 4384 samples in a normal uplink CP, and 5120 samples in an extended uplink CP. On the other hand, the DwPTS is 23040 samples in an extended downlink CP, the UpPTS is 4384 samples in the normal uplink CP, and 5120 samples in the extended uplink CP. The DwPTS is constituted of nine OFDM symbols, and the UpPTS is constituted of two SC-FDMA symbols.

In the special subframe configuration 7, a DwPTS is 21952 samples in a normal downlink CP, an UpPTS is 4384 samples in a normal uplink CP, and 5120 samples in an extended uplink CP. On the other hand, the DwPTS is 12800 samples in an extended downlink CP, the UpPTS is 4384 samples in the normal uplink CP, and 5120 samples in the extended uplink CP. The DwPTS is constituted of 10 OFDM symbols in a case of the normal downlink CP, and of five OFDM symbols in a case of the extended downlink CP. The UpPTS is constituted of two SC-FDMA symbols.

In the special subframe configuration 8, a DwPTS is 24144 samples in a normal downlink CP, an UpPTS is 4384 samples in a normal uplink CP, and 5120 samples in an extended uplink CP. The DwPTS is constituted of 11 OFDM symbols in a case of the normal downlink CP and the UpPTS is constituted of two SC-FDMA symbols.

In the special subframe configuration 9, a DwPTS is 13168 samples in a normal downlink CP, an UpPTS is 4384 samples in a normal uplink CP, and 5120 samples in an extended uplink CP. The DwPTS is constituted of six OFDM symbols in a case of the normal downlink CP and the UpPTS is constituted of two SC-FDMA symbols.

Here, in the case that the UpPTS is constituted of one SC-FDMA symbol, the terminal device can transmit a Sounding Reference Signal (SRS) that is a Reference Signal for an uplink sounding in accordance with a request from the base station device, by using the one SC-FDMA symbol. In the case that the UpPTS is constituted of two SC-FDMA symbols, the terminal device can transmit an SRS in accordance with the request from a base station device, by using at least either one of the two SC-FDMA symbols.

Here, in the normal CP, the normal downlink subframe is constituted of 14 OFDM symbols, and the normal uplink subframe is constituted of 14 SC-FDMA symbols. Furthermore, in the extended CP, the normal downlink subframe is constituted of 12 OFDM symbols and the normal uplink subframe is constituted of 12 SC-FDMA symbols.

In the UL/DL configuration, any one of the following seven configurations is configured.

In the UL/DL configuration 0, subframes 0 to 9 in one radio frame (10 subframes) are sequentially a downlink subframe, a special subframe, an uplink subframe, an uplink subframe, an uplink subframe, a downlink subframe, a special subframe, an uplink subframe, an uplink subframe, and an uplink subframe. A cycle of a conversion point from the downlink to the uplink is five subframes (5 milliseconds).

In the UL/DL configuration 1, subframes 0 to 9 in one radio frame are sequentially a downlink subframe, a special subframe, an uplink subframe, an uplink subframe, a downlink subframe, a downlink subframe, a special subframe, an uplink subframe, an uplink subframe, and a downlink subframe. A cycle of a conversion point from the downlink to the uplink is five subframes.

In the UL/DL configuration 2, subframes 0 to 9 in one radio frame are sequentially a downlink subframe, a special subframe, an uplink subframe, a downlink subframe, a downlink subframe, a downlink subframe, a special subframe, an uplink subframe, a downlink subframe, and a downlink subframe. A cycle of a conversion point from the downlink to the uplink is five subframes.

In the UL/DL configuration 3, subframes 0 to 9 in one radio frame are sequentially a downlink subframe, a special subframe, an uplink subframe, an uplink subframe, an uplink subframe, a downlink subframe, a down subframe, a downlink subframe, a downlink subframe, and a downlink subframe. A cycle of a conversion point from the downlink to the uplink is 10 subframes (10 milliseconds).

In the UL/DL configuration 4, subframes 0 to 9 in one radio frame are sequentially a downlink subframe, a special subframe, an uplink subframe, an uplink subframe, a downlink subframe, a downlink subframe, a down subframe, a downlink subframe, a downlink subframe, and a downlink subframe. A cycle of a conversion point from the downlink to the uplink is 10 subframes.

In the UL/DL configuration 5, subframes 0 to 9 in one radio frame are sequentially a downlink subframe, a special subframe, an uplink subframe, a downlink subframe, a downlink subframe, a downlink subframe, a down subframe, a downlink subframe, a downlink subframe, and a downlink subframe. A cycle of a conversion point from the downlink to the uplink is 10 subframes.

In the UL/DL configuration 6, subframes 0 to 9 in one radio frame are sequentially a downlink subframe, a special subframe, an uplink subframe, an uplink subframe, an uplink subframe, a downlink subframe, a downlink subframe, a special subframe, an uplink subframe, an uplink subframe, and a downlink subframe. A cycle of a conversion point from the downlink to the uplink is five subframes.

Here, in a case that the UL/DL configuration for at least one Serving cell is the UL/DL configuration 5, more than two Serving cells are not configured.

$ES^{(L)}_k$ being the USS of the EPDCCH at an aggregation level L is prescribed by a set of EPDCCH candidates. Here, L is any one of 1, 2, 4, 8, 16 and 32. For one EPDCCH-PRB set p, the ECCE corresponding to an EPDCCH candidate m in the search space $ES^{(L)}_k$ is given by L $((Y_{p,\ k}+\text{floor}(mN_{ECCE,\ p,\ k}/(LM^{(L)}_p))+b) \mod (\text{floor}(N_{ECCE,\ p,\ k}/L)))+i$, where i=0, . . . , L−1. Furthermore, in a case that a Carrier Indicator Field (CIF) is configured for a Serving cell in which an EPDCCH is monitored, b is a value of the CIF. Otherwise, b=0. Furthermore, in the equation, m=0, 1, . . . , $M^{(L)}_p$−1. In a case that the CIF is not configured for a Serving cell in which the EPDCCH is monitored, $M^{(L)}_p$ is the number of EPDCCHs to be monitored at the aggregation level L within the EPDCCH-PRB set p in the Serving cell in which the EPDCCH is monitored. Otherwise, $M^{(L)}_p$ is the number of EPDCCHs to be monitored at the aggregation level L within the EPDCCH-PRB set p in the Serving cell indicated by the CIF value. Here, the CIF is a field within a DCI format and the CIF value is used for determining in which Serving cell the DCI format corresponds to PDSCH transmission, PUSCH transmission, or a random access procedure, the value being the same value as a Serving cell index corresponding to either the Primary cell or the Secondary cell.

In the same subframe, the terminal device does not monitor the EPDCCH candidate in a case that an ECCE corresponding to a certain EPDCCH candidate is mapped to a PRB pair overlapping, on a frequency, with transmission of any one of a PBCH, a primary synchronization signal, and a secondary synchronization signal.

In a case that: $n^{EPDCCH}_{ID,\ i}$ having the same value is configured for two EPDCCH-PRB sets in the terminal device; the terminal device receives an EPDCCH candidate which has a certain DCI payload size corresponding to one EPDCCH-PRB set and is mapped to a certain RE set, and the terminal device is also configured to monitor an EPDCCH candidate which has the same DCI payload size corresponding to the other EPDCCH-PRB set and is mapped to the same RE set; and the number of the first ECCE of the received EPDCCH is used in determination of a PUCCH resource for HARQ-ACK transmission, the number of the first ECCE is determined based on the EPDCCH-PRB set of p=0. Here, $n^{EPDCCH}_{ID,\ i}$ is a parameter used when pseudo-random sequence generation of a Demodulation Reference Signal (DMRS) associated with an EPDCCH is initialized and configured by the higher layer. Note that i takes a value of 0 or 1, indicating the EPDCCH set to which the EPDCCH associated with the DMRS belongs. That is, i is almost synonymous to p.

$Y_{p,\ k}$ is defined by $Y_{p,\ k}=(A_p Y_{p,\ k-1}) \mod D$. Here, $Y_{p,\ k-1}$ is a value of an RNTI being an identifier configured for the terminal device in the physical layer, where $A_0$ is 39827, $A_1$ is 39829, D is 65537, and k=floor ($n_s/2$). That is, each subframe is constituted of two slots, where k indicates the subframe number in a radio frame.

Furthermore, a correspondence between the PRB number included in the EPDCCH-PRB set, the aggregation level, and the number of EPDCCH candidates to be monitored can be prescribed. The aggregation level for prescribing the search space and the number of EPDCCH candidates to be monitored is given as follows. Here, $N^{XP}_{RB}$ is the number of PRB pairs included in the EPDCCH-PRB set p.

Here, the aggregation level for prescribing the search space and the number of EPDCCH candidates to be monitored is independently prescribed: (1) in a case that only one EPDCCH-PRB for distributed transmission is configured for the terminal device; (2) in a case that only one EPDCCH-PRB for localized transmission is configured for the terminal device; (3) in a case that two EPDCCH-PRBs for the distributed transmission are configured for the terminal device; (4) in a case that two EPDCCH-PRBs for the localized transmission are configured for the terminal device, and (5) in a case that one EPDCCH-PRB for the distributed transmission and one EPDCCH-PRB for the localized transmission are configured for the terminal device.

Note that in the present embodiment, p1 is a sign for identifying the localized EPDCCH-PRB set, p1 is a sign for identifying the localized EPDCCH-PRB set, and p2 is a sign for identifying the distributed EPDCCH-PRB set. That is, $N^{Xp1}_{RB}$ is the number of PRB pairs included in the localized EPDCCH-PRB set, and $N^{Xp2}_{RB}$ is the number of PRB pairs included in the distributed EPDCCH-PRB set. Furthermore, $M^{(L)}_{p1}$ is the number of EPDCCHs to be monitored at the aggregation level L within the localized EPDCCH-PRB set, and $M^{(L)}_{p2}$ is the number of EPDCCHs to be monitored at the aggregation level L within the distributed EPDCCH-PRB set.

For the correspondence between the number of PRBs included in the EPDCCH-PRB set, the aggregation level, and the number of EPDCCH candidates to be monitored, a case 1 is applied to a case of (c1) to (c4) below, a case 2 is applied to a case of (c5) to (c7) below, and a case 3 is applied to a case of (c8) respectively.

(c1) In a case that any one of the DCI formats 2, 2A, 2B, 2C, and 2D is monitored and $M^{DL}_{RB}$ is 25 or more in a normal subframe and a normal downlink CP. That is, in a case that the number of REs which can be used for EPDCCH transmission within one PRB pair is relatively large, and a payload size of the DCI format is significantly large.

(c2) In a case that any one of the DCI formats 2, 2A, 2B, 2C, and 2D is monitored and $M^{DL}_{RB}$ is equal to or more than 25 in a special subframe with the special subframe configuration 3, 4, or 8 and in the normal downlink CP (that is, a special subframe in which the DwPTS is constituted of 11 or more OFDM symbols). That is, in a case that the number of REs which can be used for EPDCCH transmission within one PRB pair is relatively large, and a payload size of the DCI format is significantly large.

(c3) In a case that any one of the DCI formats 1A, 1B, 1D, 1, 2, 2A, 2B, 2C, 2D, 0, and 4 is monitored and $n_{EPDCCH}$ is smaller than 104 in a normal subframe and a normal downlink CP. That is, in a case that the number of REs which can be used for EPDCCH transmission within one PRB pair is significantly low.

(c4) In a case that any one of the DCI formats 1A, 1B, 1D, 1, 2, 2A, 2B, 2C, 2D, 0 and 4 is monitored and $n_{EPDCCH}$ is smaller than 104 in a special subframe with the special subframe configuration 3, 4, or 8 and in a normal downlink CP (that is, a special subframe in which the DwPTS is constituted of 11 or more OFDM symbols). That is, in a case that the number of REs which can be used for EPDCCH transmission within one PRB pair is significantly low.

(c5) In a case that any one of the DCI formats 1A, 1B, 1D, 1, 2, 2A, 2B, 2C, 2D, 0, or 4 is monitored in a normal subframe and an extended downlink CP. That is, in a case that the number of REs which can be used for EPDCCH transmission within one PRB pair is relatively low.

(c6) In a case that any one of the DCI formats 1A, 1B, 1D, 1, 2, 2A, 2B, 2C, 2D, 0, and 4 is monitored in a special subframe of special subframe configurations 1, 2, 6, 7 or 9 and a normal downlink CP (that is, a special subframe in which the DwPTS is constituted of from 6 to 10 OFDM symbols). That is, in a case that the number of REs which can be used for EPDCCH transmission within one PRB pair is relatively low.

(c7) In a case that any one of the DCI formats 1A, 1B, 1D, 1, 2, 2A, 2B, 2C, 2D, 0, and 4 is monitored in a special subframe with the special subframe configuration 1, 2, 3, 5 or 6 and an extended downlink CP (that is, a special subframe in which the DwPTS is constituted of from 6 to 10 OFDM symbols). That is, in a case that the number of REs which can be used for EPDCCH transmission within one PRB pair is relatively low.

(c8) In a case of none of the above-described (c1) to (c7). That is, in a case that the number of REs which can be used for EPDCCH transmission within one PRB pair is relatively large, and the payload size of the DCI format is not so large.

Here, in a case that the CIF is not configured for the Serving cell in which the EPDCCH is monitored in the terminal device, $M^{DL}_{RB}$ is $N^{DL}_{RB}$ of the Serving cell in which the EPDCCH is monitored. In a case that the CIF is configured for the Serving cell in which the EPDCCH is monitored in the terminal device, $M^{DL}_{RB}$ is $N^{DL}_{RB}$ of the Serving cell specified by the CIF value. Here, $N^{DL}_{RB}$ is a downlink bandwidth configuration being expressed by a multiples unit of a Resource Block size in the frequency direction. In other words, $N^{DL}_{RB}$ is a total Resource Block number in the frequency direction within a downlink component carrier in the Serving cell. Furthermore, the DCI formats 1A, 1B, 2D and 1 are the DCI formats used in a transmission mode in which one transport block can be transmitted by using one PDSCH, each of which is used in a PDSCH transmission method such as transmission diversity, closed loop spatial multiplexing by using a single port, multi-user Multiple Input Multiple Output (MIMO) and single antenna port transmission. Furthermore, the DCI formats 2, 2A, 2B, 2C, and 2D is a DCI format used in a transmission mode in which up to two transport blocks can be transmitted by using one PDSCH, each of which is used in a PDSCH transmission method such as closed loop spatial multiplexing, large latency Cyclic Delay Diversity (CDD), two-layer transmission, eight or less-layer transmission, and eight or less-layer transmission. Furthermore, the DCI formats 2 and 2A are used in a PDSCH transmission method of transmission diversity, and the DCI formats 2B, 2C, and 2D are used in a PDSCH transmission of a single antenna port. The DCI formats 0 and 4 is a DCI format which is used in transmission modes in which one transport block and up to two transport blocks can be transmitted by using one PUSCH, and used in PDSCH transmission methods of single antenna port transmission and closed loop spatial multiplexing, respectively.

The transmission mode is a mode semi-statically configured for the terminal device for receiving PDSCH data transmission signaled through the PDCCH or the EPDCCH, through higher layer signalling. For the transmission mode, any one of transmission modes 1 to 10 below is configured.

In the transmission mode 1, a PDSCH transmission method of single antenna port transmission (transmission by the antenna port 0) is used, and a DCI format 1 or 1A is used.

In the transmission mode 2, a PDSCH transmission method of transmission diversity is used, and the DCI format 1 or 1A is used.

In the transmission mode 3, a PDSCH transmission method of large latency CDD or the transmission diversity is used, and the DCI format 1 or 2A is used.

In the transmission mode 4, a PDSCH transmission method of closed loop spatial multiplexing or the transmission diversity is used, and the DCI format 1 or 2 is used.

In the transmission mode 5, a PDSCH transmission method of multi-user MIMO or the transmission diversity is used, and the DCI format 1 or 1D is used.

In the transmission mode 6, a PDSCH transmission method of closed loop spatial multiplexing with a single port or the transmission diversity is used, and the DCI format 1 or 1B is used.

In the transmission mode 7, a PDSCH transmission method of any one of the single antenna port transmission (transmission by the antenna port 5), the transmission diversity, and the single antenna port transmission (transmission by the antenna port 0) is used, and the DCI format 1 or 1 is used.

In the transmission mode 8, a PDSCH transmission method of any one of two-layer transmission (transmission by the antenna port 7 and the antenna port 8), the transmission diversity, and the single antenna port transmission (transmission by the antenna port 0) is used, and the DCI format 1 or 2B is used.

In the transmission mode 9, a PDSCH transmission method of any one of eight or less layer-transmission (transmission by the antenna port 7 to the antenna port 14), the transmission diversity, and the single antenna port transmission (transmission by the antenna port 0) (single antenna port transmission by the antenna port 7 in a case of an MBSFN subframe) is used, and the DCI format 1 or 2C is used.

In the transmission mode 10, a PDSCH transmission method of any one of eight or less-layer transmission (transmission by the antenna port 7 to the antenna port 14), the transmission diversity, and the single antenna port transmission (transmission by the antenna port 0) (single antenna port transmission by the antenna port 7 in a case of an MBSFN subframe) is used, and the DCI format 1 or 2C is used.

Note that other transmission modes (for example, a transmission mode 11 by a prescription similar to that of the transmission modes 9 and 10) may be used. For example, a DCI format used in an LAA cell is used in the transmission mode 11. In the transmission mode 11, a processing method, a coding method, a transmission method and/or a reception method in an LAA cell described in the present embodiment are used.

In a case that a CIF is not configured for a terminal device, the terminal device monitors an USS of an EPDCCH at each aggregation level given by specific tables, in each activated Serving cell which is configured so as to monitor an EPDCCH. In a case that monitoring of an EPDCCH is configured for a terminal device and a CIF is configured for the terminal device, the terminal device monitors, in one or more activated Serving cells, the USS of one or more EPDCCHs at each aggregation level given by the tables, as configured by higher layer signalling. A terminal device configured with the CIF associated with monitoring of the EPDCCH in a Serving cell c monitors, in the USS of the EPDCCH of the Serving cell c, the EPDCCH configured with the CIF and attached with the CRC scrambled by the C-RNTI. The terminal device configured with the CIF associated with the monitoring of an EPDCCH in a Primary cell monitors, in an USS of the EPDCCH of the Primary cell, the EPDCCH configured with the CIF is configured, and attached with the CRC scrambled with a Semi Persistent Scheduling-RNTI (SPS-RNTI). Here, the C-RNTI is an RNTI used for EPDCCH transmission associated with dynamic PDSCH transmission or PUSCH transmission, and the SPS-RNTI is an RNTI used for EPDCCH transmission associated with semi-static PDSCH transmission or PUSCH transmission.

In a Serving cell in which an EPDCCH is monitored, in a case that a CIF is not configured for the terminal device, the terminal device monitors a USS of the EPDCCH for the EPDCCH not including the CIF, and in a case that a CIF is configured for the terminal device, the terminal device monitors the USS of the EPDCCH for the EPDCCH including the CIF. That is, in accordance with whether the CIF is configured, it is determined whether an EPDCCH is decoded as an EPDCCH including the CIF, or an EPDCCH not including the CIF. In a case that the terminal device is configured to monitor the EPDCCH including the CIF corresponding to the Secondary cell in the other Serving cells, the terminal device does not monitor the EPDCCH in the Secondary cell. In the Serving cell in which the EPDCCH is monitored, the terminal device monitors at least an EPDCCH candidate for the same Serving cell.

In a terminal device configured to monitor an EPDCCH candidate attached with the CRC scrambled with the C-RNTI, the EPDCCH candidate having a certain DCI format size including the CIF on a certain Serving cell, it is assumed that the EPDCCH candidate having the DCI format size may be transmitted on the certain Serving cell in USS of any EPDCCH corresponding to any value which may be taken by the CIF, with the DCI format size.

In a case that a transmission opportunity of a positioning Reference Signal is configured for a Serving cell in which an EPDCCH is monitored, only within an MBSFN subframe and a CP length used in the subframe 0 is a normal CP, the terminal device is not required to monitor the EPDCCH in a subframe which is configured, by a higher layer, as a portion of the transmission opportunity of the positioning Reference Signal.

It is assumed that the same value $C_{init}$ is used in the antenna ports 107 and 108 while the terminal device monitors an EPDCCH candidate associated with either the antenna port 107 or 108. It is assumed that the same value $C_{init}$ is used in the antenna ports 109 and 110 while the terminal device monitors an EPDCCH candidate associated with either the antenna port 109 or 110.

In a case that, for a certain Serving cell, a terminal device is configured through higher layer signalling to receive PDSCH data transmission in accordance with the transmission modes 1 to 9, the terminal device follows (s1) and (s2) below.

(s1) In a case that epdcch-StartSymbol-r11 being a higher layer parameter is configured for the terminal device, a starting OFDM symbol (a first OFDM symbol to which an EPDCCH is mapped in one subframe, also referred to as start position of an EPDCCH) for an EPDCCH, given by $I_{EPDCCHStart}$ being an index within a first slot in one subframe, is determined based on the higher layer parameter. Here, the epdcch-StartSymbol-r11 being the higher layer parameter may be individually configured for each EPDCCH set, and is a parameter for designating the starting OFDM symbol of the EPDCCH (information indicating the starting OFDM symbol). The epdcch-StartSymbol-r11 being the higher layer parameter is configured by using an RRC message.

(s2) In another case, the starting OFDM symbol for the EPDCCH is given by $I_{EPDCCHStart}$ being an index within a first slot in one subframe, in a case that $N^{DL}_{RB}$ is larger than 10, is given by a Control Format Indicator (CFI) value in the subframe of the Serving cell, and in a case that $N^{DL}_{RB}$ is 10 or less, the starting OFDM symbol is given by adding 1 to the CFI value in the subframe of the Serving cell. Here, the CFI is a parameter taking any value of 1, 2, and 3, the value and is control information transmitted and received through a Physical CFI Channel (PCFICH). The CFI is information on the number of OFDM symbols used for PDCCH transmission in one subframe.

For a certain Serving cell, in a case that the terminal device is configured through higher layer signalling to receive PDSCH data transmission in accordance with the transmission mode 10, a starting OFDM symbol for monitoring an EPDCCH in a subframe k, for each EPDCCH^PRB set, follows pdsch-Start-r11 being a higher layer parameter as in (s3) to (s6) below. Here, pdsch-Start-r11 being a higher layer parameter is a parameter which may be individually configured for four types of parameter sets for a PDSCH, and is a parameter for designating a starting OFDM symbol of the PDSCH (information indicating the starting OFDM symbol), pdsch-Start-r11 being the higher layer parameter is configured by using an RRC message.

(s3) In a case that the value of pdsch-Start-r11 belongs to a set of 1, 2, 3, and 4 (the value is any one of 1, 2, 3, and 4), $I'_{EPDCCHStart}$ is given by pdsch-Start-r11.

(s4) In another case (in a case that the value of pdsch-Start-r11 does not belong to a set of 1, 2, 3, and 4), $I'_{EPDCCHStart}$ is given by the value of the CFI in the subframe k of the Serving cell in a case that $N^{DL}_{RB}$ is more than 10. In a case that $N^{DL}_{RB}$ is 10 or less, $I'_{EPDCCHStart}$ is given by a value obtained by adding 1 to the value of the CFI in the subframe k of the Serving cell.

(s5) In a case that the subframe k is a subframe designated by mbsfn-SubframeConfigList-r11 being a higher layer parameter or the subframe k is the subframe 1 or 6 in a TDD subframe constitution, $I_{EPDCCHStart}$ is given by $I_{EPDCCHStrt}$=min (2, $I'_{EPDCCHStart}$).

(s6) In another case (in a case that the subframe k is not a subframe designated by mbsfn-SubframeConfigList-r11 being a higher layer parameter, and the subframe k is not the subframe 1 or 6 in the TDD subframe constitution), $I_{EPDCCHStart}$ is given by $I_{EPDCCHStart}=I'_{EPDCCHStart}$.

For a certain Serving cell, in a case that the terminal device is configured through higher layer signalling to receive PDSCH data transmission in accordance with the transmission modes 1 to 9, and monitoring of an EPDCCH is configured, the terminal device assumes that the antenna ports 0 to 3, and 107 to 110 in the Serving cell correspond to quasi-co-location with respect to Doppler shift, Doppler spread, average delay, and delay spread (reception is performed on the assumption of being transmitted from the same transmission point or on the assumption of not being transmitted from a different transmission point).

For a certain Serving cell, in a case that the terminal device is configured through higher layer signalling to receive PDSCH data transmission in accordance with the transmission mode 10, and monitoring of an EPDCCH is configured, (q1) and (q1) below are applied to each EPDCCH-PRB set.

(q1) In a case that the terminal device is configured to decode the PDSCH based on a quasi-co-location type A by the higher layer, the terminal device assumes that the antenna ports 0 to 3, and 107 to 110 in the Serving cell correspond to quasi-co-location with respect to Doppler shift, Doppler spread, average delay, and delay spread.

(q2) In a case that the terminal device is configured to decode the PDSCH based on a quasi-co-location type B by the higher layer, the terminal device assumes that the antenna ports 15 to 22 and 107 to 110 corresponding to qcl-CSI-RS-ConfigNZPId-r11 being a higher layer parameter correspond to quasi-co-location with respect to Doppler shift, Doppler spread, average delay, and delay spread. Here, qcl-CSI-RS-ConfigNZPId-r11 being the higher layer parameter may be individually configured for four types of parameter sets for a PDSCH, and is a parameter for designating a quasi-co-location of the PDSCH (information indicating a CSIRS with which a terminal-specific Reference Signal associated with the PDSCH is quasi-co-located). qcl-CSI-RS-ConfigNZPId-r11 being the higher layer parameter is configured by using an RRC message. Here, the quasi-co-location type A and the quasi-co-location type B are a parameter, any one of which is configured for the terminal device for which the transmission mode 10 is configured for each Serving cell. The type A indicates that the antenna ports 7 to 14 are quasi-co-located with CRS antenna ports 0 to 3 of the Serving cell. The type B indicates that the antenna ports 7 to 14 are quasi-co-located with any one of CSIRS antenna ports 15 to 22. Conversely, in a case that the type B is configured, the CSIRS is not always transmitted from the base station device corresponding to the Serving cell, and may be transmitted from another base station device. In this case, the EPDCCH and the PDSCH to be quasi-co-located with the CSIRS are normally transmitted from the same transmission point (for example, a remote overhang antenna device connected to a base station device through backhaul or another base station device) as the CSIRS.

In a certain Serving cell, in a case that the terminal device is configured through higher layer signalling to receive PDSCH data transmission in accordance with the transmission mode 10, and monitoring of an EPDCCH is configured, for each EPDCCH-PRB set, the terminal device uses a parameter designated by MappingQCL-ConfigId-r11 being a higher layer parameter, in order to determine RE mapping of the EPDCCH and antenna port quasi-co-location. A parameter set includes parameters (Q1) to (Q6) below for determining the RE mapping of the EPDCCH and the antenna port quasi-co-location.

(Q1) crs-PortsCount-r11. crs-PortsCount-r11 is a parameter indicating the number of ports of a CRS used when a PDSCH or an EPDCCH is mapped to an RE.

(Q2) crs-FreqShift-r11. crs-FreqShift-r11 is a parameter indicating a frequency shift of a CRS used when a PDSCH or an EPDCCH is mapped to an RE.

(Q3) mbsdn-SubframeConfigList-r11. mbsdn-SubframeConfigList-r11 is a parameter indicating a location of an MBSFN subframe used when a PDSCH or an EPDCCH is mapped to an RE. In a subframe configured as an MBSFN subframe by the parameter, the PDSCH or the EPDCCH is mapped on the assumption that a CRS is provided only in an OFDM symbol in which a PDCCH may be arranged (on the assumption that a CRS is not provided in an OFDM symbol in which a PDCCH is not arranged).

(Q4) csi-RS-ConfigZPId-r11. csi-RS-ConfigZPId-r11 is a parameter indicating a location of a zero power CSIRS used when a PDSCH or an EPDCCH is mapped to an RE.

(Q5) pdsch-Start-r11. pdsch-Start-r11 is a parameter indicating a starting OFDM symbol used when a PDSCH or an EPDCCH is mapped to an RE.

(Q6) qcl-CSI-RS-ConfigNZPId-r11. qcl-CSI-RS-ConfigNZPId-r11 is a parameter indicating a CSIRS with which a Reference Signal for demodulating a PDSCH or an EPDCCH is collocated. The parameter can designate an ID of any one of one or more configured CSIRSs. The Reference Signal for demodulating a PDSCH or an EPDCCH may be configured to be quasi-co-located with the CSIRS of which an ID is designated.

Next, a PDSCH scheduled on a second EPDCCH will be described. An example of a PDSCH scheduled on a second EPDCCH is only a PDSCH mapped to a subframe in (to) which the second EPDCCH is detected (mapped).

Another example of a PDSCH scheduled on the second EPDCCH includes a PDSCH mapped to any subframe within a burst including a subframe in (to) which the second EPDCCH is detected (mapped). The information (configuration) on the subframe to which the PDSCH is mapped may be configured by an RRC or may be notified through the DCI transmitted on the second EPDCCH. The PDSCH scheduled on the second EPDCCH may be one subframe or a plurality of subframes.

Next, a start symbol and/or end symbol of the PDSCH will be described in a case that the PDSCH scheduled on the second EPDCCH is mapped to a partial subframe. For example, the start symbol and/or end symbol of the PDSCH is determined based on control information included in DCI of the second EPDCCH in which the scheduling is performed. For example, the start symbol and/or end symbol of the PDSCH is determined based on a start symbol and/or end symbol of the second EPDCCH in which the scheduling is performed. Moreover, the start symbol and/or end symbol of the PDSCH is the same as a start symbol and/or end symbol of the second EPDCCH in which the scheduling is performed, for example. Furthermore, the start symbol and/or end symbol of the PDSCH is an OFDM symbol calculated from a start symbol and/or end symbol of the second EPDCCH in which the scheduling is performed, for example. Moreover, the start symbol and/or end symbol of the PDSCH is configured through RRC signalling independently from a start symbol and/or end symbol of the second EPDCCH in which the scheduling is performed, for example. Furthermore, the start symbol and/or end symbol of the PDSCH is determined by control information included in a physical channel or a physical signal mapped to the subframe, for example. Moreover, the determination method or notification method, between the start symbol and the end symbol of the PDSCH, may be different from each other.

Furthermore, a configuration related to a subframe in which the first EPDCCH for the first EPDCCH set is monitored and a configuration related to a subframe in which the second EPDCCH for to the second EPDCCH set is monitored, may be different from each other. For example, the subframe in which the first EPDCCH is monitored may be commonly configured in the first EPDCCH set and whether to monitor may be configured for each subframe by information in a bitmap format. An example of a configuration for the subframe in which the second EPDCCH is monitored is the same as the configuration for the subframe in which the first EPDCCH is monitored, but is configured independently. Another example of the configuration for the subframe in which the second EPDCCH is monitored is monitoring of the second EPDCCH in a subframe in which a burst (downlink burst transmission) in a LAA cell is detected by the terminal.

A portion of the embodiment described above may be paraphrased as follows.

A terminal device according to the present embodiment includes: a higher layer processing unit configured to configure a first EPDCCH set for monitoring a first EPDCCH in a first Serving cell, and a second EPDCCH set for monitoring a second EPDCCH in a second Serving cell; and a reception unit configured to monitor the first EPDCCH and the second EPDCCH. In a certain subframe, a start symbol of the first EPDCCH and a start symbol of the second EPDCCH are independently determined.

A base station device according to the present embodiment includes: a higher layer processing unit configured to configure, for the terminal device, a first EPDCCH set for monitoring a first EPDCCH in a first Serving cell, and a second EPDCCH set for monitoring a second EPDCCH in a second Serving cell; and a transmission unit configured to transmit the first EPDCCH and the second EPDCCH. In a certain subframe, a start symbol of the first EPDCCH and a start symbol of the second EPDCCH are independently determined.

The maximum value which may be configured for the start symbol of the second EPDCCH is larger than the maximum value which may be configured for the start symbol of the first EPDCCH. For example, a value which may be configured for the start symbol of the first EPDCCH is 1, 2, 3, or 4. A value which may be configured for the start symbol of the second EPDCCH includes a value different from the value which may be configured for the start symbol of the first EPDCCH.

The start symbol of the first EPDCCH is configured based on a parameter of a higher layer. The start symbol of the second EPDCCH is determined based on a symbol in which an initial signal is detected. For example, the start symbol of the second EPDCCH is the same as the symbol in which an initial signal is detected.

An end symbol of the first EPDCCH is the last symbol in a certain subframe. An end symbol of the second EPDCCH is configured based on a parameter of a higher layer.

A start symbol and/or end symbol of a PDSCH to be scheduled by the second EPDCCH is also determined based on the start symbol and/or end symbol of the second EPDCCH.

The start symbol and/or end symbol of the PDSCH to be scheduled by the second EPDCCH is also determined based on DCI in the second EPDCCH.

A terminal device according to the present embodiment includes: a higher layer processing unit configured to configure a first EPDCCH set for monitoring a first EPDCCH in a first Serving cell, and a second EPDCCH set for monitoring a second EPDCCH in a second Serving cell; and a reception unit configured to monitor the first EPDCCH and the second EPDCCH. For each physical Resource Block pair, an EREG used to define mapping of a first EPDCCH and a second EPDCCH to a Resource Element is common to the first EPDCCH and the second EPDCCH. The number of EREGs constituting each ECCE used for transmitting the first EPDCCH and the number of EREGs constituting each ECCE used for transmitting the first EPDCCH are independently determined.

A base station device according to the present embodiment includes: a higher layer processing unit configured to configure, for the terminal device, a first EPDCCH set for monitoring a first EPDCCH in a first Serving cell, and a second EPDCCH set configured to monitor a second EPDCCH in a second Serving cell; and a transmission unit configured to transmit the first EPDCCH and the second EPDCCH. For each physical Resource Block pair, an EREG used to define mapping of a first EPDCCH and a second EPDCCH to a Resource Element is common to the first EPDCCH and the second EPDCCH. The number of EREGs constituting each ECCE used for transmitting the first EPDCCH and the number of EREGs constituting each ECCE used for transmitting the first EPDCCH are independently determined.

The maximum value of the numbers of EREGs constituting each ECCE used for transmitting the second EPDCCH is larger than the maximum value of the numbers of EREGs constituting each ECCE used for transmitting the first EPDCCH. For example, the number of EREGs constituting each ECCE used for transmitting the first EPDCCH includes four or eight. The number of EREGs constituting each ECCE used for transmitting the second EPDCCH includes a number different from the number of EREGs constituting each ECCE used for transmitting the first EPDCCH. The number of EREGs constituting each ECCE used for transmitting the second EPDCCH includes four, eight, or sixteen.

A Resource Element to which a Demodulation Reference Signal associated with the second EPDCCH is mapped is determined in accordance with the start symbol and/or end symbol of the second EPDCCH.

The maximum value of the numbers of physical Resource Block pairs used for the second EPDCCH set is larger than the maximum value of the numbers of physical Resource Block pairs used for the first EPDCCH set. For example, the number of physical Resource Block pairs used for the first EPDCCH set includes two, four, or eight. The number of physical Resource Block pairs used for the second EPDCCH set includes a number different from the number of physical Resource Block pairs used for the first EPDCCH set. The number includes two, four, eight or sixteen.

Moreover, although the description has been given in each of the above-described embodiments by using the terms "Primary cell" and "PS cell", these terms need not always be used. For example, "Primary cell" in each of the above-described embodiments may be referred to as "master cell", and "PS cell" in each of the above-described embodiments may be referred to as "Primary cell".

A program running on each of a base station device 2 and a terminal device 1 according to the present invention may be a program (a program for causing a computer to operate) that controls a Central Processing Unit (CPU) and the like in such a manner as to realize the functions according to the above-described embodiments of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and when necessary, is read by the CPU to be modified or rewritten.

Moreover, the terminal device 1 and the base station device 2-1 or the base station device 2-2 according to the above-described embodiments may be realized by the computer. This configuration may be realized by recording a program for realizing such control functions on a computer-readable recording medium and causing a computer system to read the program recorded on the recording medium for execution.

Moreover, the "computer system" here is defined as a computer system built into the terminal device 1 or the base station device 2-1 or the base station device 2-2, and the computer system includes an OS and hardware components such as peripheral devices. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station device 2-1 or base station device 2-2 according to the above-described embodiments can be realized as an aggregation (a device group) constituted of a plurality of devices. Devices constituting the device group may be each equipped with some or all portions of each function or each functional block of the base station device 2-1 or base station device 2-2 according to the above-described embodiments. It is only required that the device group itself include general functions or general functional blocks of the base station device 2-1 or base station device 2-2. Furthermore, the terminal device 1 according to the above-described embodiments can also communicate with the base station device as the aggregation.

Furthermore, the base station device 2-1 or base station device 2-2 according to the above-described embodiments may be an Evolved Universal Terrestrial Radio Access Network (E-UTRAN). Furthermore, the base station device 2-1 or base station device 2-2 according to the above-described embodiments may have some or all portions of a function of a higher node for an eNodeB.

Furthermore, some or all portions of each of the terminal device 1 and the base station device 2-1 or base station device 2-2 according to the above-described embodiments may be typically realized as a large-scale integration (LSI) that is an integrated circuit or may be realized as a chip set. The functional blocks of each of the terminal device 1 and the base station device 2-1 or base station device 2-2 may be individually realized as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiments, the cellular mobile station device is described as one example of a terminal device or a communication device, but the present invention is not limited to this, and can be applied to a fixed-type electronic apparatus installed indoors or outdoors, or a stationary-type electronic apparatus, for example, a terminal device or a communication device, such as an audio-video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

Summary

As described above, a terminal device according to one aspect of the present invention is a terminal device including a transmission unit. It is preferable that the terminal device includes: a higher layer processing unit configured with measurement configuration information including a physical quantity configuration (quantityConfig) and Measurement objects; and a measurement unit configured to perform a first measurement and a second measurement, based on the measurement configuration information; the physical quantity configuration includes at least a filtering coefficient of filtering applied to a measurement result of the first measurement; the Measurement objects include at least measurement timing configuration used for the second measurement; and the transmission unit transmits the measurement result of the first measurement to which the filtering is applied, and a measurement result of the second measurement based on the measurement timing configuration.

The terminal device according to one aspect of the present invention is the above-described terminal device. It is preferable that the first measurement is measurement of a Reference Signal Received Power (RSRP) or Reference Signal Received Quality (RSRQ), and the second measurement is measurement of a Received Signal Strength Indicator (RSSI).

The terminal device according to one aspect of the present invention is any one of the above-described terminal devices. The filtering is performed a plurality number of times. It is preferable that for each of the filtering performed the plurality number of times, an object filtering is given by $F_n=(1-\alpha)\times F_{n-1}+\alpha\times M_n$, where $M_n$ is the latest received measurement result from a physical layer, $F_n$ is an updated measurement result after the object filtering used for a report criteria evaluation or a measurement report, $F_{n-1}$ is a measurement result obtained by a filtering immediately before the object filtering, and $\alpha$ is $\frac{1}{2}^{(k/4)}$, where k is a filtering coefficient for the first measurement, and k is always zero for the second measurement.

The terminal device according to one aspect of the present invention is any one of the above-described terminal devices. It is preferable that the measurement timing configuration includes a measurement period and a subframe offset for the second measurement.

The terminal device according to one aspect of the present invention any one of the above-described terminal devices. It is preferable that the filtering is applied to the measurement result of the first measurement, and is not applied to the measurement result of the second measurement.

The terminal device according to one aspect of the present invention is any one of the above-described terminal devices. It is preferable that the first measurement is a measurement based on a Cell-specific Reference Signal and the second measurement is a measurement based on a Discovery Signal.

The terminal device according to one aspect of the present invention is an above-described terminal device. It is preferable that the Discovery Signal is transmitted based on downlink Listen Before Talk (LBT).

The terminal device according to one aspect of the present invention is any one of the above-described terminal devices. It is preferable that the first measurement is a measurement for a licensed band and the second measurement is a measurement for an unlicensed band.

Finally, other aspects of the present invention will be described, below.

A terminal device according to one aspect of the present invention is a terminal device configured to communicate with a base station device. The terminal device includes: a higher layer processing unit for which a physical quantity configuration (quantityConfig) and Measurement objects are configured; and a measurement unit configured to perform measurement for a first frequency and a second frequency based on the physical quantity configuration and the Measurement objects. The physical quantity configuration includes at least a first filtering coefficient used for measurement of the first frequency and a second filtering coefficient used for measurement of the second frequency, and the Measurement objects include at least a Discovery Signal measurement configuration (measDS-Config) used for measurement at the second frequency. The measurement unit performs measurement based on a Cell-specific Reference Signal for the first frequency, and measurement based on a Discovery Signal in accordance with the Discovery Signal measurement configuration for the second frequency. A filtering based on the first filtering coefficient may be applied to a measurement result for the first frequency, and a filtering based on the second filtering coefficient may be applied to a measurement result for the second frequency.

A terminal device according to one aspect of the present embodiment is a terminal device configured to communicate with a base station device. The terminal device includes: a higher layer processing unit for which a physical quantity configuration (quantityConfig) and Measurement objects are configured; and a measurement unit configured to perform measurement for a first frequency and a second frequency based on the physical quantity configuration and the Measurement objects. The physical quantity configuration includes at least a first filtering coefficient used for measurement of the first frequency, and the Measurement objects include at least a Discovery Signal measurement configuration (measDS-Config) used for measurement at the second frequency. The measurement unit performs measurement based on a Cell-specific Reference Signal for the first frequency, and measurement based on a Discovery Signal in accordance with the Discovery Signal measurement configuration for the second frequency. A filtering based on the first filtering coefficient may be applied to a measurement result for the first frequency, and a filtering based on the filtering coefficient may not be applied to a measurement result for the second frequency.

The terminal device according to one aspect of the present invention is any one of the above-described terminal device. The filtering is given by $F_n=(1-\alpha)\times F_{n-1}+\alpha\times M_n$, where $M_n$ is the latest received measurement report from a physical layer, $F_n$ is an updated filtered measurement result used for a report criteria evaluation or a measurement report, $F_{n-1}$ is a previous filtered measurement result, k may be a first filtering coefficient for the first frequency, and k may be a second filtering coefficient for the second frequency.

Furthermore, the terminal device according to one aspect of the present invention is any one of the above-described terminal devices. The first filtering coefficient and the second filtering coefficient may be independently configured.

Furthermore, the terminal device according to one aspect of the present invention is any one of the above-described terminal devices. The second filtering coefficient may be always zero.

The terminal device according to one aspect of the present invention is any one of the above-described terminal devices. The first frequency may correspond to a licensed band, and the second frequency may correspond to an unlicensed band.

The terminal device according to one aspect of the present invention is the above-described terminal devices. The Discovery Signal may be transmitted based on downlink Listen Before Talk (LBT).

Furthermore, the terminal device according to one aspect of the present invention is any one of the above-described terminal devices. It is preferable that measurement based on the Cell-specific Reference Signal and measurement based on the Discovery Signal are measurement of a Reference Signal Received Power (RSRP).

REFERENCE SIGNS LIST

501 Higher layer
502 Control unit
503 Codeword generation unit
504 Downlink subframe generation unit
505 Downlink Reference Signal generation unit
506 OFDM signal transmission unit
507 Transmit antenna
508 Receive antenna
509 SC-FDMA signal reception unit
510 Uplink subframe processing unit
511 Uplink control information extraction unit
601 Receive antenna
602 OFDM signal reception unit
603 Downlink subframe processing unit
604 Downlink Reference Signal extraction unit
605 Transport block extraction unit
606, 1006 Control unit
607, 1007 Higher layer
608 Channel state measurement unit
609, 1009 Uplink subframe generation unit
610 Uplink control information generation unit
611, 612, 1011 SC-FDMA signal transmission unit
613, 614, 1013 Transmit antenna

The invention claimed is:

1. A terminal device including transmission circuitry, the terminal device comprising:
reception circuitry configured to receive an RRC (radio resource control) message including measurement configuration information, wherein the measurement configuration information includes a quantity configuration (quantityConfig) and Measurement objects; and
measurement circuitry configured to perform a first measurement and a second measurement based on the measurement configuration information,
wherein the quantity configuration includes at least a filtering coefficient of filtering applied to a measurement result of the first measurement,
the Measurement objects include at least a measurement timing configuration used for the second measurement, and
the transmission circuitry is configured to transmit the measurement result of the first measurement applied with the filtering and a measurement result of the second measurement based on the measurement timing configuration.

2. The terminal device according to claim 1, wherein the first measurement is measurement of a Reference Signal Received Power (RSRP) or a Reference Signal Received Quality (RSRQ), and the second measurement is measurement of a Received Signal Strength Indicator (RSSI).

3. The terminal device according to claim 1, wherein the measurement timing configuration includes a measurement period and a subframe offset for the second measurement.

4. The terminal device according to claim 1, wherein the filtering is applied to the measurement result of the first measurement, and is not applied to the measurement result of the second measurement.

5. The terminal device according to claim 1,
wherein the filtering is performed a plurality of times, and for each of the filtering performed the plurality of times, an object filtering is given by $F_n=(1-\alpha) \times F_{n-1} + \alpha \times M_n$, where $M_n$ is a latest received measurement result from a physical layer, $F_n$ is an updated measurement result after the object filtering, used for a report criteria evaluation or a measurement report, $F_{n-1}$ is a measurement result obtained by a filtering immediately before the object filtering, and $\alpha$ is $\frac{1}{2}(k/4)$, where k is the filtering coefficient for the first measurement.

6. The terminal device according to claim 1, wherein the first measurement is a measurement based on a Cell-specific Reference Signal and the second measurement is a measurement based on a Discovery Signal.

7. The terminal device according to claim 6, wherein the Discovery Signal is transmitted based on a downlink Listen Before Talk (LBT).

8. The terminal device according to claim 1, wherein the first measurement is a measurement for a licensed band and the second measurement is a measurement for an unlicensed band.

9. A communication method by a terminal device, the method comprising the steps of:
receiving, an RRC (radio resource control) message including measurement configuration information, wherein the measurement configuration information includes a quantity configuration (quantityConfig) and Measurement objects; and
performing a first measurement and a second measurement based on the measurement configuration information,
wherein the quantity configuration includes at least a filtering coefficient of filtering applied to a measurement result of the first measurement,
the Measurement objects include at least a measurement timing configuration used for the second measurement, and
the method further comprises the step of transmitting the measurement result of the first measurement applied with the filtering and a measurement result of the second measurement based on the measurement timing configuration.

10. An integrated circuit mounted on a terminal device for causing the terminal device to execute a plurality of functions, the integrated circuit causing the terminal device to execute the steps of:
receiving, an RRC (radio resource control) message including measurement configuration information, wherein the measurement configuration information includes a quantity configuration (quantityConfig) and Measurement objects; and
performing a first measurement and a second measurement based on the measurement configuration information,
wherein the quantity configuration includes at least a filtering coefficient of filtering applied to a measurement result of the first measurement,
the Measurement objects include at least a measurement timing configuration used for the second measurement, and
the integrated circuit further causes the terminal device to execute the step of transmitting the measurement result of the first measurement applied with the filtering and a measurement result of the second measurement based on the measurement timing configuration.

* * * * *